US011963928B2

(12) United States Patent
Webb et al.

(10) Patent No.: US 11,963,928 B2
(45) **Date of Patent: *Apr. 23, 2024**

(54) GLASS CONTAINERS FOR STORING PHARMACEUTICAL COMPOSITIONS

(71) Applicant: CORNING INCORPORATED, Corning, NY (US)

(72) Inventors: James Ernest Webb, Corning, NY (US); Sinue Gomez-Mower, Corning, NY (US); Weirong Jiang, Sarasota, FL (US); Joseph Michael Matusick, Corning, NY (US); Christie Leigh McCarthy, Painted Post, NY (US); Connor Thomas O'Malley, Painted Post, NY (US); John Stephen Peanasky, Big Flats, NY (US); Shivani Rao Polasani, Horseheads, NY (US); Steven Edward DeMartino, Painted Post, NY (US); Michael Clement Ruotolo, Jr., Lindley, NY (US); Bryan James Musk, Williamstown, NJ (US); Jared Seaman Aaldenberg, Corning, NY (US); Eric Lewis Allington, Campbell, NY (US); Douglas Miles Noni, Jr., Horseheads, NY (US); Amber Leigh Tremper, Painted Post, NY (US); Kristen Dae Waight, Lindley, NY (US); Kevin Patrick McNelis, Elmira, NY (US); Patrick Joseph Cimo, Corning, NY (US); Christy Lynn Chapman, Painted Post, NY (US); Robert Anthony Schaut, Horseheads, NY (US); Adam Robert Sarafian, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,944

(22) Filed: May 2, 2023

(65) Prior Publication Data

US 2023/0301872 A1 Sep. 28, 2023

Related U.S. Application Data

(63) Continuation of application No. 17/957,964, filed on Sep. 30, 2022.

(Continued)

(51) Int. Cl.

*A61J 1/14* (2023.01)
*B65D 23/08* (2006.01)

(52) U.S. Cl.

CPC ........ *A61J 1/1468* (2015.05); *B65D 23/0821* (2013.01)

(58) Field of Classification Search

CPC .......................... A61J 1/1468; B65D 23/0821
See application file for complete search history.

(56) References Cited

U.S. PATENT DOCUMENTS

| | | | |
|---|---|---|---|
| 3,653,528 | A | 4/1972 | Wimmer |
| 3,659,736 | A | 5/1972 | Riggs |

(Continued)

FOREIGN PATENT DOCUMENTS

| | | | |
|---|---|---|---|
| CA | 3138450 | A1 | 11/2020 |
| EP | 3708137 | A1 | 9/2020 |

(Continued)

OTHER PUBLICATIONS

International Search Report relating to PCT/US2022/077413 filed Sep. 30, 2022; dated Feb. 8, 2023.

(Continued)

*Primary Examiner* — Shawn M Braden
(74) *Attorney, Agent, or Firm* — Michael G. Panian

(57) ABSTRACT

Disclosed herein are glass pharmaceutical vials having sidewalls of reduced thickness. In embodiments, the glass pharmaceutical vial may include a glass body comprising a sidewall enclosing an interior volume. An outer diameter D of the glass body is equal to a diameter $d_1$ of a glass vial of (Continued)

size X as defined by ISO 8362-1, wherein X is one of 2R, 3R, 4R, 6R, 8R, 10R, 15R, 20R, 25R, 30R, 50R, and 100R as defined by ISO 8362-1. However, the sidewall of the glass pharmaceutical vial comprises an average wall thickness $T_i$ that is less than or equal to $0.85{*}s_1$, wherein $s_1$ is a wall thickness of the glass vial of size X as defined by ISO 8362-1 and X is one of 2R, 3R, 4R, 6R, 8R, 10R, 15R, 20R, 25R, 30R, 50R, and 100R as defined by ISO 8362-1.

16 Claims, 31 Drawing Sheets

Related U.S. Application Data

(60) Provisional application No. 63/277,488, filed on Nov. 9, 2021, provisional application No. 63/250,497, filed on Sep. 30, 2021.

(56) References Cited

U.S. PATENT DOCUMENTS

| | | | | |
|---|---|---|---|---|
| 4,205,754 | A | 6/1980 | Nielsen et al. | |
| 4,244,478 | A | 1/1981 | Handman | |
| 4,664,277 | A | 5/1987 | Connor | |
| 5,064,083 | A | 11/1991 | Alexander et al. | |
| 5,772,057 | A * | 6/1998 | Finneran | B65D 51/145 215/321 |
| 5,817,082 | A | 10/1998 | Niedospial, Jr. et al. | |
| 5,902,298 | A | 5/1999 | Niedospial, Jr. et al. | |
| 6,090,093 | A | 7/2000 | Thibault et al. | |
| 6,645,635 | B2 | 11/2003 | Muraki | |
| 7,282,269 | B2 | 10/2007 | Wang et al. | |
| 8,092,878 | B2 | 1/2012 | Miller et al. | |
| 8,497,004 | B2 | 7/2013 | Davis et al. | |
| 8,544,665 | B2 | 10/2013 | Bogle et al. | |
| 8,551,898 | B2 | 10/2013 | Danielson et al. | |
| 8,684,206 | B2 | 4/2014 | Kawachi | |
| 9,080,044 | B2 | 7/2015 | Muto | |
| 9,145,329 | B2 | 9/2015 | Drake et al. | |
| 9,763,852 | B2 | 9/2017 | Fadeev et al. | |
| 10,273,049 | B2 * | 4/2019 | Adib | C03C 17/32 |
| 10,780,021 | B2 | 9/2020 | Weikart et al. | |
| 11,168,019 | B2 | 11/2021 | Schaut et al. | |
| 2002/0023409 | A1 | 2/2002 | Py | |
| 2002/0166326 | A1 | 11/2002 | Giesy et al. | |
| 2003/0177629 | A1 | 9/2003 | Thibault et al. | |
| 2007/0246468 | A1 | 10/2007 | Miller et al. | |
| 2009/0145427 | A1 | 6/2009 | Groeger et al. | |
| 2010/0236659 | A1 * | 9/2010 | Py | B65B 3/003 141/69 |
| 2010/0273049 | A1 | 10/2010 | Vidal et al. | |
| 2015/0211950 | A1 | 7/2015 | Eckhoff et al. | |
| 2015/0320641 | A1 * | 11/2015 | Fangrow | A61J 1/2089 137/799 |
| 2015/0344557 | A1 | 12/2015 | Malik et al. | |
| 2016/0009460 | A1 | 1/2016 | Fournier et al. | |
| 2016/0075485 | A1 | 3/2016 | Masuyama et al. | |
| 2016/0324723 | A1 | 11/2016 | Lippert et al. | |
| 2018/0257975 | A1 | 9/2018 | Kimura et al. | |
| 2020/0146280 | A1 | 5/2020 | Silverman et al. | |
| 2020/0156991 | A1 | 5/2020 | Allington et al. | |
| 2020/0271541 | A1 | 8/2020 | Mathaes et al. | |
| 2021/0000690 | A1 * | 1/2021 | Langsdorf | A61J 1/1412 |
| 2021/0002016 | A1 | 1/2021 | Langsdorf et al. | |
| 2021/0080448 | A1 | 3/2021 | Murphy et al. | |
| 2021/0212893 | A1 | 7/2021 | Christie et al. | |
| 2022/0048804 | A1 | 2/2022 | Barnard et al. | |
| 2022/0168185 | A1 | 6/2022 | Redkar et al. | |
| 2022/0339067 | A1 | 10/2022 | Christie et al. | |

FOREIGN PATENT DOCUMENTS

| | | | |
|---|---|---|---|
| FR | 2558444 | A1 | 7/1985 |
| JP | 10-179688 | A | 7/1998 |
| JP | 2002065811 | A | 3/2002 |
| JP | 2010-209157 | A | 9/2010 |
| WO | 2013/034594 | A1 | 3/2013 |
| WO | 2020/112634 | A1 | 6/2020 |
| WO | 2020/231474 | A2 | 11/2020 |
| WO | 2021/042090 | A2 | 3/2021 |
| WO | 2021/162984 | A1 | 8/2021 |
| WO | 2022/020120 | A1 | 1/2022 |

OTHER PUBLICATIONS

Amrhein et al., Gerresheimer, “The lighter way of glass packaging: How to reduce weight to save material and energy”. pp. 1-12.

“Emission Factors for Greenhouse Gas Inventories.” Retrieved from: <https://www.epa.gov/sites/defaull/files/2018-03/documents/emission-factors_mar_2018_0.pdf>, 2018, pp. 1-5.

“Circular Rings and Arches”, Retrieved from: <https://engineeringlibrary .org/reference/circular-rings-arches-air-force-stress-manual>, 1986, pp. 1-15.

“How Much Does an Empty Semi Trailer Weigh?”, Retrieved from: <https://bigrigpros.com/how-much-does-an-empty-semi-trailer-weigh/>, 2023, pp. 1-5.

Invitation to Pay Additional Fees and, Where Applicable, Protest Fee; PCT/US22/48348; dated Jan. 5, 2023, 10 pages; European Patent Office.

Shigley and Mitchell, Mechanical Engineering Design 4th edition, 1985, pp. 1-6.

U.S. Appl. No. 63/277,488, entitled, “Pharmaceutical Containers Including High CTE Sealing Assembly Encircling Outer Surface of Container”, filed Nov. 9, 2021.

“Molding Innovation into healthcare packaging”, Retrieved from: https://www.araymond-life.com/en, ARaymond Life + Schott plastic cap for cold storage CCI presentation at PDA Conference (Mar. 2020), 4 pages.

Brigitte Zuleger et al., Container/Closure Integrity Testing and the Identification of a Suitable Vial/Stopper Combination for Low-Temperature Storage at −80° C., 2012, PDA JPST, vol. 66, Abstract (Year: 2012).

Ethylene-Propylene Rubbers & Elastomers, Apr. 20, 2012, International Institute of Synthetic Rubber Producers, Inc. (Year: 2012).

Hagart-Alexander, C., Temperature Measurement, 2010, Elsevier Inc., pp. 269-271 (Year: 2010).

Iacocca, R., “Primary container design for drug substance and drug substance at Cryo- and cold temperatures,” Presented at the 2019 PDA Europe Parenteral Packaging, Venice, Italy, Mar. 19, 2019. pp. 1-22.

International Search Report and Written Opinion of the International Searching Authority; PCT/US2022/077413; dated Feb. 16, 2023; 13 pages; European Patent Office.

International Search Report and Written Opinion of the International Searching Authority; PCT/US22/41311; dated Nov. 22, 2022, 14 pages; European Patent Office.

Nieto, A. and H. Roehl (2018). “Sealing Behaviour of Container Closure Systems under Frozen Storage Conditions: Nonlinear Finite Element Simulation of Serum Rubber Stoppers.” PDA J Pharm Sci and Tech (2018), 72(4): 367-381. DOI: 10.5731/pdajpst.2017.008391.

Sircoulomb et al., “Cryogenic Storage Challenges for Container-Closure Systems,” Mar. 25, 2020, available at https://www.pda.org/pda-letter-portal/home/full-article/cryogenic-storage-challenges-for-container-closure-systems. pp. 1-7.

U.S. Non-Final Office Action dated Jul. 6, 2023, pertaining to U.S. Appl. No. 18/310,944, 19 pgs.

U.S. Non-Final Office Action dated Jul. 6, 2023, pertaining to U.S. Appl. No. 18/310,964, 23 pgs.

* cited by examiner

GLASS CONTAINERS FOR STORING PHARMACEUTICAL COMPOSITIONS

CROSS REFERENCE TO RELATED APPLICATIONS

This application is a continuation of and claims priority to U.S. Non-Provisional patent application Ser. No. 17/957,964 entitled "Glass Containers For Storing Pharmaceutical Compositions," filed Sep. 30, 2022, which itself claims priority to U.S. Provisional Patent Application Ser. No. 63/250,497 entitled "Glass Containers For Storing Pharmaceutical Compositions," filed Sep. 30, 2021, and U.S. Provisional Patent Application Ser. No. 63/277,488 entitled "Pharmaceutical Containers Including High CTE Sealing Assembly Encircling Outer Surface Of Container," filed Nov. 9, 2021, each of which is incorporated by reference herein.

FIELD

The present specification generally relates to glass containers and, more specifically, to glass containers for storing pharmaceutical compositions, such as glass pharmaceutical vials.

TECHNICAL BACKGROUND

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1B' glass compositions which have a proven history of chemical durability.

However, use of glass for such applications is limited by the mechanical performance of the glass. Specifically, breakage can be costly to pharmaceutical manufacturers because breakage within a filling line requires that neighboring unbroken containers be discarded as the containers may contain fragments from the broken container. Breakage may also require that the filling line be slowed or stopped, lowering production yields. In addition, breakage may also result in the loss of active drug product leading to increased costs. Further, non-catastrophic breakage (i.e., when the glass cracks but does not break) may cause the contents to lose their sterility which, in turn, may result in costly product recalls.

In addition to mechanical performance, it is also desirable to reduce overall glass usage to provide for more environmentally friendly and sustainable packaging for pharmaceuticals.

Accordingly, a need exists for glass containers for use in storing pharmaceutical compositions which have improved mechanical performance and which are sustainable.

SUMMARY

According to a first aspect of the present disclosure, a glass pharmaceutical vial comprises a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1:2018, wherein X is a smallest size designation of 2R, 3R, 4R, 6R, 8R, 10R, 15R, 20R, 25R, 30R, 50R, and 100R, as defined by ISO 8362-1:2018, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of the glass vial of size designation X as defined by ISO 8362-1:2018; and the glass pharmaceutical vial comprises a compliance factor of at least 1.75, as determined in accordance with a Vial Compliance Test.

A second aspect of the present disclosure may include the glass pharmaceutical vial of the first aspect, further comprising a horizontal strength factor of at least 0.5, as determined in accordance with Horizontal Compression Test.

A third aspect of the present disclosure may include the glass pharmaceutical vial of any of the first or second aspects, further comprising an external organic coating and a horizontal strength factor of at least 1.5, as determined in accordance with Horizontal Compression Test.

A fourth aspect of the present disclosure may include the glass pharmaceutical vial of any of the first through third aspects, further comprising an external organic coating.

A fifth aspect of the present disclosure may include the glass pharmaceutical vial of the fourth aspect, wherein the external organic coating is an organic coating having a thickness greater than or equal to 20 nm and less than or equal to 40 nm.

A sixth aspect of the present disclosure may include the glass pharmaceutical vial of the fourth aspect, further comprising a breakage factor of at least 50, as determined in accordance with a Pendulum Impact Test.

A seventh aspect of the present disclosure may include the glass pharmaceutical vial of the fourth aspect, further comprising a cold storage factor of at least 2.25, as determined in accordance with a Freeze-Thaw Test.

A eighth aspect of the present disclosure may include the glass pharmaceutical vial of any of the first through seventh aspects, wherein the glass pharmaceutical vial is formed from a Type I, Class B glass according to ASTM Standard E438-92.

A ninth aspect of the present disclosure may include the glass pharmaceutical vial of any of the first through seventh aspects, wherein the glass pharmaceutical vial is formed from an aluminosilicate glass composition.

A tenth aspect of the present disclosure may include the glass pharmaceutical vial of any of the first through ninth aspects, wherein the sidewall of the glass pharmaceutical vial having an average wall thickness $T_i$ that is less than or equal to $0.85*s_1$ correlates to a reduction in a mass of glass used to make the glass pharmaceutical vial of greater than or equal to 10%.

A eleventh aspect of the present disclosure may include the glass pharmaceutical vial of any of the first through tenth aspects, wherein the sidewall of the glass pharmaceutical vial having an average wall thickness $T_i$ that is less than or equal to $0.85*s_1$ correlates to a reduction in an amount of energy used to convert the glass pharmaceutical vial from stock glass tubing of greater than or equal to 5%.

A twelfth aspect of the present disclosure may include the glass pharmaceutical vial of any of the first through eleventh aspects, wherein the sidewall of the glass pharmaceutical vial having an average wall thickness $T_i$ that is less than or equal to $0.85*s_1$ correlates to a reduction in an amount of $CO_2$ emitted to produce the glass pharmaceutical vial of greater than or equal to 5%.

A thirteenth aspect of the present disclosure may include the glass pharmaceutical vial of any of the first through twelfth aspects, wherein the sidewall of the glass pharmaceutical vial having an average wall thickness $T_i$ that is less than or equal to $0.85*s_1$ correlates to a reduction in an amount of energy used to separate the glass pharmaceutical vial from stock glass tubing of greater than or equal to 20%.

A fourteenth aspect of the present disclosure may include the glass pharmaceutical vial of any of the first through thirteenth aspects, wherein the glass pharmaceutical vial has a Type 1 chemical durability according to USP <660>.

A fifteenth aspect of the present disclosure may include the glass pharmaceutical vial of any of the first through fourteenth aspects, further comprising a Dynamic Impact Factor of less than 0.9, as determined in accordance with a Dynamic Impact Test.

A sixteenth aspect of the present disclosure may include the glass pharmaceutical vial of any of the first through fifteenth aspects, further comprising a FWHM Factor of at least 1.2, as determined in accordance with a Dynamic Impact Test.

A seventeenth aspect of the present disclosure may include the glass pharmaceutical vial of any of the first through fourteenth aspects, further comprising a Dynamic Impact Factor of less than 0.9 as determined in accordance with a Dynamic Impact Test, and a FWHM Factor of at least 1.2 as determined in accordance with the Dynamic Impact Test.

According to a eighteenth aspect of the present disclosure, a glass pharmaceutical vial comprises a glass body comprising a sidewall enclosing an interior volume and an outer diameter D, wherein: the outer diameter D of the glass body is equal to a diameter $d_1$ of a glass vial of size X as defined by ISO 8362-1:2018, wherein X is one of 2R, 3R, 4R, 6R, 8R, 10R, 15R, 20R, 25R, 30R, 50R, and 100R as defined by ISO 8362-1:2018; the sidewall of the glass pharmaceutical vial comprises an average wall thickness $T_i$ that is less than or equal to $0.85*s_1$, wherein $s_1$ is a wall thickness of the glass vial of size X as defined by ISO 8362-1:2018; and the glass pharmaceutical vial comprises a compliance factor of at least 1.75, as determined in accordance with a Vial Compliance Test.

A nineteenth aspect of the present disclosure may include the glass pharmaceutical vial of the eighteenth aspect, further comprising a horizontal strength factor of at least 0.5, as determined in accordance with Horizontal Compression Test.

A twentieth aspect of the present disclosure may include the glass pharmaceutical vial of any of the eighteenth or nineteenth aspects, further comprising an external organic coating and a horizontal strength factor of at least 1.5, as determined in accordance with Horizontal Compression Test.

A twenty-first aspect of the present disclosure may include the glass pharmaceutical vial of any of the eighteenth through twentieth aspects, further comprising an external coating.

A twenty-second aspect of the present disclosure may include the glass pharmaceutical vial of the twenty-first aspect, wherein the external organic coating is an organic coating having a thickness greater than or equal to 20 nm and less than or equal to 40 nm.

A twenty-third aspect of the present disclosure may include the glass pharmaceutical vial of the twenty-first aspect, further comprising a breakage factor of at least 50, as determined in accordance with a Pendulum Impact Test.

A twenty-fourth aspect of the present disclosure may include the glass pharmaceutical vial of the twenty-first aspect, further comprising a cold storage factor of at least 2.25, as determined in accordance with a Freeze-Thaw Test.

A twenty-fifth aspect of the present disclosure may include the glass pharmaceutical vial of any of the eighteenth through twenty-fourth aspects, wherein the glass pharmaceutical vial is formed from a Type I, Class B glass according to ASTM Standard E438-92.

A twenty-sixth aspect of the present disclosure may include the glass pharmaceutical vial of any of the eighteenth through twenty-fourth aspects, wherein the glass pharmaceutical vial is formed from an aluminosilicate glass composition.

A twenty-seventh aspect of the present disclosure may include the glass pharmaceutical vial of any of the eighteenth through twenty-sixth aspects, wherein the sidewall of the glass pharmaceutical vial having an average wall thickness $T_i$ that is less than or equal to $0.85*s_1$ correlates to a reduction in a mass of glass used to make the glass pharmaceutical vial of greater than or equal to 10%.

A twenty-eighth aspect of the present disclosure may include the glass pharmaceutical vial of any of the eighteenth through twenty-seventh aspects, wherein the sidewall of the glass pharmaceutical vial having an average wall thickness $T_i$ that is less than or equal to $0.85*s_1$ correlates to a reduction in an amount of energy used to convert the glass pharmaceutical vial from stock glass tubing of greater than or equal to 5%.

A twenty-ninth aspect of the present disclosure may include the glass pharmaceutical vial of any of the eighteenth through twenty-eighth aspects, wherein the sidewall of the glass pharmaceutical vial having an average wall thickness $T_i$ that is less than or equal to $0.85*s_1$ correlates to a reduction in an amount of $CO_2$ emitted to produce the glass pharmaceutical vial of greater than or equal to 5%.

A thirtieth aspect of the present disclosure may include the glass pharmaceutical vial of any of the eighteenth through twenty-ninth aspects, wherein the sidewall of the glass pharmaceutical vial having an average wall thickness $T_i$ that is less than or equal to $0.85*s_1$ correlates to a reduction in an amount of energy used to separate the glass pharmaceutical vial from stock glass tubing of greater than or equal to 20%.

A thirty-first aspect of the present disclosure may include the glass pharmaceutical vial of any of the eighteenth through thirtieth aspects, wherein the glass pharmaceutical vial has a Type 1 chemical durability according to USP <660>.

A thirty-second aspect of the present disclosure may include the glass pharmaceutical vial of any of the eighteenth through thirty-first aspects, further comprising a Dynamic Impact Factor of less than 0.9, as determined in accordance with a Dynamic Impact Test.

A thirty-third aspect of the present disclosure may include the glass pharmaceutical vial of any of the eighteenth through thirty-second aspects, further comprising a FWHM Factor of at least 1.2, as determined in accordance with a Dynamic Impact Test.

A thirty-fourth aspect of the present disclosure may include the glass pharmaceutical vial of any of the eighteenth through thirty-first aspects, further comprising a Dynamic Impact Factor of less than 0.9, as determined in accordance with a Dynamic Impact Test, and a FWHM Factor of at least 1.2, as determined in accordance with the Dynamic Impact Test.

According to a thirty-fifth aspect of the present disclosure, a glass pharmaceutical vial comprises a glass body comprising a sidewall enclosing an interior volume, an outer diameter D, and an external organic coating on the sidewall, wherein: the outer diameter D of the glass body is greater than or equal to 84% and less than or equal to 116% of a diameter $d_1$ of a glass vial of size designation X as defined by ISO 8362-1:2018, wherein X is a smallest size designation of 2R, 3R, 4R, 6R, 8R, 10R, 15R, 20R, 25R, 30R, 50R, and 100R, as defined by ISO 8362-1:2018, for which 116% of the diameter $d_1$ is greater than or equal to D; and the sidewall of the glass pharmaceutical vial comprises an average wall thickness $T_l$ that is less than or equal to $0.85*s_1$, wherein $s_1$ is a wall thickness of the glass vial of size designation X as defined by ISO 8362-1:2018; and a breakage factor of at least 50, as determined in accordance with a Pendulum Impact Test.

A thirty-sixth aspect of the present disclosure may include the glass pharmaceutical vial of the thirty-fifth aspect, wherein the external organic coating has a thickness greater than or equal to 20 nm and less than or equal to 40 nm.

A thirty-seventh aspect of the present disclosure may include the glass pharmaceutical vial of the thirty-fifth or thirty-sixth aspects, further comprising a cold storage factor of at least 2.25, as determined in accordance with a Freeze-Thaw Test.

A thirty-eighth aspect of the present disclosure may include the glass pharmaceutical vial of any of the thirty-fifth through thirty-seventh aspects, further comprising a compliance factor of at least 1.75, as determined in accordance with a Vial Compliance Test.

A thirty-ninth aspect of the present disclosure may include the glass pharmaceutical vial of any of the thirty-fifth through thirty-eighth aspects, further comprising a horizontal strength factor of at least 1.5, as determined in accordance with Horizontal Compression Test.

A fortieth aspect of the present disclosure may include the glass pharmaceutical vial of any of the thirty-fifth through thirty-ninth aspects, further comprising a Dynamic Impact Factor of less than 0.9, as determined in accordance with a Dynamic Impact Test.

A forty-first aspect of the present disclosure may include the glass pharmaceutical vial of any of the thirty-fifth through fortieth aspects, further comprising a FWHM Factor of at least 1.2, as determined in accordance with a Dynamic Impact Test.

A forty-second aspect of the present disclosure may include the glass pharmaceutical vial of any of the thirty-fifth through thirty-ninth aspects, further comprising a Dynamic Impact Factor of less than 0.9, as determined in accordance with a Dynamic Impact Test, and a FWHM Factor of at least 1.2, as determined in accordance with the Dynamic Impact Test.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
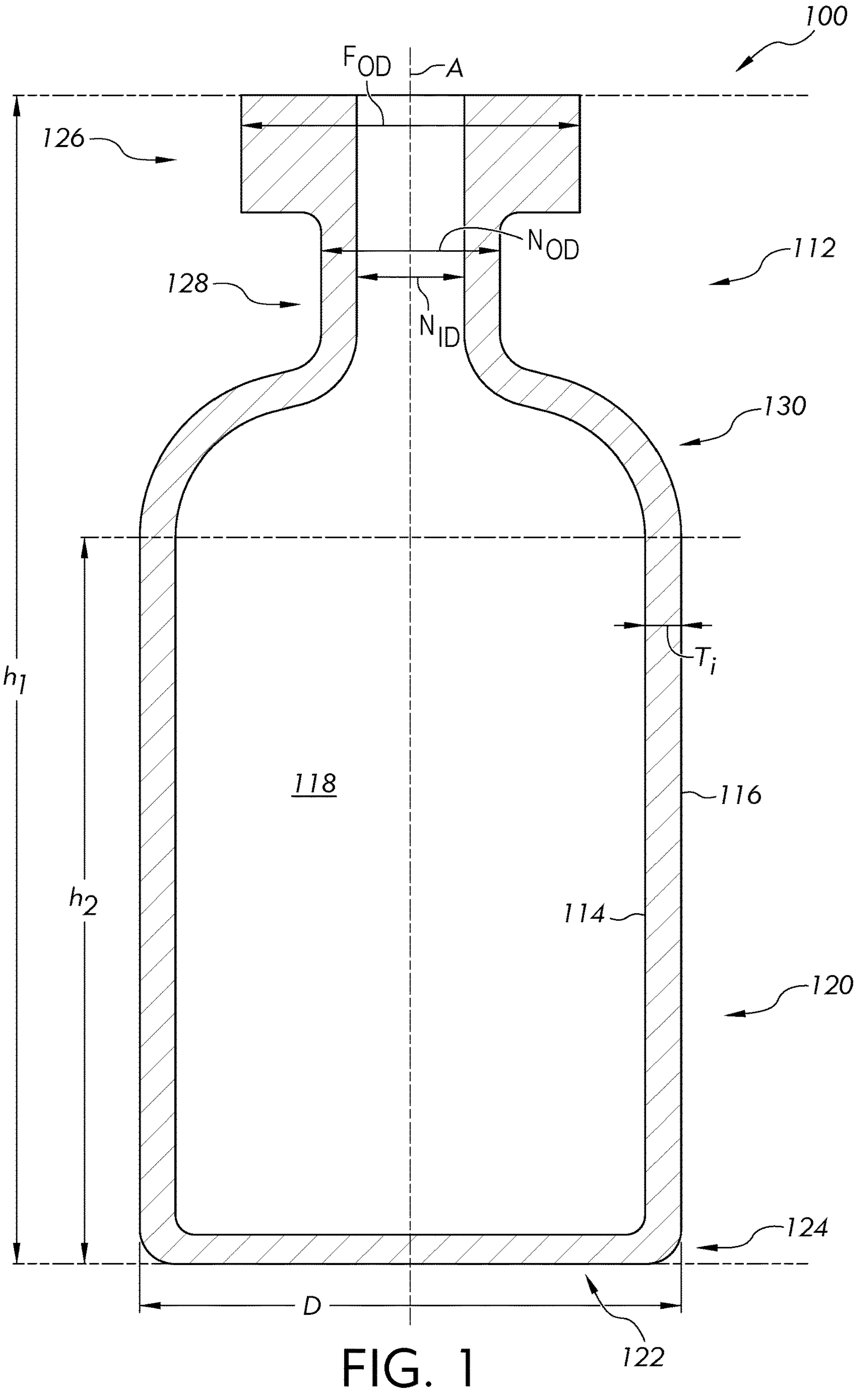
FIG. 1 illustrates a glass container having the form of a glass pharmaceutical vial according to one or more embodiments described herein.

Reference will now be made in detail to embodiments of glass containers described herein, examples of which are illustrated in the accompanying drawings. Whenever possible, the same reference numerals will be used throughout the drawings to refer to the same or like parts. One embodiment of a glass container, specifically a glass pharmaceutical vial, is shown in FIG. 1. As used herein, the terms "glass container," "vial," "glass pharmaceutical vial," may be used inter changeably to refer to a container made from glass. In embodiments, the glass pharmaceutical vial includes a glass body comprising a sidewall enclosing an interior volume. An outer diameter D of the glass body is between 84% and 116% of a diameter $d_1$ of a glass vial of size X as defined by ISO 8362-1, wherein X is a smallest size designation of 2R, 3R, 4R, 6R, 8R, 10R, 15R, 20R, 25R, 30R, 50R, and 100R as defined by ISO 8362-1 for which 116% of the diameter $d_1$ is greater than or equal to D. However, the sidewall of the glass pharmaceutical vial comprises an average wall thickness $T_i$ that is less than or equal to $0.85*s_1$, wherein $s_1$ is a wall thickness of the glass vial of size X as defined by ISO 8362-1. Various embodiments of glass containers, such as glass pharmaceutical vials, will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms “a,” “an,” and “the” include plural referents unless the context clearly dictates otherwise. Thus, for example, reference to “a” component includes aspects having two or more such components, unless the context clearly indicates otherwise.

The term “chemical durability,” as used herein, refers to the ability of the glass pharmaceutical vial to resist degradation upon exposure to specified chemical conditions. Specifically, the chemical durability of the glass pharmaceutical vials described herein may be assessed according to the following established material testing standards: USP <660> entitled “Glass Grains Test;” DIN 12116 dated March 2001 and entitled “Testing of glass—Resistance to attack by a boiling aqueous solution of hydrochloric acid—Method of test and classification”; ISO 695:1991 entitled “Glass—Resistance to attack by a boiling aqueous solution of mixed alkali—Method of test and classification”; and ISO 720:1985 entitled “Glass—Hydrolytic resistance of glass grains at 121 degrees C.—Method of test and classification.” The chemical durability of the glass may also be assessed according to ISO 719:1985 “Glass—Hydrolytic resistance of glass grains at 98 degrees C.—Method of test and classification,” in addition to the above referenced standards. The ISO 719 standard is a less rigorous version of the ISO 720 standard and, as such, it is believed that a glass which meets a specified classification of the ISO 720 standard will also meet the corresponding classification of the ISO 719 standard. The chemical durability of the glass pharmaceutical vial may also be assessed according to USP <660> entitled “Surface Glass Test,” and/or European Pharmacopeia 3.2.1 entitled “Glass Containers For Pharmaceutical Use” which assess the durability of the surface of the glass. The classifications associated with each standard are described in further detail herein.

The term “delamination,” as used herein, refers to a phenomenon in which glass particles are released from the surface of the glass following a series of leaching, corrosion, and/or weathering reactions. In general, the particles are silica-rich flakes of glass, or lamellae, which originate from the interior surface of the container as a result of the leaching of modifier ions or weak network formers, such as, for example, boron, into a solution contained within the container. These flakes, or lamellae, may generally be from 1 nm to 2 μm thick with a width greater than about 50 μm. As these flakes, or lamellae, are primarily composed of silica, the flakes, or lamellae, generally do not further degrade after being released from the surface of the glass.

A further method of characterizing the chemical durability of a glass container involves determining the propensity for delamination of the glass container. As described in U.S. Patent Application Publication No. 2021/0080448 A1, the contents of which are incorporated herein by reference in their entirety, the propensity for delamination of glass containers described herein may be measured in terms of a “chemical durability ratio” (CDR), which depicts the level of heterogeneity on the internal surface of the vial through the ratio of the “as-received” and “post-etch” titration values for a container. The method for determining the CDR of a glass container is discussed in more detail herein.

Surface compressive stress is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass-ceramic. SOC, in turn, is measured according to Procedure C (Glass Disc Method) described in ASTM standard C770-16, entitled “Standard Test Method for Measurement of Glass Stress-Optical Coefficient,” the contents of which are incorporated herein by reference in their entirety. Depth of compression (DOC) is measured with the FSM in conjunction with a scatter light polariscope (SCALP) technique known in the art. FSM measures the depth of compression for potassium ion exchange and SCALP measures the depth of compression for sodium ion exchange. The maximum central tension (CT) values are measured using a SCALP technique known in the art.

The phrase “depth of compression” (DOC), as used herein, refers to the position in the article where compressive stress transitions to tensile stress.

In the context of the present disclosure, when a “2 ml” vial is referenced without an ISO 8362-1 standard, the referenced “2 ml” vial is comprises an outer diameter of 16.25 mm, a flange outer diameter of 31 mm, a height of 31 mm, and a conventional wall thickness of 1.2 mm. When a “3 ml” vial is referenced without an ISO 8362-1 standard, the referenced “3 ml” vial is comprises an outer diameter of 16.75 mm, a flange outer diameter of 13.15 mm, a height of 37.7 mm, and a conventional wall thickness of 1.1 mm.

Conventionally, the mechanical properties of a glass container, such as a glass pharmaceutical vial, have been enhanced by adding material to the container—that is by making portions of the container or the entire container thicker—thereby enhancing the ability of the container to withstand mechanical insults (e.g., impacts, drops, abrasions, etc.) without catastrophic failure. However, adding material to the glass container increases the overall cost of the container and may also decrease manufacturing throughput as the addition of glass may lengthen certain forming operations, such as forming the glass container from a glass tube. This can also increase the amount of glass needed to make such containers which decreases manufacturing efficiency and increases shipping costs due to the added weight.

Contrary to the accepted practice of adding material to the container to enhance the mechanical properties of the container, it has now been found that the mechanical properties of the container can be enhanced by actually removing material from certain portions of the container, such as by making the sidewalls of the container thinner relative to glass containers having the same outer diameter. In particular, it has been found that reducing the thickness of the sidewalls of the glass container increases the flexibility of the glass container which, in turn, may make the container better able to withstand certain mechanical insults with reduced risk of breakage. Accordingly, the glass containers described herein, such as the glass pharmaceutical vials described herein, are formed with sidewalls having reduced thickness compared to conventional glass vials with the same outer diameter. For example, reducing the thickness of the sidewalls by 15% or more may result in a glass container with improved mechanical characteristics as well as other practical benefits.

Referring now to FIG. 1, one embodiment of a glass container 100 for storing a pharmaceutical formulation is schematically depicted in cross section. The glass container 100 comprises generally comprises a body 112. The body 112 extends between an inner surface 114 and an outer surface 116, includes a central axis A, and generally encloses an interior volume 118. In the embodiment of the glass container 100 shown in FIG. 1, the body 112 generally comprises a sidewall 120 and a floor portion 122. The sidewall 120 transitions into the floor portion 122 through a heel portion 124. In the depicted embodiment, the glass container 100 includes a flange 126, a neck 128 extending from the flange 126, and a shoulder 130 extending between the neck 128 and the sidewall 120. In embodiments, the glass container 100 is symmetrical about the central axis A, with each of the sidewall 120, neck 128, and flange 126, being substantially cylindrical-shaped. The body 112 has an average wall thickness $T_l$ which extends from the inner surface 114 to the outer surface 116, as depicted in FIG. 1. In embodiments, the average wall thickness $T_l$ of the sidewall 120 and the neck 128 may be the same.

In embodiments, the glass container 100 may be formed from Type I, Type II or Type III glass as defined in USP <660>, including borosilicate glass compositions such as a Type I, Class B glass according to ASTM Standard E438-92. Alternatively, the glass container 100 may be formed from alkali aluminosilicate glass compositions that meet Type I criteria such as those disclosed in U.S. Pat. No. 8,551,898, hereby incorporated by reference in its entirety, and sold by Corning® Incorporated as Valor® Glass, or alkaline earth aluminosilicate glasses such as those described in U.S. Pat. No. 9,145,329, hereby incorporated by reference in its entirety. In embodiments, the glass container 100 may be constructed from a soda lime glass composition. However, it should be understood that the specific type of glass composition from which the glass containers are formed is not particularly limited and that other suitable glass compositions are contemplated.

While the glass container 100 is depicted in FIG. 1 as having a specific form-factor (i.e., a vial), it should be understood that the glass container 100 may have other form factors, including, without limitation, Vacutainers®, cartridges, syringes, ampoules, bottles, flasks, phials, tubes, beakers, or the like. Further, it should be understood that the glass containers described herein may be used for a variety of applications including, without limitation, as pharmaceutical packages, beverage containers, or the like.

Conventionally glass containers (such as glass pharmaceutical vials) have standardized dimensions and fill capacities. For example, ISO 8362-1:2018 entitled "Injection containers and accessories" defines the dimensions for standard sized containers. In particular, ISO 8362-1 describes the sidewall thickness "$s_1$," the outer diameter "$d_1$," and the brimful capacity "$c_1$" of glass vials as indicated in Table 1A below.

TABLE 1A

| Vial Size Designation According to ISO 8362-1(E) | $s_1$ Wall Thickness (mm) | Outer diameter $d_1$ (mm) | Brimful capacity $c_1$ (ml) |
|---|---|---|---|
| 2R | 1.0 ± 0.04 | 16 ± 0.15 | 4 ± 0.5 |
| 3R | 1.0 ± 0.04 | 16 ± 0.15 | 5 ± 0.5 |
| 4R | 1.0 ± 0.04 | 16 ± 0.15 | 6 ± 0.5 |
| 6R | 1.0 ± 0.04 | 22 ± 0.2 | 10 ± 0.5 |
| 8R | 1.0 ± 0.04 | 22 ± 0.2 | 11.5 ± 0.5 |
| 10R | 1.0 ± 0.04 | 24 ± 0.2 | 13.5 ± 1.0 |
| 15R | 1.0 ± 0.04 | 24 ± 0.2 | 19 ± 1.0 |
| 20R | 1.2 ± 0.05 | 30 ± 0.25 | 26 ± 1.5 |
| 25R | 1.2 ± 0.05 | 30 ± 0.25 | 32.5 ± 1.5 |
| 30R | 1.2 ± 0.05 | 30 ± 0.25 | 37.5 ± 1.5 |
| 50R | 1.5 ± 0.07 | 40 ± 0.4 | 62 ± 4.0 |
| 100R | 1.7 ± 0.07 | 47 ± 0.5 | 123 ± 7.0 |

As evident from Table 1A, standardized glass containers are typically provided with characteristic attributes such as outer diameter, inner diameter, wall thickness, and brimful (overflow) capacity, among other characteristic attributes. It has now been discovered that unexpected benefits may be realized by decreasing the wall thickness of a glass container so as to be less than the wall thickness defined by the standard. In particular, benefits arising from decreasing the wall thickness of a standardized glass container may include improved mechanical properties, as noted herein, in addition to benefits associated with manufacturability, chemical durability, thermal properties, inspection-related properties, and sustainability.

In embodiments described herein, the wall thickness of the glass containers is reduced relative to the wall thickness specified in the particular standard, such as the ISO 8362-1 standard referenced herein. However, it should be understood that other standards for glass containers are available from other standards organizations such as, for example the Glass Packaging Institute (GPI). Such standards may be similar to, but deviate from, the ISO 8362-1 standard.

Moreover, pharmaceutical companies may have their own standardized dimensions and other characteristic attributes for glass containers, such as glass pharmaceutical vials. For example, and without limitation, pharmaceutical companies may utilize glass pharmaceutical vials having outer diameters and/or wall thicknesses that are similar to, but deviate from, the same dimensions of a particular standard, such as ISO 8362-1. As an example, a glass pharmaceutical vial that is functionally equivalent to a 2R glass vial under the ISO 8362-1 standard may have a wall thickness of 1.1 mm which is outside of the specified standard for 2R glass vials under the standard. Similarly, a glass pharmaceutical vial that is functionally equivalent to a 2R glass vial under the ISO 8362-1 standard may have an outer diameter of 17 mm which is outside of the specified standard for 2R glass vials under the standard.

Thus, containers deviating from the ISO 8362-1 standard are commercially common. However, such containers may likewise realize benefits from reduced wall thicknesses.

As noted herein, some commercially common glass containers, such as commercially common glass pharmaceutical containers, may have attributes, such as dimensions, different than standardized glass containers for a specific standard. For example, the glass containers may have an attribute that varies from the defined standard by, for example, 2%, 4%, 6%, 8%, 10%, 12%, 14%, or even 16%. Such variations may result in a particular glass container being subject to more than one designation according to a widely-known standard, such as the ISO 8362-1 standard, or outside of any size designation under the standard. For example, a glass container functionally equivalent to a 2R glass container under the ISO 8362-1 standard may have a wall thickness greater than a 2R glass container under the ISO 8362-standard, but retain other characteristics of a 2R glass container under the standard. Similarly, a glass container functionally equivalent to a 2R glass container under the ISO 8362-1 standard may have an outer diameter greater than a 2R glass container under the ISO 8362-standard, but retain other characteristics of a 2R glass container under the standard. Such circumstances may make determination of an appropriate reduced wall thickness difficult. However, the reduced wall thicknesses for such glass containers may be determined by accounting for the deviations from the standard, as described in further detail herein.

With reference to Table 1B below, in embodiments, a reduced average wall thickness $T_l$ for a "non-standard" glass container with attribute variations may be determined by accounting for variations in the outer diameter of the glass container relative to the standard outer diameter $d_1$ of containers defined by ISO 8362-1. In this embodiment, upper and lower bounds for the outer diameter are set based on variations of +/−16% from the standardized outer diameter $d_1$ under ISO 8362-1 (i.e., variations of 84% to 116% of the standardized outer diameter $d_1$). For example, in embodiments, glass containers 100 may have an outer diameter D (FIG. 1) that is equal to 84% to 116% of the outer diameter $d_1$ of a glass vial of size designation X as defined by ISO 8362-1, where X is one of 2R, 3R, 4R, 6R, 8R, 10R, 15R, 20R, 25R, 30R, 50R, and 100R as defined by ISO 8362-1.

TABLE 1B

| ISO 8362-1 Size Designation | Wall Thickness ($s_1$, mm) | Outer Diameter ($d_1$, mm) | Lower OD Bound (84% * $d_1$, mm) | Upper OD Bound (116% * $d_1$, mm) |
|---|---|---|---|---|
| 2R | 1 | 16 | 13.44 | 18.56 |
| 3R | 1 | 16 | 13.44 | 18.56 |
| 4R | 1 | 16 | 13.44 | 18.56 |
| 6R | 1 | 22 | 18.48 | 25.52 |
| 8R | 1 | 22 | 18.48 | 25.52 |
| 10R | 1 | 24 | 20.16 | 27.84 |
| 15R | 1 | 24 | 20.16 | 27.84 |
| 20R | 1.2 | 30 | 25.2 | 34.8 |
| 25R | 1.2 | 30 | 25.2 | 34.8 |
| 30R | 1.2 | 30 | 25.2 | 34.8 |
| 50R | 1.5 | 40 | 33.6 | 46.4 |
| 100R | 1.7 | 47 | 39.48 | 54.52 |

In embodiments, the glass container 100, such as a glass pharmaceutical vial, includes a glass body 112 comprising a sidewall 120 enclosing an interior volume and an outer diameter D, as described herein. The outer diameter D of the glass body 112 is greater than or equal to 84% and less than or equal to 116% of a diameter $d_1$ of a glass vial of size designation X as defined by ISO 8362-1, where X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D. In the sequence of size designations under ISO 8362-1, it is understood that 2R is the smallest size designation, 3R is the next smallest size designation, and so forth, with 100R being the largest size designation in the sequence of 2R to 100R. That is, from a vial size designation perspective, 2R<3R<4R<6R<8R<10R<15R<20R<25R<30R<50R<100R. For these embodiments, the sidewall of the glass pharmaceutical vial comprises an average wall thickness $T_i$ that is less than or equal to $0.85*s_1$, where $s_1$ is a wall thickness of the smallest size designation X for which 116% of the diameter $d_1$ of the size designation is greater than or equal to the outer diameter D of the glass container.

Referring to Table 1B by way of example, a hypothetical glass container that is commercially common but "non-standard" has an outer diameter D of 26 mm. The outer diameter D of 26 mm is within a range from 84% to 116% of the diameter $d_1$ of ISO 8362-1 vial size designations 10R, 15R, 20R, 25R, and 30R. That is, the outer diameter D of 26 mm is within the range of $84\%*d_1$ to $116\%*d_1$ for the 10R and 15R vial size designations (i.e., within the range of 20.16 mm to 27.84 mm) and within the range of $84\%*d_1$ to $116\%*d_1$ for the 20R, 25R, and 30R vial size designations (i.e., within the range of 25.2 mm to 34.8 mm). However, the smallest vial size designation for which 116% of the diameter $d_1$ of the vial size designation is greater than or equal to the outer diameter D is vial size designation 10R (i.e., $116\%*d_1(10R)=27.84$ mm which is greater than or equal to 26 mm). That is, for this example, the smallest vial size designation X=10R. Accordingly, the wall thickness $T_i$ of the hypothetical glass container (with an outer diameter D equal to 26 mm) is less than or equal to $0.85*s_1$, where $s_1$ is the wall thickness of the 10R vial size designation under ISO 8362-1.

Still referring to Table 1B, as another example, a hypothetical glass container that is commercially common but "non-standard" has an outer diameter D of 41 mm. The outer diameter D of 41 mm is within a range from 84% to 116% of the diameter $d_1$ of ISO 8362-1 vial size designations 50R and 100R. That is, the outer diameter D of 41 mm is within the range of $84\%*d_1$ to $116\%*d_1$ for the 50R vial size designation (i.e., within the range of 30.6 mm to 46.4 mm) and within the range of $84\%*d_1$ to $116\%*d_1$ for the 100R vial size designation (i.e., within the range of 39.48 mm to 54.52 mm). However, the smallest vial size designation for which 116% of the diameter $d_1$ of the vial size designation is greater than or equal to the outer diameter D is vial size designation 50R (i.e., $116\%*d_1(50R)=46.4$ mm which is greater than or equal to 41 mm). That is, for this example, the smallest vial size designation X=50R. Accordingly, the wall thickness $T_i$ of the hypothetical glass container (with an outer diameter D equal to 41 mm) is less than or equal to $0.85*s_1$, where $s_1$ is the wall thickness of the 50R vial size designation under ISO 8362-1.

As another example, a hypothetical glass container that is commercially common but "non-standard" has an outer diameter D of 21 mm. The outer diameter D of 21 mm is within a range from 84% to 116% of the diameter $d_1$ of ISO 8362-1 vial size designations 6R, 8R, 10R, and 15R. That is, the outer diameter D of 21 mm is within the range of $84\%*d_1$ to $116\%*d_1$ for the 6R and 8R vial size designations (i.e., within the range of 18.48 mm to 25.52 mm) and within the range of $84\%*d_1$ to $116\%*d_1$ for the 10R and 15R vial size designations (i.e., within the range of 20.16 mm to 27.84 mm). However, the smallest vial size designation for which 116% of the diameter $d_1$ of the vial size designation is greater than or equal to the outer diameter D is vial size designation 6R (i.e., $116\%*d_1(6R)=25.52$ mm which is greater than or equal to 21 mm). That is, for this example, the smallest vial size designation X=6R. Accordingly, the wall thickness $T_i$ of the hypothetical glass container (with an outer diameter D equal to 21 mm) is less than or equal to $0.85*s_1$, where $s_1$ is the wall thickness of the 6R vial size designation under ISO 8362-1.

In embodiments, in which the outer diameter D of the glass body 112 is greater than or equal to 84% and less than or equal to 116% of a diameter $d_1$ of a glass vial of size designation X as defined by ISO 8362-1, where X is the smallest vial size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D, the sidewall of the glass pharmaceutical vial comprises an average wall thickness $T_i$ that is less than or equal to $0.85*s_1$, where $s_1$ is a wall thickness of the smallest size designation X for which 116% of the diameter $d_1$ is greater than or equal to the outer diameter D of the glass pharmaceutical vial. In embodiments, the sidewall of the glass pharmaceutical vial comprises an average wall thickness $T_i$ that is less than or equal to $0.7*s_1$, where $s_1$ is a wall thickness of the smallest size designation X for which 116% of the diameter $d_1$ is greater than or equal to the outer diameter D of the glass pharmaceutical vial. In embodiments, the sidewall of the glass pharmaceutical vial comprises an average wall thickness $T_i$ that is less than or equal to $0.6*s_1$, where $s_1$ is a wall thickness of the smallest size designation X for which 116% of the diameter $d_1$ is greater than or equal to the outer diameter D of the glass pharmaceutical vial. In embodiments, the sidewall of the glass pharmaceutical vial comprises an average wall thickness $T_i$ that is less than or equal to $0.5*s_1$, where $s_1$ is a wall thickness of the smallest size designation X for which 116% of the diameter $d_1$ is greater than or equal to the outer diameter D of the glass pharmaceutical vial. In embodiments, the sidewall of the glass pharmaceutical vial comprises an average wall thickness $T_i$ that is less than or equal to $0.4*s_1$, where $s_1$ is a wall thickness of the smallest size designation X for which 116% of the diameter $d_1$ is greater than or equal to the outer diameter D of the glass pharmaceutical vial. In embodiments, the sidewall of the glass pharmaceutical vial comprises an average wall thickness $T_i$ that is less than or equal to $0.3*s_1$, where $s_1$ is a wall thickness of the smallest size designation X for which 116% of the diameter $d_1$ is greater than or equal to the outer diameter D of the glass pharmaceutical vial.

In embodiments, the glass container 100, such as a glass pharmaceutical vial, includes a glass body 112 comprising a sidewall 120 enclosing an interior volume and an outer diameter D, as described herein. The outer diameter D of the glass body 112 is greater than or equal to 84% and less than or equal to 116% of a diameter $d_1$ of a glass vial of size designation X as defined by ISO 8362-1, where X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D. In the sequence of size designations under ISO 8362-1, it is understood that 2R is the smallest size designation, 3R is the next smallest size designation, and so forth, with 100R being the largest size designation in the sequence of 2R to 100R. That is, from a vial size designation perspective, 2R<3R<4R<6R<8R<10R<15R<20R<25R<30R<50R<100R. For these embodiments, the sidewall of the glass pharmaceutical vial comprises an average wall thickness $T_i$ that is less than or equal to $0.85*s_1$, where $s_1$ is a wall thickness of the smallest size designation X for which the diameter $d_1$ of the size designation is greater than or equal to the outer diameter D of the glass container.

Referring to Table 1B by way of example, a hypothetical glass container that is commercially common but "non-standard" has an outer diameter D of 26 mm. The outer diameter D of 26 mm is within a range from 84% to 116% of the diameter $d_1$ of ISO 8362-1 vial size designations 10R, 15R, 20R, 25R, and 30R. That is, the outer diameter D of 26 mm is within the range of $84\%*d_1$ to $116\%*d_1$ for the 10R and 15R vial size designations (i.e., within the range of 20.16 mm to 27.84 mm) and within the range of $84\%*d_1$ to $116\%*d_1$ for the 20R, 25R, and 30R vial size designations (i.e., within the range of 25.2 mm to 34.8 mm). However, the smallest vial size designation for which the diameter $d_1$ of the vial size designation is greater than or equal to the outer diameter D is vial size designation 20R (i.e., $d_1$(20R)=30 mm which is greater than or equal to 26 mm). That is, for this example, the smallest vial size designation X=20R. Accordingly, the wall thickness $T_i$ of the hypothetical glass container (with an outer diameter D equal to 26 mm) is less than or equal to $0.85*s_1$, where $s_1$ is the wall thickness of the 20R vial size designation under ISO 8362-1.

Still referring to Table 1B, as another example, a hypothetical glass container that is commercially common but "non-standard" has an outer diameter D of 41 mm. The outer diameter D of 41 mm is within a range from 84% to 116% of the diameter $d_1$ of ISO 8362-1 vial size designations 50R and 100R. That is, the outer diameter D of 41 mm is within the range of $84\%*d_1$ to $116\%*d_1$ for the 50R vial size designation (i.e., within the range of 30.6 mm to 46.4 mm) and within the range of $84\%*d_1$ to $116\%*d_1$ for the 100R vial size designation (i.e., within the range of 39.48 mm to 54.52 mm). However, the smallest vial size designation for which the diameter $d_1$ of the vial size designation is greater than or equal to the outer diameter D is vial size designation 100R (i.e., $d_1$(100R)=47 mm which is greater than or equal to 41 mm). That is, for this example, the smallest vial size designation X=100R. Accordingly, the wall thickness $T_i$ of the hypothetical glass container (with an outer diameter D equal to 41 mm) is less than or equal to $0.85*s_1$, where $s_1$ is the wall thickness of the 100R vial size designation under ISO 8362-1.

As another example, a hypothetical glass container that is commercially common but "non-standard" has an outer diameter D of 21 mm. The outer diameter D of 21 mm is within a range from 84% to 116% of the diameter $d_1$ of ISO 8362-1 vial size designations 6R, 8R, 10R, and 15R. That is, the outer diameter D of 21 mm is within the range of $84\%*d_1$ to $116\%*d_1$ for the 6R and 8R vial size designations (i.e., within the range of 18.48 mm to 25.52 mm) and within the range of $84\%*d_1$ to $116\%*d_1$ for the 10R and 15R vial size designations (i.e., within the range of 20.16 mm to 27.84 mm). However, the smallest vial size designation for which the diameter $d_1$ of the vial size designation is greater than or equal to the outer diameter D is vial size designation 6R (i.e., $d_1$(6R)=22 mm which is greater than or equal to 21 mm). That is, for this example, the smallest vial size designation X=6R. Accordingly, the wall thickness $T_i$ of the hypothetical glass container (with an outer diameter D equal to 21 mm) is less than or equal to $0.85*s_1$, where $s_1$ is the wall thickness of the 6R vial size designation under ISO 8362-1.

In embodiments, in which the outer diameter D of the glass body 112 is greater than or equal to 84% and less than or equal to 116% of a diameter $d_1$ of a glass vial of size designation X as defined by ISO 8362-1, where X is the smallest vial size designation of 2R, 3R, 4R, 6R, 8R, 10R, 15R, 20R, 25R, 30R, 50R, and 100R, as defined by ISO 8362-1, for which the diameter $d_1$ is greater than or equal to D, the sidewall of the glass pharmaceutical vial comprises an average wall thickness $T_i$ that is less than or equal to $0.85*s_1$, where $s_1$ is a wall thickness of the smallest size designation X for which the diameter $d_1$ is greater than or equal to the outer diameter D of the glass pharmaceutical vial. In embodiments, the sidewall of the glass pharmaceutical vial comprises an average wall thickness $T_i$ that is less than or equal to $0.7*s_1$, where $s_1$ is a wall thickness of the smallest size designation X for which the diameter $d_1$ is greater than or equal to the outer diameter D of the glass pharmaceutical vial. In embodiments, the sidewall of the glass pharmaceutical vial comprises an average wall thickness $T_i$ that is less than or equal to $0.6*s_1$, where $s_1$ is a wall thickness of the smallest size designation X for which the diameter $d_1$ is greater than or equal to the outer diameter D of the glass pharmaceutical vial. In embodiments, the sidewall of the glass pharmaceutical vial comprises an average wall thickness $T_i$ that is less than or equal to $0.5*s_1$, where $s_1$ is a wall thickness of the smallest size designation X for which the diameter $d_1$ is greater than or equal to the outer diameter D of the glass pharmaceutical vial. In embodiments, the sidewall of the glass pharmaceutical vial comprises an average wall thickness $T_i$ that is less than or equal to $0.4*s_1$, where $s_1$ is a wall thickness of the smallest size designation X for which the diameter $d_1$ is greater than or equal to the outer diameter D of the glass pharmaceutical vial. In embodiments, the sidewall of the glass pharmaceutical vial comprises an average wall thickness $T_i$ that is less than or equal to $0.3*s_1$, where $s_1$ is a wall thickness of the smallest size designation X for which the diameter $d_1$ is greater than or equal to the outer diameter D of the glass pharmaceutical vial.

In embodiments, the glass container 100 is a glass pharmaceutical vial having an outer diameter D from 13.44 mm to 18.56 mm, and a sidewall having an average sidewall thickness less than or equal to 0.85 mm, less than or equal to 0.7 mm, less than or equal to 0.6 mm, less than or equal to 0.5 mm, less than or equal to 0.4 mm, or even less than or equal to 0.3 mm.

In embodiments, the glass container 100 is a glass pharmaceutical vial having an outer diameter D from 18.48 mm to 25.52 mm, and a sidewall having an average sidewall thickness less than or equal to 0.85 mm, less than or equal to 0.7 mm, less than or equal to 0.6 mm, less than or equal to 0.5 mm, less than or equal to 0.4 mm, or even less than or equal to 0.3 mm.

In embodiments, the glass container 100 is a glass pharmaceutical vial having an outer diameter D from 20.16 mm to 27.84 mm, and a sidewall having an average sidewall thickness less than or equal to 0.85 mm, less than or equal to 0.7 mm, less than or equal to 0.6 mm, less than or equal to 0.5 mm, less than or equal to 0.4 mm, or even less than or equal to 0.3 mm.

In embodiments, the glass container 100 is a glass pharmaceutical vial having an outer diameter D from 25.2 mm to 34.8 mm, and a sidewall having an average sidewall thickness less than or equal to 1.02 mm, less than or equal to 0.84 mm, less than or equal to 0.72 mm, less than or equal to 0.6 mm, less than or equal to 0.48 mm, or even less than or equal to 0.36 mm.

In embodiments, the glass container 100 is a glass pharmaceutical vial having an outer diameter D from 33.6 mm to 46.4 mm, and a sidewall having an average sidewall thickness less than or equal to 1.275 mm, less than or equal to 1.05 mm, less than or equal to 0.9 mm, less than or equal to 0.75 mm, less than or equal to 0.6 mm, or even less than or equal to 0.45 mm.

In embodiments, the glass container 100 is a glass pharmaceutical vial having an outer diameter D from 39.48 mm to 54.52 mm, and a sidewall having an average sidewall thickness less than or equal to 1.445 mm, less than or equal to 1.19 mm, less than or equal to 1.02 mm, less than or equal to 0.85 mm, less than or equal to 0.68 mm, or even less than or equal to 0.51 mm.

In other embodiments, the glass containers 100 have an outer diameter D (FIG. 1) that is equal to the outer diameter $d_1$ of a glass vial of size X as defined by ISO 8362-1, where X is one of 2R, 3R, 4R, 6R, 8R, 10R, 15R, 20R, 25R, 30R, 50R, and 100R as defined by ISO 8362-1.

However, the thickness $T_i$ of the sidewall 120 of the glass containers 100 described herein may be less than the thickness $s_1$ of a container having the same outer diameter under ISO 8362-1. In embodiments, the sidewall of the glass pharmaceutical vials described herein have an average wall thickness $T_i$ that is less than $s_1$, where $s_1$ is a wall thickness of the glass vial of size X as defined by ISO 8362-1 and X is one of a size designation of 2R, 3R, 4R, 6R, 8R, 10R, 15R, 20R, 25R, 30R, 50R, and 100R as defined by ISO 8362-1. For example, a glass container having an outer diameter D equal to the outer diameter $d_1$ of a container having a size designation of 2R under ISO 8362-1 has an average sidewall thickness $T_i$ that is less than $s_1$ of a container having a size designation of 2R under ISO 8362-1 (i.e., $T_i<1.0\pm0.04$). In embodiments, the sidewall of the glass container has an average wall thickness $T_i$ of less than or equal to $0.85*s_1$, wherein $s_1$ is a wall thickness of the glass vial of size X as defined by ISO 8362-1. In embodiments, the sidewall of the glass container has an average wall thickness $T_i$ of less than or equal to $0.7*s_1$, wherein $s_1$ is a wall thickness of the glass vial of size X as defined by ISO 8362-1. In embodiments, the sidewall of the glass container has an average wall thickness $T_i$ of less than or equal to $0.6*s_1$, wherein $s_1$ is a wall thickness of the glass vial of size X as defined by ISO 8362-1. In embodiments, the sidewall of the glass container has an average wall thickness $T_i$ of less than or equal to $0.5*s_1$, wherein $s_1$ is a wall thickness of the glass vial of size X as defined by ISO 8362-1. In embodiments, the sidewall of the glass container has an average wall thickness $T_i$ of less than or equal to $0.4*s_1$, wherein $s_1$ is a wall thickness of the glass vial of size X as defined by ISO 8362-1. In embodiments, the sidewall of the glass container has an average wall thickness $T_i$ of less than or equal to $0.3*s_1$, wherein $s_1$ is a wall thickness of the glass vial of size X as defined by ISO 8362-1.

In embodiments, the glass container 100 is a glass pharmaceutical vial having a size of 2R, an outer diameter D equal to 16 mm±0.15 mm, and a sidewall having an average sidewall thickness less than or equal to 0.85 mm, less than or equal to 0.7 mm, less than or equal to 0.6 mm, less than or equal to 0.5 mm, less than or equal to 0.4 mm, or even less than or equal to 0.3 mm.

In embodiments, the glass container 100 is a glass pharmaceutical vial having a size of 3R, an outer diameter D equal to 16 mm±0.15 mm, and a sidewall having an average sidewall thickness less than or equal to 0.85 mm, less than or equal to 0.7 mm, less than or equal to 0.6 mm, less than or equal to 0.5 mm, less than or equal to 0.4 mm, or even less than or equal to 0.3 mm.

In embodiments, the glass container 100 is a glass pharmaceutical vial having a size of 4R, an outer diameter D equal to 16 mm±0.15 mm, and a sidewall having an average sidewall thickness less than or equal to 0.85 mm, less than or equal to 0.7 mm, less than or equal to 0.6 mm, less than or equal to 0.5 mm, less than or equal to 0.4 mm, or even less than or equal to 0.3 mm.

In embodiments, the glass container 100 is a glass pharmaceutical vial having a size of 6R, an outer diameter D equal to 22 mm±0.2 mm, and a sidewall having an average sidewall thickness less than or equal to 0.85 mm, less than or equal to 0.7 mm, less than or equal to 0.6 mm, less than or equal to 0.5 mm, less than or equal to 0.4 mm, or even less than or equal to 0.3 mm.

In embodiments, the glass container 100 is a glass pharmaceutical vial having a size of 8R, an outer diameter D equal to 22 mm±0.2 mm, and a sidewall having an average sidewall thickness less than or equal to 0.85 mm, less than or equal to 0.7 mm, less than or equal to 0.6 mm, less than or equal to 0.5 mm, less than or equal to 0.4 mm, or even less than or equal to 0.3 mm.

In embodiments, the glass container 100 is a glass pharmaceutical vial having a size of 10R, an outer diameter D equal to 24 mm±0.2 mm, and a sidewall having an average sidewall thickness less than or equal to 0.85 mm, less than or equal to 0.7 mm, less than or equal to 0.6 mm, less than or equal to 0.5 mm, less than or equal to 0.4 mm, or even less than or equal to 0.3 mm.

In embodiments, the glass container 100 is a glass pharmaceutical vial having a size of 15R, an outer diameter D equal to 24 mm±0.2 mm, and a sidewall having an average sidewall thickness less than or equal to 0.85 mm, less than or equal to 0.7 mm, less than or equal to 0.6 mm, less than or equal to 0.5 mm, less than or equal to 0.4 mm, or even less than or equal to 0.3 mm.

In embodiments, the glass container 100 is a glass pharmaceutical vial having a size of 20R, an outer diameter D equal to 30 mm±0.25 mm, and a sidewall having an average sidewall thickness less than or equal to 1.02 mm, less than or equal to 0.84 mm, less than or equal to 0.72 mm, less than or equal to 0.6 mm, less than or equal to 0.48 mm, or even less than or equal to 0.36 mm.

In embodiments, the glass container 100 is a glass pharmaceutical vial having a size of 25R, an outer diameter D equal to 30 mm±0.25 mm, and a sidewall having an average sidewall thickness less than or equal to 1.02 mm, less than or equal to 0.84 mm, less than or equal to 0.72 mm, less than or equal to 0.6 mm, less than or equal to 0.48 mm, or even less than or equal to 0.36 mm.

In embodiments, the glass container 100 is a glass pharmaceutical vial having a size of 30R, an outer diameter D equal to 30 mm±0.25 mm, and a sidewall having an average sidewall thickness less than or equal to 1.02 mm, less than or equal to 0.84 mm, less than or equal to 0.72 mm, less than or equal to 0.6 mm, less than or equal to 0.48 mm, or even less than or equal to 0.36 mm.

In embodiments, the glass container 100 is a glass pharmaceutical vial having a size of 50R, an outer diameter D equal to 40 mm±0.4 mm, and a sidewall having an average sidewall thickness less than or equal to 1.275 mm, less than or equal to 1.05 mm, less than or equal to 0.9 mm, less than or equal to 0.75 mm, less than or equal to 0.6 mm, or even less than or equal to 0.45 mm.

In embodiments, the glass container 100 is a glass pharmaceutical vial having a size of 100R, an outer diameter D equal to 47 mm±0.5 mm, and a sidewall having an average sidewall thickness less than or equal to 1.445 mm, less than or equal to 1.19 mm, less than or equal to 1.02 mm, less than or equal to 0.85 mm, less than or equal to 0.68 mm, or even less than or equal to 0.51 mm.

Chemical Strengthening

As noted herein, the glass containers may be chemically strengthened by an ion exchange process. In embodiments, chemically strengthened glass containers 100 with thinner sidewalls may provide for enhanced reliability. In particular, spoliation of product contained within the glass containers may occur when a through crack occurs without catastrophic failure of the container. However, with decreased sidewall thickness, the central tension installed during the chemical strengthening process may be increased. The relatively higher central tension, coupled with reduced thickness, encourages crack bifurcation and separation of the vial into multiple pieces (such as 5 or more) upon crack initiation compared to glass containers with greater wall thicknesses. Enhanced crack bifurcation and separation encourages container "self-elimination" upon development of a through crack and reduces the likelihood of delayed crack propagation, thereby avoiding the risk of product spoliation in an intact, but otherwise hermetically compromised, glass container.

Further, when glass containers 100 with thinner sidewalls are chemically strengthened, the process of chemical strengthening to a desired surface compressive stress and depth of compression may occur more quickly as a result of the glass containers having a reduced fictive temperature, thereby reducing the time and/or temperature necessary to achieve the desired properties. This may improve the throughput of the chemical strengthening process and/or reduce the cost of the chemical strengthening process.

In embodiments, the glass containers may have compressive stress layers which extend from the surface of the glass container into the thickness of the glass to a depth of compression greater than or equal to 25 μm or even greater than or equal to 35 μm. In some embodiments, the depth of compression may be greater than or equal to 40 μm or even greater than or equal to 50 μm. The surface compressive stress of the glass article may be greater than or equal to 250 MPa, greater than or equal to 350 MPa, or even greater than or equal to 400 MPa. The depths of compression (i.e., greater than or equal to 25 μm) and the compressive stresses (i.e., greater than or equal to 250 MPa) may be achieved by ion exchanging the glass article in a molten salt bath of 100% $KNO_3$ (or a mixed salt bath of $KNO_3$ and $NaNO_3$) for a time period of less than or equal to 5 hours, or even less than or equal to 4.5 hours, at a temperature less than or equal to 500° C. or even less than or equal to 450° C. In some embodiments, the time period for achieving these depths of compression and compressive stresses may be less than or equal to 4 hours or even less than or equal to 3.5 hours. The temperature for achieving these depths of compression and compressive stresses may be less than or equal to 400° C. or even less than or equal to 350° C.

Coatings

In embodiments, the glass container 100 may include a coating disposed on at least a portion of the outer surface 116 of the glass body 112. In embodiments, the coating may be a heat tolerant coating disclosed in U.S. Pat. No. 10,273,049, hereby incorporated by reference in its entirety. In embodiments, the coating may be an organic coating as described in U.S. Pat. No. 9,763,852, hereby incorporated by reference in its entirety. However, it should be understood that other coatings (both organic and inorganic) are contemplated and possible.

Figure 2:
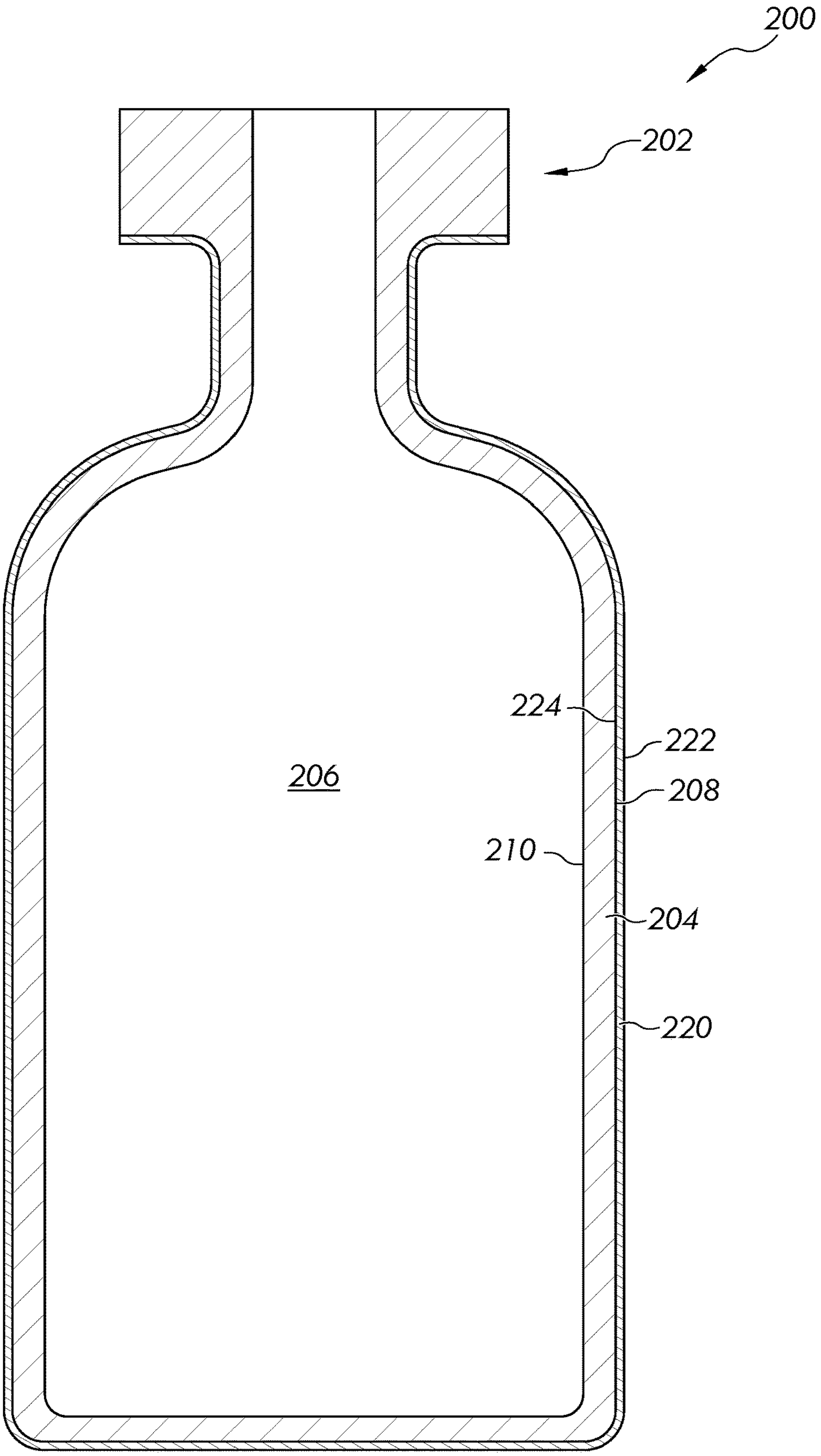
FIG. 2 schematically depicts a cross section of a glass container with a low-friction coating, according to one or more embodiments shown and described herein.

FIG. 2 schematically depicts a cross section of a coated glass article, specifically a coated glass container 200. The coated glass container 200 comprises a glass body 202 and a low-friction coating 220. The glass body 202 has a glass container wall 204 extending between an exterior surface 208 (i.e., a first surface) and an interior surface 210 (i.e., a second surface). The interior surface 210 of the glass container wall 204 defines an interior volume 206 of the coated glass container 200. A low-friction coating 220 is positioned on at least a portion of the exterior surface 208 of the glass body 202. In some embodiments, the low-friction coating 220 may be positioned on substantially the entire exterior surface 208 of the glass body 202. The low-friction coating 220 has an outer surface 222 and a glass body contacting surface 224 at the interface of the glass body 202 and the low-friction coating 220. The low-friction coating 220 may be bonded to the glass body 202 at the exterior surface 208.

In embodiments, a coating of inorganic material, such as titania, is applied to at least a portion of the outer surface of the glass body either by soot deposition or by a vapor deposition process. The titania coating has a lower coefficient of thermal expansion than the glass it is being deposited on. As the coating and the glass cool, the titania shrinks less than the glass and, as a result, the surface of the glass body is in tension. In these embodiments, it should be understood that the surface compressive stress and depth of layer are measured from the surface of the coating rather than the surface of the coated glass container. While the inorganic coating material has been described herein as comprising titania, it should be understood that other inorganic coating materials with suitably low coefficients of thermal expansion are also contemplated. In embodiments, the inorganic coating may have a coefficient of friction of less than 0.7 relative to a like coated container. The inorganic coating may also be thermally stable at temperatures greater than or equal to 250° C., as described further herein.

In embodiments, the glass container can be strengthened by the glass container with a high modulus coating having a coefficient of thermal expansion equal to or greater than the underlying glass container. Strengthening is achieved by the difference in elastic modulus imparting damage resistance while the difference in thermal expansion imparts a compressive stress in the glass surface (balancing tension in the high modulus coating). In these embodiments, it should be understood that the surface compressive stress and depth of layer are measured from the surface of the glass container rather than the surface of the coated glass container. The high modulus makes it difficult for scratches and damage to be introduced and the underlying compressive layer prevents scratches and flaws from propagating. An exemplary material pairing to demonstrate this effect is a sapphire coating on 33 expansion borosilicate glass or a zirconium oxide coating deposited on 51 expansion borosilicate glass.

Based on the foregoing, it should be understood that, in embodiments, the glass containers may include a compressively stressed layer which extends from at least the outer surface of the body into the wall thickness of the glass container. The compressively stressed layer improves the mechanical strength of the glass container relative to a glass container which does not include a compressively stressed layer. The compressively stressed layer also improves the damage tolerance of the glass container such that the glass container is able to withstand greater surface damage (i.e., scratches, chips, etc., which extend deeper into the wall thickness of the glass container) without failure relative to a glass container which does not include a compressively stressed layer. Further, it should also be understood that, in these embodiments, the compressively stressed layer may be formed in the glass container by ion exchange, by thermal tempering, by forming the glass container from laminated glass, or by applying a coating to the glass container. In some embodiments, the compressively stressed layer may be formed by a combination of these techniques.

As hereinafter discussed in more detail, a coated thin wall glass container may offer benefits related to manufacturing as well as the mechanical performance of the glass container. In some embodiments, the glass containers are subject to a convert-to-coat process wherein the converted glass containers are immediately subject to a coating process, such as those disclosed in U.S. Pat. Nos. 10,273,049 and 9,763,852. Such a process mitigates or prevents the introduction of flaws in the thin wall of the glass container, thereby enhancing the mechanical performance of the glass container.

In embodiments of glass containers described herein and comprising a coating, the coating may be an organic coating applied to the glass container according to the following procedure. The glass containers are washed with deionized water, blown dry with nitrogen, and dip coated with a 0.1% solution of APS (aminopropylsilsesquioxane) which may enhance coupling of the coating to the glass (i.e., the APS is a "coupling agent layer"). The APS coating is dried at 100° C. in a convection oven for 15 minutes. A polymer layer, such a polymer precursor layer, is then applied to the glass container. In embodiments, the polymer precursor layer may be a polyimide precursor layer. In embodiments, the polymer layer is applied to the glass containers by dip coating, spray coating, or the like. For example, in embodiments, the glass containers may be dipped into a 0.1% solution of Novastrat® 800 polyamic acid in a 15/85 toluene/DMF solution or in a 0.1% to 1% poly(pyromellitic dianhydride-co-4,4'-oxydianiline) amic acid solution (Kapton precursor) in N-Methyl-2-pyrrolidone (NMP). In examples of coated glass containers described herein, the coating was formed from 0.1% to 1% poly(pyromellitic dianhydride-co-4,4'-oxydianiline) amic acid solution in N-Methyl-2-pyrrolidone (NMP). The coated glass container may then be heated to 150° C. and held for 20 minutes to evaporate the solvents. Thereafter, the coatings may be cured by placing the coated glass containers into a preheated furnace at 300° C. for 30 minutes thereby forming a glass container with a low-friction, thermally stable polymer coating, specifically a low-friction, thermally stable polyimide coating. However, it is to be understood that other coating compositions and application methods could be utilized with the thin wall glass containers of the present disclosure. For example and without limitation, in embodiments, the coating need not contain a coupling agent layer. As another example, the coating need not contain a separate coupling agent layer, such as embodiments where the coupling agent and polymer layer are applied in a single layer.

In embodiments, the low-friction coating may be relatively thin. For example, and without limitation, the low-friction coating may have a thickness of less than or equal to about 1 μm. In some embodiments, the thickness of the low-friction coating may be less than or equal to about 100 nm thick. In other embodiments, the low-friction coating may be less than about 90 nm thick, less than about 80 nm thick, less than about 70 nm thick, less than about 60 nm thick, less than about 50 nm, or even less than about 25 nm thick. In embodiments, the low-friction coating may have a thickness greater than or equal to 10 nm, and less than or equal to 100 nm, greater than or equal to 10 nm and less than or equal to 90 nm, greater than or equal to 10 nm and less than or equal to 80 nm, greater than or equal to 10 nm, and less than or equal to 70 nm, greater than or equal to 10 nm and less than or equal to 60 nm, greater than or equal to 10 nm and less than or equal to 50 nm, greater than or equal to 10 nm and less than or equal to 40 nm, greater than or equal to 10 nm and less than or equal to 30 nm, greater than or equal to 10 nm and less than or equal to 25 nm, or even greater than or equal to 10 nm and less than or equal to 20 nm, or any range or sub-range formed from any of these endpoints. In embodiments, the low-friction coating may have a thickness greater than or equal to 20 nm and less than or equal to 100 nm, greater than or equal to 20 nm and less than or equal to 90 nm, greater than or equal to 20 nm and less than or equal to 80 nm, greater than or equal to 20 nm and less than or equal to 70 nm, greater than or equal to 20 nm and less than or equal to 60 nm, greater than or equal to 20 nm and less than or equal to 50 nm, greater than or equal to 20 nm and less than or equal to 40 nm, greater than or equal to 20 nm and less than or equal to 30 nm, or even greater than or equal to 20 nm and less than or equal to 25 nm, or any range or sub-range formed from any of these endpoints. In examples of coated glass containers described herein, the coating had a thickness in the range from 20 nm to 40 nm. Use of such a relatively thin coating in combination with sidewall of reduced thickness as disclosed herein facilitates particular and surprising mechanical and performance benefits (e.g., compliance, impact, horizontal/vertical compression, freeze-thaw, etc.) as further evidenced and explained herein.

The coated glass containers described herein may be thermally stable after heating to a temperature of at least 260° C. for a time period of 30 minutes. The phrase "thermally stable," as used herein, means that the low friction coating applied to the glass article remains substantially intact on the surface of the glass article after exposure to the elevated temperatures such that, after exposure, the mechanical properties of the coated glass article, specifically the coefficient of friction and the horizontal compression strength, are only minimally affected, if at all, as described in U.S. Pat. No. 9,763,852. This indicates that the low friction coating remains adhered to the surface of the glass following elevated temperature exposure and continues to protect the glass article from mechanical insults such as abrasions, impacts and the like.

Reduced Volume Flange

In embodiments, the glass container 100 is formed with a region having a reduced glass volume relative to the same region of a standardized glass container of the same type and size. For example, the flange 126 of the glass container 100 of size X may be modified so as to comprise less volume than a flange of a glass vial of size X as defined by ISO 8362-1 where X is one of a size designation of 2R, 3R, 4R, 6R, 8R, 10R, 15R, 20R, 25R, 30R, 50R, and 100R. Such flanges are described in, for example and without limitation, U.S. Provisional Patent Application No. 63/277,488, the entirety of which is incorporated by reference herein. In addition to requiring the use of less glass, a glass container comprising a modified flange region may offer functional benefits. For example, a modified flange allow for an improved sealing mechanism for vials subjected to relatively low storage temperatures.

Glass containers used for the storage of pharmaceutical compositions, such as vials and syringes, are typically sealed via a stopper or other closure to preserve the integrity of the contained material. Closures are typically made of synthetic rubbers and other elastomers. Such materials beneficially have high permeation resistance and elasticity to facilitate insertion into the container to seal the container's interior. The elasticity of typically-used closure materials, however, may reduce at low temperatures. For example, synthetic rubbers currently in use as material closures may comprise transition temperatures that are greater than or equal to −70° C. and less than or equal to −10° C. Below the transition temperature, closures constructed of such synthetic rubbers may behave as a solid and be unable to expand elastically to compensate for the relatively large difference between coefficients of thermal expansion of the glass and a crimping cap used to secure the closure to the container. Given this, existing sealing assemblies for pharmaceutical containers may fail at temperatures less than or equal to −20° C. The glass container and sealing assembly described below comprises a reduced volume flange and improved functionality in cold storage applications.

Figure 3:
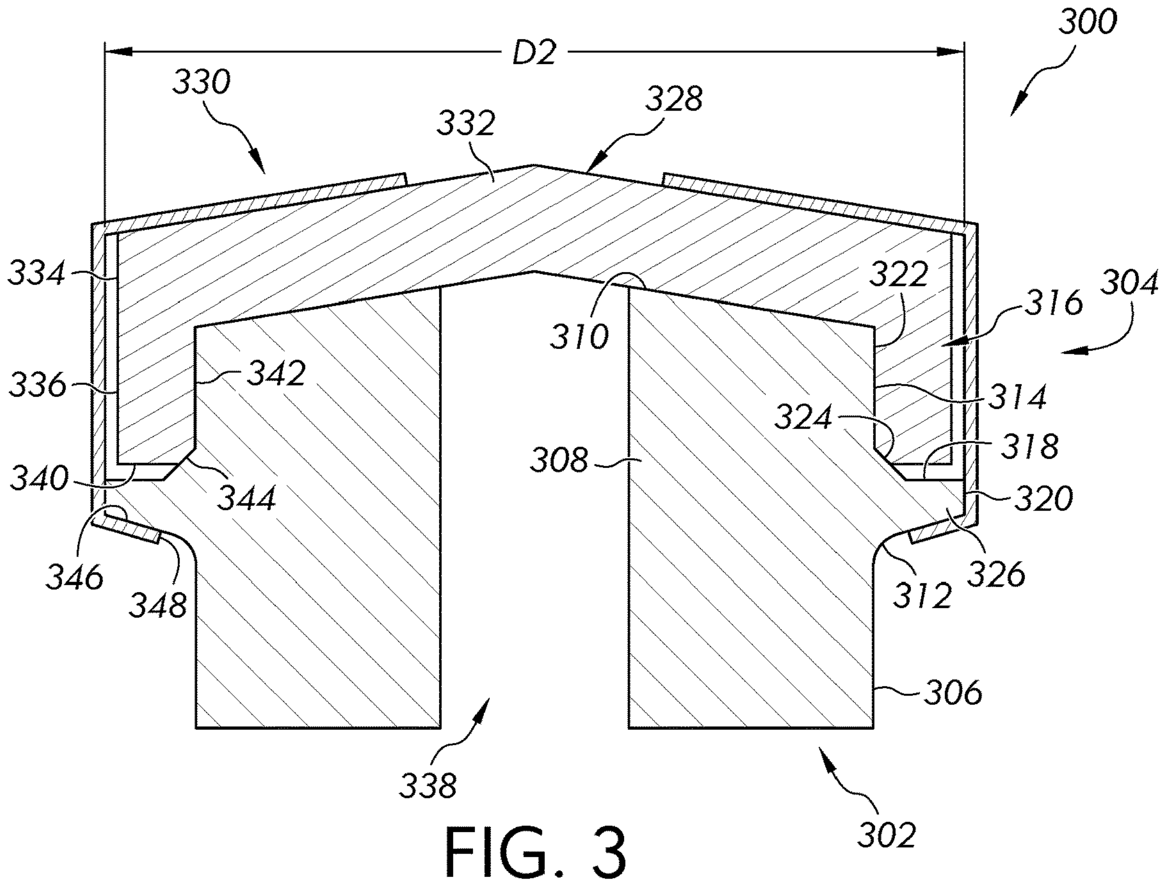
FIG. 3 schematically depicts a partial cross-sectional view of another embodiment of a pharmaceutical container, according to one or more embodiments shown and described herein.

Referring now to FIG. 3, an embodiment of a glass container 300 is illustrated including a glass container 302 and a sealing assembly 304. Although not described in detail herein, the glass container 302 and the sealing assembly 304 may include similar structure and features to the glass container 100 described herein and illustrated FIG. 1. As shown in FIG. 3, the glass container 302 includes a neck 306 extending to a flange 308 defined by an upper sealing surface 310, an underside surface 312, and an outer surface 314. As shown in FIG. 3, the outer surface 314 of the flange 308 is radially recessed inwardly defining a cutout portion 316 of the flange 308. The outer surface 314 of the flange 308 includes an upperside surface portion 318 opposite the underside surface 312 and extending from an outermost edge 320 of the flange 308, and a vertical surface portion 322. The vertical surface portion 322 extends from a joining surface portion 324 at the upperside surface portion 318 to the upper sealing surface 310. In embodiments, the vertical surface portion 322 extends perpendicular to the upperside surface portion 318. In embodiments, the joining surface portion 324 extending between the upperside surface portion 318 and the vertical surface portion 322 forms a chamfer. The upperside surface portion 318, the outermost edge 320, and the underside surface 312 of the flange 308 cooperate to define a ledge 326. In embodiments, it should be noted that no sharp corners will be provided on the sealing assembly 304 and, rather, any angular surfaces should be chamfered or rounded to avoid stress concentration.

In embodiments, the sealing assembly 304 includes a stopper 328 and a metal-containing cap 330. However, it should be appreciated that, in embodiments, the metal-containing cap 330 may not be provided. The stopper 328 includes a sealing portion 332 terminating at an outer edge 334 and a rim 336 extending from the outer edge 334 of the sealing portion 332. The sealing portion 332 has an outer diameter D2 defined by a distance between the outer edge 334 of the sealing portion 332. When the stopper 328 is positioned on the glass container 302, the sealing portion 332 extends over the upper sealing surface 310 of the flange 308 and covers an opening 338 formed in the glass container 302. The rim 336 extends from the outer edge 334 of the sealing portion 332 and at least partially along the outer surface 314 of the flange 308. As shown in FIG. 3, the rim 336 includes a bottom surface 340 which forms a gap between the upperside surface portion 318 of the flange 308, an inner surface 342 that contacts the vertical surface portion 322 of the flange 308, and a joining surface portion 344 extending between the bottom surface 340 of the rim 336 and the inner surface 342 of the rim 336. The bottom surface 340, the inner surface 342, and the joining surface portion 344 of the rim 336 are received within the cutout portion 316 of the flange 308. In embodiments in which the joining surface portion 324 of the flange 308 forms a chamfer, the joining surface portion 344 of the rim 336 also forms a chamfer so as to nest with one another. In embodiments in which the metal-containing cap 330 is provided, the ledge 326 is provided between the bottom surface 340 of the rim 336 and an inner surface 346 of the metal-containing cap 330, specifically, an underlying portion 348 of the metal-containing cap 330, which extends radially inwardly along the underside surface 312 of the flange 308 and toward to the neck 306. As such, the ledge 326 of the flange 308 separates the rim 336 of the stopper 328 from the underlying portion 348 of the metal-containing cap 330.

It should be appreciated that when the glass container 300 is subjected to relatively low storage temperatures, as discussed above, the coefficient of thermal expansion of the stopper 328 being greater than the coefficient of thermal expansion of the glass container 302 causes the rim 336 of the stopper 328 to shrink around and toward the flange 308 of the glass container 302, thus increasing the seal formed between the stopper 328 and the flange 308 of the glass container 302. More particularly, the sealing portion 332 of the stopper 328 shrinks during relatively low storage temperatures such that the outer diameter D2 between the outer edge 334 of the sealing portion 332 is reduced, which results in the rim 336 becoming tighter around the outer surface 314 of the flange 308.

Figure 4:
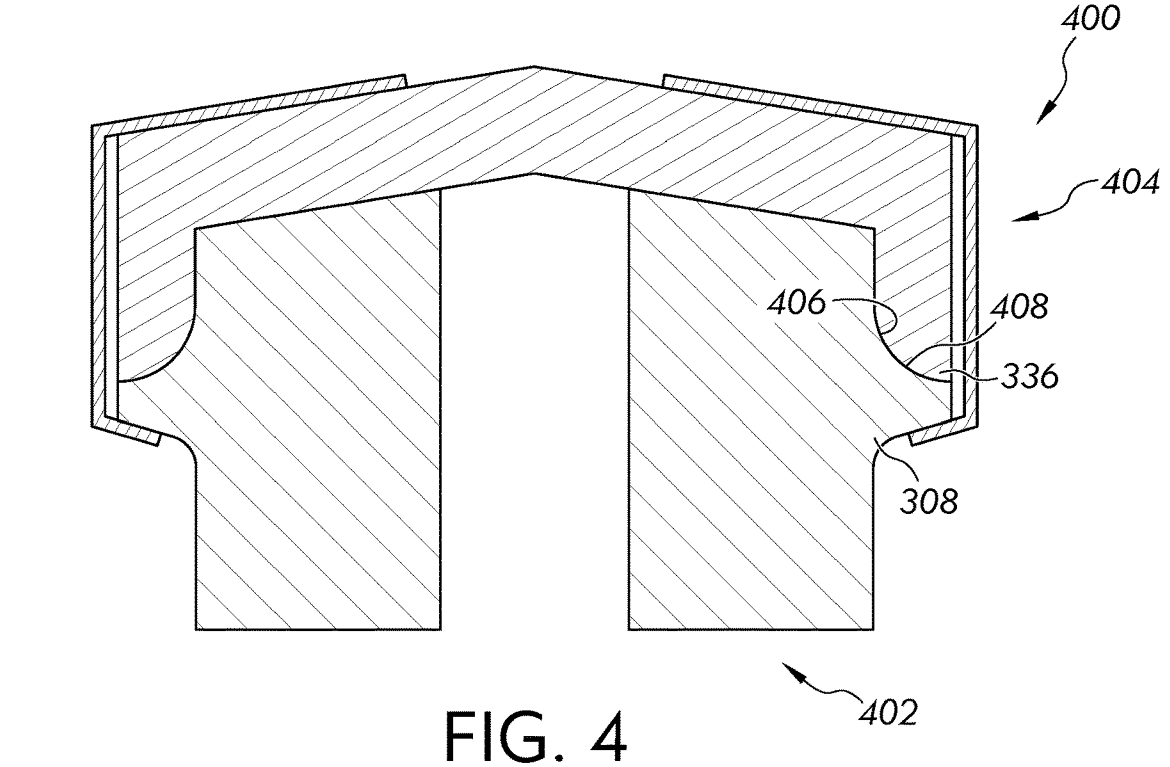
FIG. 4 schematically depicts a partial cross-sectional view of another embodiment of a pharmaceutical container, according to one or more embodiments shown and described herein.

Referring now to FIG. 4, a further embodiment of a glass container 400 is illustrated including a glass container 402 and a sealing assembly 404. It should be appreciated that the glass container 400 is similar to the glass container 300 described herein and illustrated in FIG. 3 with the exception of the joining surface portion 324 of the flange 308 and the joining surface portion 344 of the rim 336. As described herein and illustrated in FIG. 3, the joining surface portion 324 of the flange 308 and the joining surface portion 344 of the rim 336 of the glass container 300 form corresponding chamfers. However, the glass container 400 illustrated in FIG. 4 includes a joining surface portion 406 formed in the flange 308 and a joining surface portion 408 formed in the rim 336 that are each arcuate and correspond to one another so as to nest with one another. The arcuate joining surface portions 406, 408 provide a smooth mating surface between the flange 308 and the rim 336 without sharp edges that might result in a gap between the flange 308 and the rim 336. Such a gap may result in air pockets being formed therebetween or allowing air to escape the formed seal.

It has been discovered that a glass container comprising a flange with reduced glass volume, as shown in FIGS. 3 and 4, may offer unique advantages in the context of the thin wall glass containers described herein. In addition to reducing the amount of glass material needed to produce the glass container, thereby contributing to the sustainability aspect of the present disclosure, the reduced volume flange may also provide manufacturability benefits, which are discussed greater detail further on in this disclosure.

While embodiments of glass containers having a reduced volume flange are described herein, it should be understood that such a flange with reduced glass volume is optional and that the glass containers described herein with reduced wall thickness need not also have a flange with reduced glass volume.

Chemical Durability

In addition to the enhanced mechanical properties of the glass containers 100 due to relatively thinner sidewalls, other properties of the glass containers 100 may also be enhanced. For example, the chemical durability, in particular, the propensity for delamination, of the glass container 100 may be improved when the glass container is formed with relatively thinner sidewalls. When glass articles containing volatile species, such sodium and/or boron (e.g., glass of >0.1 mol % $Na_2O$ and/or $B_2O_3$, such as >0.5 mol %, >1 mol %, >2 mol %, >4 mol %), are heated (such as when a glass tube is converted to a glass container such as a glass vial), the sodium and/or boron may be volatilized and released from the surface of the glass. The volatized sodium and/or boron later condenses on cooler parts of the glass container surface causing compositional heterogeneities in the glass container surface. Such compositional heterogeneities in the glass container surface can lead to reduced chemical durability and greater propensity for delamination of the glass surface.

The rate at which sodium and/or boron volatizes correlates to the surface temperature of the glass. In the process of reforming a glass tube to a glass pharmaceutical vial during converting (such as the converting process described in U.S. Patent Publication No. 2022/0048804), the glass is heated by gas/oxy burners on the outside of the glass tube. That heat is conducted through the thickness of the glass until the desired glass viscosity is achieved for reforming. Thermal modeling has shown that a 150° C. gradient can exist through the thickness of the glass during separation (i.e., when a formed or partially formed glass container is separated from the glass tube following formation) when the necessary through-thickness viscosity is reached to facilitate thermal separation. To achieve the correct average viscosity, the inside surface of the glass tube will have a very large viscosity and the outside surface will have a comparatively low viscosity. As the glass thickness is reduced (i.e., as the thickness of the sidewalls of the glass container is reduced), the thermal gradient is reduced and therefore the inside surface temperature will be reduced for the same mean through-thickness viscosity. Minimizing the inside surface temperature will reduce the sodium and/or boron volatilization and may improve the chemical durability of the resulting glass container.

Figure 5:
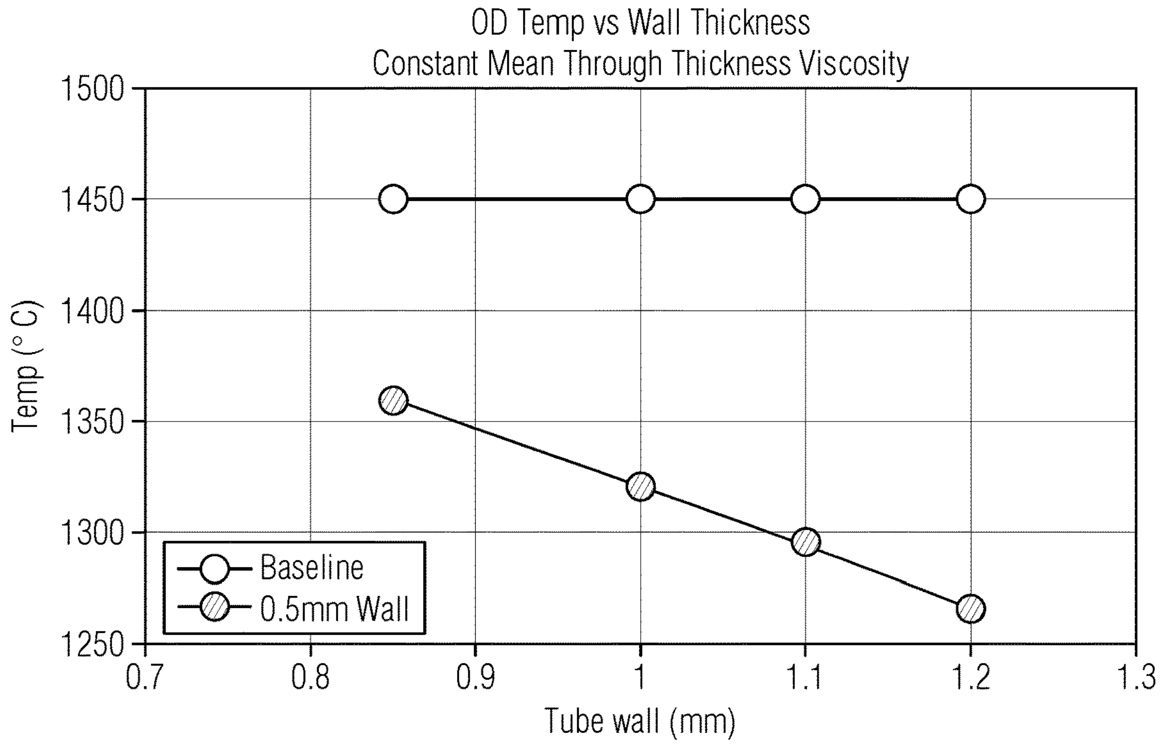
FIG. 5 graphically depicts the outer diameter surface temperature (y-axis) as a function of tube wall thickness (x-axis) at separation of formed glass vial from a tube.

FIG. 5 graphically depicts the temperature profile of a tube having a 1.2 mm thickness (baseline) and a tubes having reduced thickness as a function of wall thickness. An outer diameter (OD) temperature of 1450° C. was assumed as the glass temperature to facilitate proper separation. A 1D thermal scaling model was developed to evaluate the through thickness viscosity and pull force during separation. This model was used to adjust the OD temperature until the mean through thickness viscosity and pull force was the same as the baseline condition for the given wall thickness. Going from a 1.2 mm thick wall to a 0.5 mm wall, the outside surface temperature was reduced by 180° C. For 0.85 mm wall thickness, the surface temperature reduction was still 90° C. This data indicates that lower separation temperatures (i.e., the temperatures used to separate a formed glass container from the remainder of a glass tube) may be used for thinner wall thicknesses. The lower separation temperatures may also reduce volatilization in the glass and, in turn, improve the chemical durability of the glass.

Figure 6:
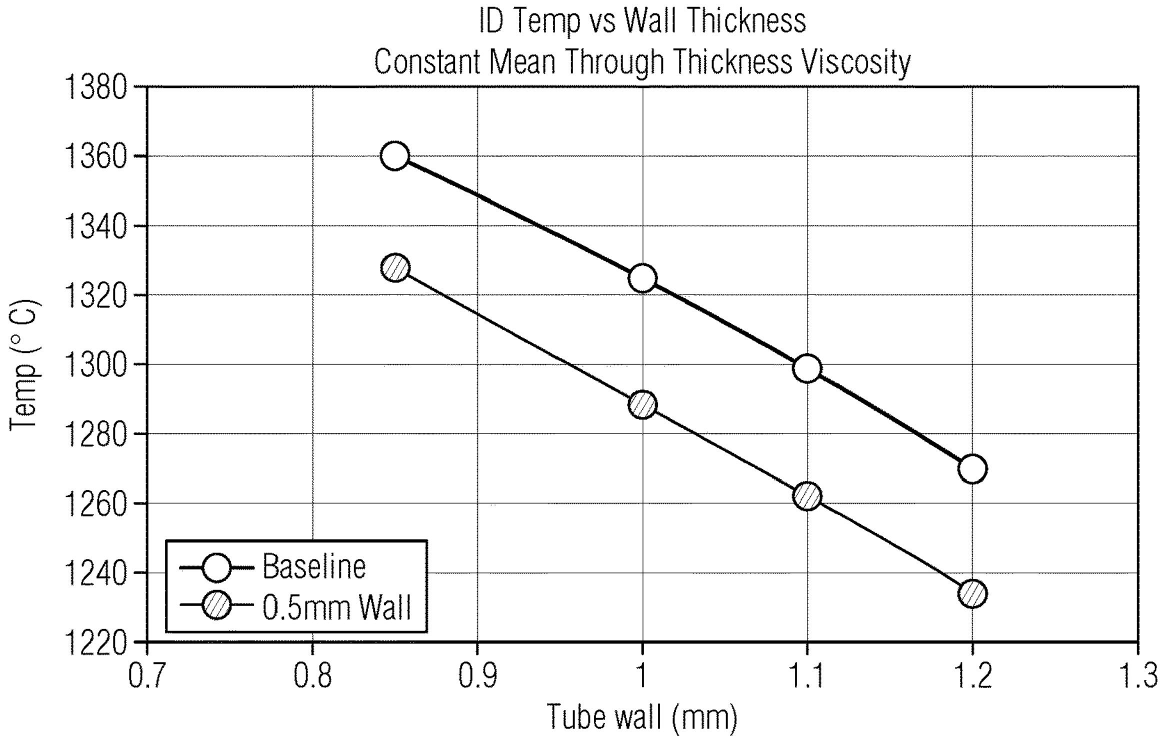
FIG. 6 graphically depicts the inner diameter surface temperature (y-axis) as a function of tube wall thickness (x-axis) at separation of formed glass vial from a tube.

Referring now to FIG. 6, the same thermal scaling model was used to evaluate the temperature of the inside diameter (ID) of the tube at separation. As depicted in FIG. 6, the ID temperature at separation was reduced from baseline by 31° C. to 37° C. for thinner walled tubes. As note above with respect to FIG. 5, the lower separation temperatures may also reduce volatilization in the glass and, in turn, improve the chemical durability of the glass.

Figure 7A:
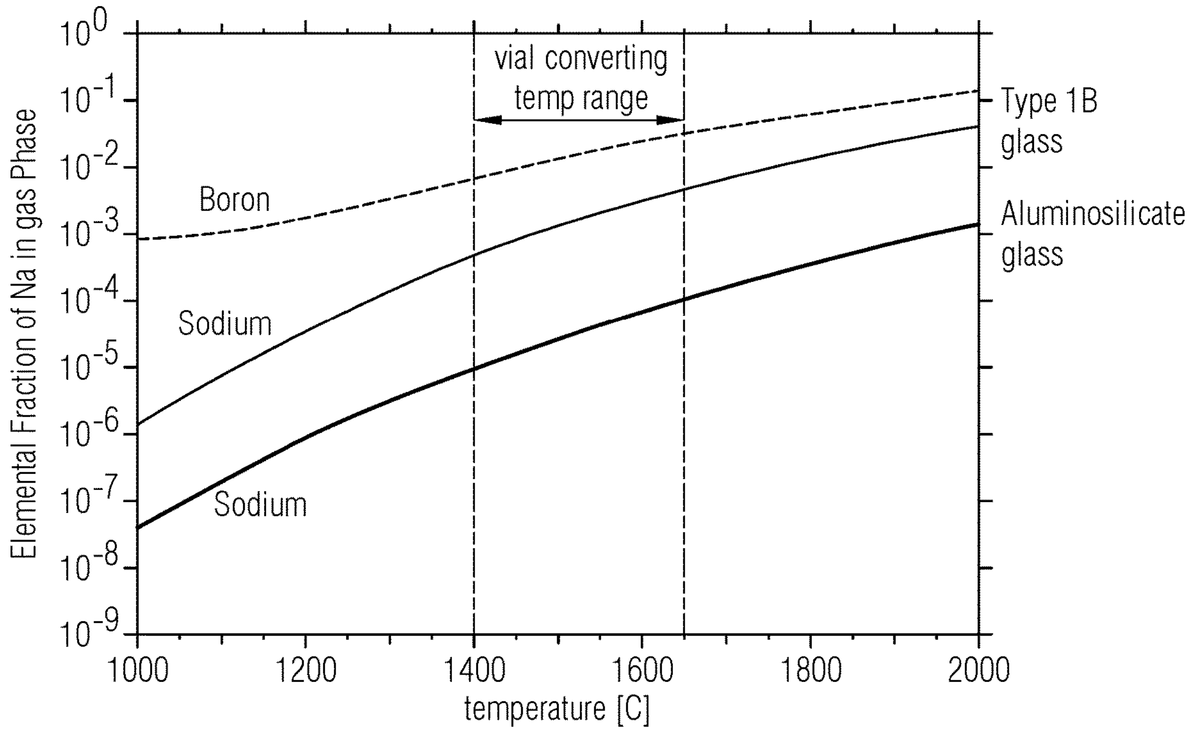
FIG. 7A is a plot relating to sodium and boron vaporization (y-axis) as a function of temperature (x-axis)
Figure 7B:
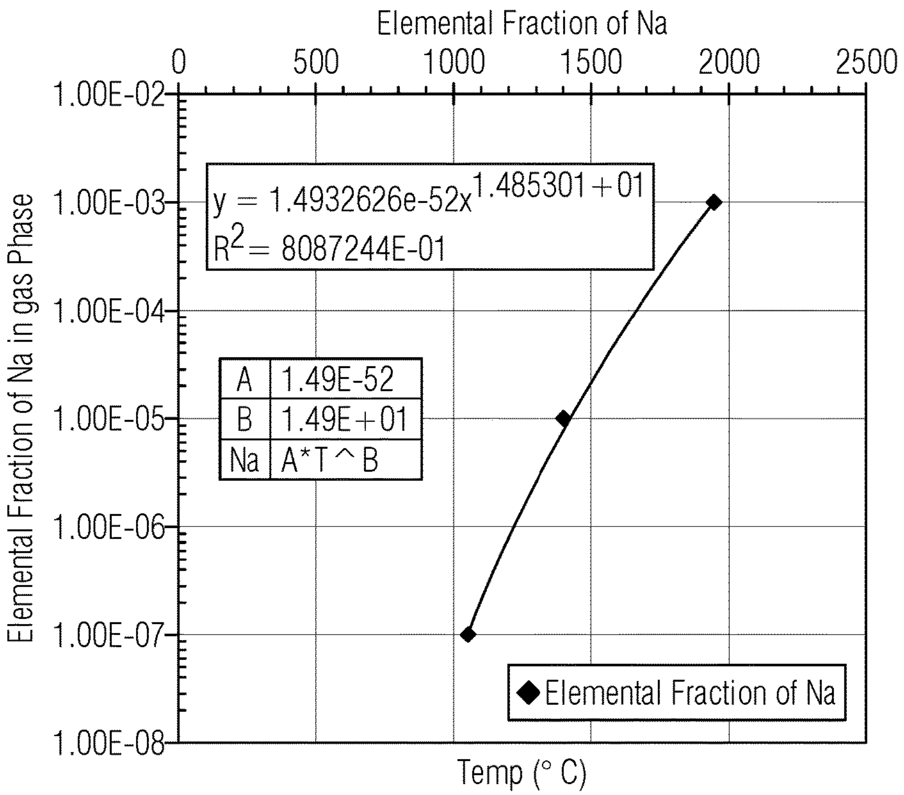
FIG. 7B is a plot showing a model for the elemental fraction of sodium in the gas phase (y-axis) as a function of temperature (x-axis) for an aluminosilicate glass.
Figure 8:
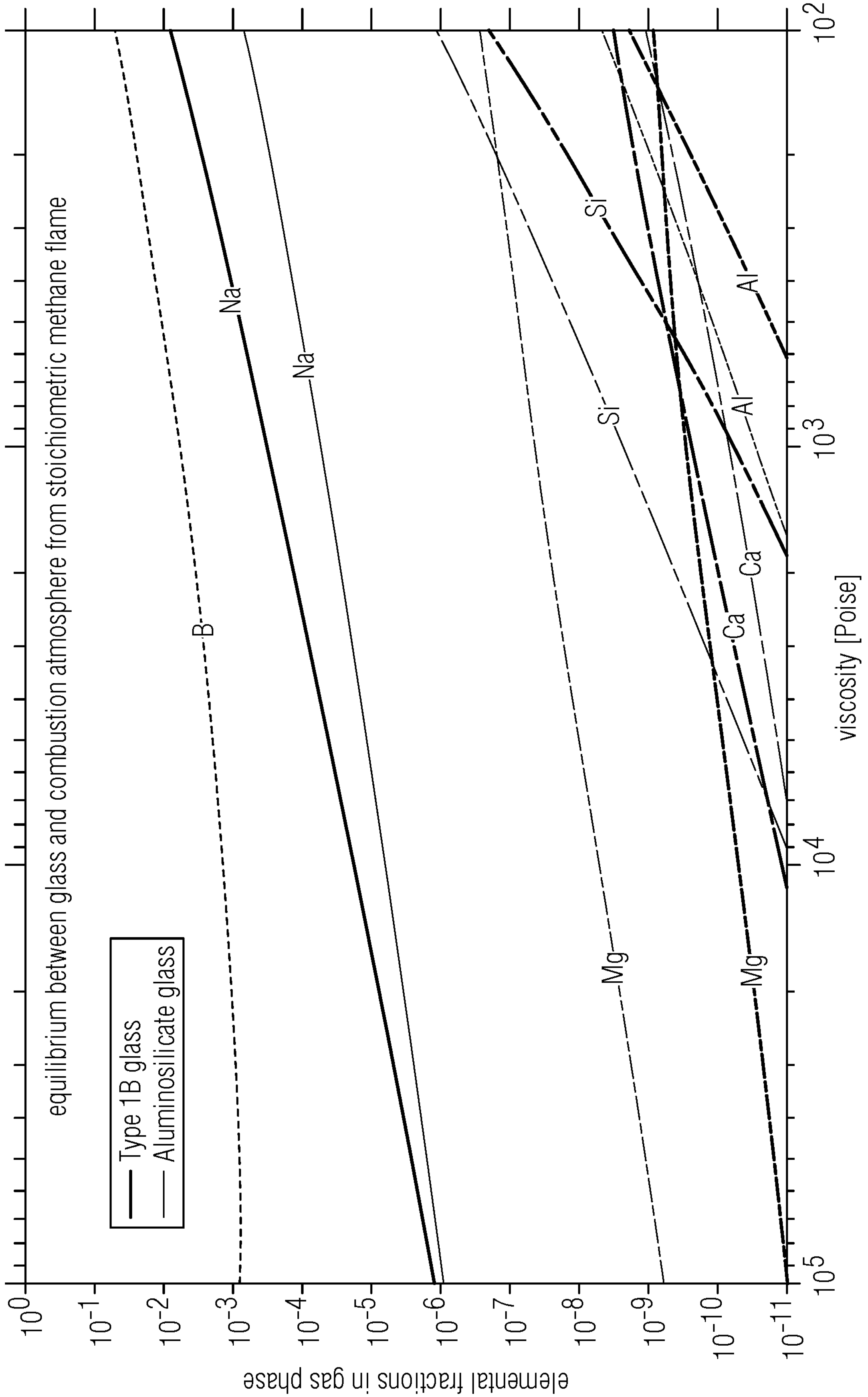
FIG. 8 is a plot relating to sodium and boron vaporization (y-axis) as a function of glass viscosity (x-axis)

To further understand the impact of the reduced glass temperatures at separation on volatilization of species in the glass, a model was developed to determine the sodium vaporization rate as a function of glass surface temperature. The model was based on Corning® Valor® aluminosilicate glass. The model demonstrated that even a small change in surface temperature resulted in a large change in the reaction rate (i.e., volatilization rate). FIG. 7A shows the equilibrium elemental fraction of sodium and boron in the gas phase as a function of temperature for a Type 1B glass and an aluminosilicate glass. FIG. 7B shows the modeling results and a model equation relating sodium elemental fraction in the gas phase to temperature. FIG. 8 shows the equilibrium elemental fraction of sodium and boron in the gas phase as a function of viscosity for a Type 1B glass and Corning's Valor® aluminosilicate glass. As expected, an increase in the glass temperature (i.e., a decrease in the glass viscosity) correlates with an increased equilibrium level of sodium and boron in the gas phase. The sodium evolution rates for Corning® Valor® aluminosilicate glass are listed in Table 2 for various wall thicknesses.

TABLE 2

| | Baseline Thk | | | 0.5 mm Thk | | | OD | ID | |
|---|---|---|---|---|---|---|---|---|---|
| wall (mm) | OD (° C.) | ID (° C.) | Na Fraction | OD (° C.) | ID (° C.) | Na Fraction | Delta (° C.) | Delta (° C.) | Na Delta |
| 0.85 | 1450 | 1360 | 5.24E−06 | 1360 | 1329 | 3.72E−06 | −90 | −31 | −29% |
| 1 | 1450 | 1326 | 3.60E−06 | 1320 | 1289 | 2.36E−06 | −130 | −37 | −34% |
| 1.1 | 1450 | 1300 | 2.68E−06 | 1295 | 1264 | 1.77E−06 | −155 | −36 | −34% |
| 1.2 | 1450 | 1271 | 1.92E−06 | 1265 | 1234 | 1.24E−06 | −185 | −37 | −36% |

As shown by the equation in FIG. 7A, the amount of sodium that evolves during heating is a function of rate and time. The inner diameter temperature model was assumed for the same part rate, however, running the process faster will reduce the exposure time. As shown in Table 2, the amount of sodium that evolved for thinner walled tubes/containers was reduced by up to 36% on the inside surface which may improve the chemical durability of the resultant glass container.

It is known that boron volatilization during conversion of a glass tube to a glass container causes internal vial delamination resulting in contamination for some pharmaceutical compositions. Like sodium volatilization, boron volatilization in glass tubes and containers with thinner sidewalls may be mitigated due to the shorter process times and lower surface temperatures afforded by the reduced sidewall thickness.

Moreover, reduced converting times and surface temperatures may also increase the chemical durability of the resultant glass container by better maintaining the homogeneity of the glass composition in areas of the glass container subject to significant reformation during the converting process. To experimentally verify that the glass containers described herein can achieve lower separation temperatures during conversion, temperature profiles were measured immediately before pulling (i.e., separating) the glass container from the tube for a 3 ml vial having a wall thickness of 0.7 mm vial, a 3 ml vial having a wall thickness of 0.85 mm vial, and a 3 ml vial having a wall thickness of 1.1 mm vial. As can be seen from the temperature profiles shown in FIG. 9, the thinner walled vials were able to be pulled from the glass tube (i.e., separated from the glass tube) at a lower separation temperature than the thicker walled vials. This result suggests that the inner surface of the vial would also experience reduced peak temperatures upon pulling during separation. Further, the decreased temperatures experienced during separation should decrease the degree of sodium and boron volatilization and maintain good chemical durability, as discussed in more detail below.

Figure 9:
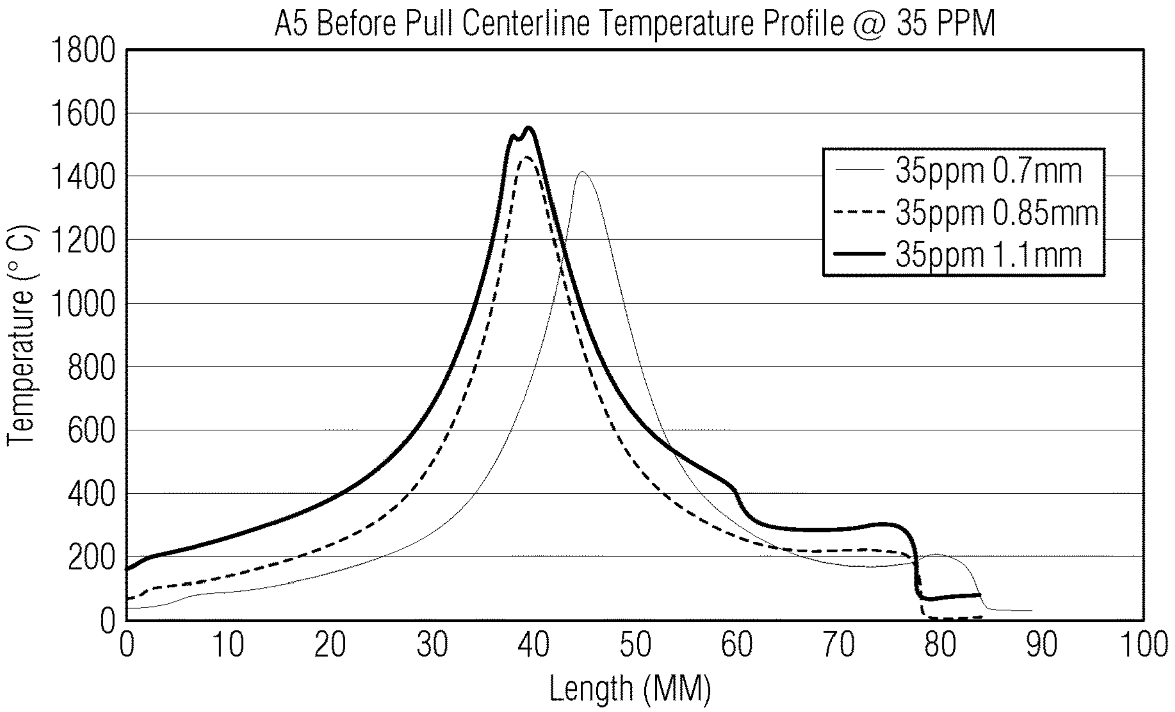
FIG. 9 is a plot showing temperature profiles (y-axis) during separation for glass containers comprising different wall thicknesses (x-axis)
Figure 10:
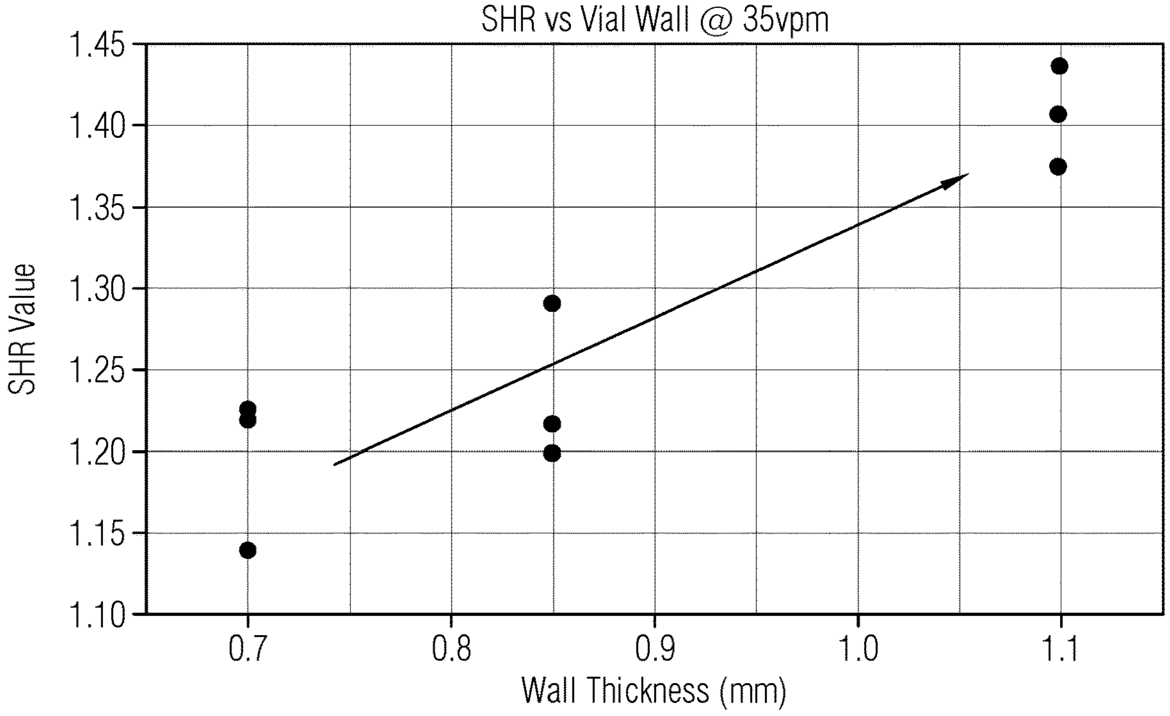
FIG. 10 is a plot showing titration volumes for surface hydrolytic resistance measurements (y-axis) as a function of wall thickness for glass containers comprising different wall thicknesses (x-axis)

To experimentally investigate this theory, surface hydrolytic resistance (SHR) measurements according to USP <660>"Surface Glass Test" were performed on the separated bottoms of the glass containers corresponding to the separation temperature profiles presented in FIG. 9. The resulting SHR values for separated bottoms having wall thicknesses of 0.7 mm, 0.85 mm, and 1.1 mm are shown in FIG. 10. The results indicate that glass container formed with thinner sidewalls permit separation at lower temperatures, and the separation at lower temperatures leads to the interior surface of the separated bottoms of glass containers having an improved surface hydrolytic resistance. However, the surface hydrolytic resistance of the fully converted glass container will also depend on the time and heat exposure the glass containers experience during gathering and bottoming.

The glass containers described herein are chemically durable and resistant to degradation as determined by the DIN 12116 standard, the ISO 695 standard, and ISO 720 standard, the ISO 719, and according to the CDR test method introduced above and described in more detail below.

Specifically, the DIN 12116 standard is a measure of the resistance of the glass to decomposition when placed in an acidic solution. In brief, the DIN 12116 standard utilizes a polished glass sample of a known surface area which is weighed and then positioned in contact with a proportional amount of boiling 6M hydrochloric acid for 6 hours. The sample is then removed from the solution, dried and weighed again. The glass mass lost during exposure to the acidic solution is a measure of the acid durability of the sample with smaller numbers indicative of greater durability. The results of the test are reported in units of half-mass per surface area, specifically $mg/dm^2$. The DIN 12116 standard is broken into individual classes. Class S1 indicates weight losses of up to 0.7 $mg/dm^2$; Class S2 indicates weight losses from 0.7 $mg/dm^2$ up to 1.5 $mg/dm^2$; Class S3 indicates weight losses from 1.5 $mg/dm^2$ up to 15 $mg/dm^2$; and Class S4 indicates weight losses of more than 15 $mg/dm^2$.

The ISO 695 standard is a measure of the resistance of the glass to decomposition when placed in a basic solution. In brief, the ISO 695 standard utilizes a polished glass sample which is weighed and then placed in a solution of boiling 1M NaOH+0.5M $Na_2CO_3$ for 3 hours. The sample is then removed from the solution, dried and weighed again. The glass mass lost during exposure to the basic solution is a measure of the base durability of the sample with smaller numbers indicative of greater durability. As with the DIN 12116 standard, the results of the ISO 695 standard are reported in units of mass per surface area, specifically $mg/dm^2$. The ISO 695 standard is broken into individual classes. Class A1 indicates weight losses of up to 75 $mg/dm^2$; Class A2 indicates weight losses from 75 $mg/dm^2$ up to 175 $mg/dm^2$; and Class A3 indicates weight losses of more than 175 $mg/dm^2$.

The ISO 720 standard is a measure of the resistance of the glass to degradation in purified, $CO_2$-free water. In brief, the ISO 720 standard protocol utilizes crushed glass grains which are placed in contact with the purified, $CO_2$-free water under autoclave conditions (121° C., 2 atm) for 30 minutes. The solution is then titrated colorimetrically with dilute HCl to neutral pH. The amount of HCl required to titrate to a neutral solution is then converted to an equivalent of $Na_2O$ extracted from the glass and reported in μg $Na_2O$ per weight of glass with smaller values indicative of greater durability. The ISO 720 standard is broken into individual types. Type HGA1 is indicative of up to 62 μg extracted equivalent of $Na_2O$ per gram of glass tested; Type HGA2 is indicative of more than 62 μg and up to 527 μg extracted equivalent of $Na_2O$ per gram of glass tested; and Type HGA3 is indicative of more than 527 μg and up to 930 μg extracted equivalent of $Na_2O$ per gram of glass tested.

The ISO 719 standard is a measure of the resistance of the glass to degradation in purified, $CO_2$-free water. In brief, the ISO 719 standard protocol utilizes crushed glass grains which are placed in contact with the purified, $CO_2$-free water at a temperature of 98° C. at 1 atmosphere for 30 minutes. The solution is then titrated colorimetrically with dilute HCl to neutral pH. The amount of HCl required to titrate to a neutral solution is then converted to an equivalent of $Na_2O$ extracted from the glass and reported in μg $Na_2O$ per weight of glass with smaller values indicative of greater durability. The ISO 719 standard is broken into individual types. The ISO 719 standard is broken into individual types. Type HGB1 is indicative of up to 31 μg extracted equivalent of $Na_2O$; Type HGB2 is indicative of more than 31 μg and up to 62 extracted equivalent of $Na_2O$; Type HGB3 is indicative of more than 62 μg and up to 264 extracted equivalent of $Na_2O$; Type HGB4 is indicative of more than 264 μg and up to 620 extracted equivalent of $Na_2O$; and Type HGB5 is indicative of more than 620 μg and up to 1085 μg extracted equivalent of $Na_2O$. The glass compositions described herein have an ISO 719 hydrolytic resistance of type HGB2 or better with some embodiments having a type HGB1 hydrolytic resistance.

As mentioned above, another glass grains test often used in conjunction with USP <660>"Surface Glass Test" to characterize the chemical durability of the glass containers is USP <660>"Glass Grains Test." In brief, the Glass Grains Test involves the use of crushed glass grains which are placed in contact with purified, $CO_2$-free water at a temperature of 121° C. at 1 atmosphere for 30 minutes. The solution is then titrated colorimetrically with dilute HCl to neutral pH. The amount of HCl required to titrate to a neutral solution is determined and used to classify the glass as Type I (Type I borosilicate) or Type II/III (soda-lime-silica glass). If the titrant volume per gram of glass is 10 ml or less, the glass is considered Type I. If the titrant volume per gram of glass is greater than 10 ml but less than or equal to 0.85 ml, the glass is considered Type II/III.

The glass containers described herein have an acid resistance of at least class S3 according to DIN 12116 both before and after ion exchange strengthening with some embodiments having an acid resistance of at least class S2 or even class S1 following ion exchange strengthening. In some other embodiments, the glass containers may have an acid resistance of at least class S2 both before and after ion exchange strengthening with some embodiments having an acid resistance of class S1 following ion exchange strengthening. Further, the glass containers described herein have a base resistance according to ISO 695 of at least class A2 before and after ion exchange strengthening with some embodiments having a class A1 base resistance at least after ion exchange strengthening. The glass containers described herein also have an ISO 720 type HGA2 hydrolytic resistance both before and after ion exchange strengthening with some embodiments having a type HGA1 hydrolytic resistance after ion exchange strengthening and some other embodiments having a type HGA1 hydrolytic resistance both before and after ion exchange strengthening. The glass containers described herein have an ISO 719 hydrolytic resistance of type HGB2 or better with some embodiments having a type HGB1 hydrolytic resistance. It should be understood that, when referring to the above referenced classifications according to DIN 12116, ISO 695, ISO 720 and ISO 719, a glass composition or glass article which has "at least" a specified classification means that the performance of the glass composition is as good as or better than the specified classification. For example, a glass container which has a DIN 12116 acid resistance of "at least class S2" may have a DIN 12116 classification of either S1 or S2.

The method for assessing the CDR of a glass container involves (1) a hydrolytic test of the as-received surface, (2) an etching step to remove any chemical heterogeneities that may be present, and (3) a second hydrolytic test of the 'etched' surface. "As-received" containers are processed according to the USP <660> Surface Glass Test with one notable deviation: the filling volume is 12.5% of the brimful capacity. Due to the reduced filling volume, additional containers are needed to generate the solution volume needed for the titration. The titration volume is recorded as the "as-received" response.

A second USP <660> Surface Glass Test is conducted on "etched" containers to measure the bulk glass response, again at the reduced 12.5% filling volume. The etching process removes the material deposited or incorporated during the converting or molding process. At least one micron (depth) of the surface is removed using a mixture of HCl/HF acids, with target concentrations of 2.3 M HF/4.6 M HCl. The containers are exposed to this solution for a minimum of 3 minutes. These conditions are sufficient for most Type 1 glass compositions, and the mass lost is measured to confirm sufficient depth of surface removal. After exposure to the target acid solution, acidic residue in the containers is removed through soaking in two room temperature water baths for 5 minutes each. Subsequently, the containers are rinsed with high purity water several times. Containers used for the "etched" response were the retained containers from the "as-received" test.

The "etched" containers are processed according to the USP <660> Surface Glass Test using the reduced fill volume (12.5% of the brimful capacity). The resulting titrant volume is recorded as the "etched" titrant response. A ratio of the recorded titrant volumes is calculated as follows (*at reduced volume):

$$CDR = \frac{\text{As Received Titrant Volume}}{\text{Etched Titrant Volume}} \approx \frac{<660>\text{ Surface Glass Test}^*}{<660>\text{ Surface Etching Test}^*}$$

The CDR value represents the risk for delamination, where containers with a uniform surface chemistry exhibit a low ratio and have the lowest risk of delamination.

CDR results have shown that vials deemed "Type I" by USP <660> and European Pharmacopoeia containers for pharmaceutical use (Ph. Eur. 3.2.1) can include a large range of chemical durability. The CDR method has been demonstrated to quantitatively distinguish populations with known performance variation (i.e., delaminating populations). Accordingly, the CDR method may be used to compare glass containers with different manufacturing histories to better understand the influence various processing parameters may have on the resulting delamination resistance of the glass container. Containers with uniform surface chemistry have the lowest risk of delamination, and exhibit lower CDR ratios.

In addition to the above-described CDR method, the chemical durability of the glass containers described herein was also assessed to evaluate the inorganic elemental concentrations that can be extracted from the container when in the presence of a solution. The Extractables Testing Method involves the use of a range of pH solutions added to the glass containers to better understand the potential interaction between the container and the drug products stored therein. Three solutions are used to evaluate the thin wall glass containers: a pH3 solution of HCl (ACS grade)+18 MΩ $H_2O$, a pH neutral 18 MΩ $H_2O$, and a pH 10 solution of $NH_4OH$ (ACS grade)+18 MΩ $H_2O$. As-converted glass containers are rinsed with 18 MΩ $H_2O$ and then air dried in a laminar hood. The glass containers are then filled to 90% fill volume with one of the testing solutions. The samples are then capped using a Teflon-coated septa and an aluminum cap. Water samples are aged in an autoclave cycle with a one-hour hold at 121° C. The total cycle time with heat up and cool down is two hours. The acid and base solutions are aged in a static incubator at 70° C. for four days. Once the solutions are cooled to room temperature they are transferred from the glass container and into pre-rinsed centrifuge tubes. The solutions are analyzed by inductively coupled plasma mass spectrometry (ICP-MS). The ICP-MS equipment is used per standard operating procedures and daily calibration standards (CAL-19-368).

Chemical durability results in terms of the above described CDR and ICP-MS methods are presented later in the discussion of manufacturing advantages of glass containers formed with sidewalls having reduced thickness compared to conventional glass vials with the same outer diameter.

Thermal Properties

Without being bound by theory, it is believed that glass containers 100 formed with thinner sidewalls may reduce the cool down times during tube manufacture and tube-to-vial converting due to the lower thermal mass. Decreasing the cool down times may increase the fictive temperature of the glass which is known to improve the ability of the glass to be chemically strengthened. In particular, increasing the fictive temperature of the glass may allow the glass container to be chemically strengthened to a desired surface compressive stress and depth of layer more rapidly than glass containers with a lower fictive temperature. As discussed above, this may improve the throughput of the chemical strengthening process and/or reduce the cost of the chemical strengthening process.

In addition, it is believed that glass containers 100 formed with thinner sidewalls may reduce the thermal stresses in the glass resulting from the tube-to-vial conversion process. Reduced thermal stress may mitigate or eliminate the need for post-formation annealing steps used to remove residual thermal stresses.

Further, in glass containers 100 formed with thinner sidewalls, the thermal shock stresses may be lower. As such, processes to reduce the risk of thermal shock breakage, such as slower temperature ramps during processing and/or the use of preheating chambers during processing, may be avoided, thereby improving manufacturing throughput and reducing production costs.

In addition, in glass containers 100 formed with thinner sidewalls, flexure stresses resulting from the process of freezing the contents of the containers, such as during cold storage and lyophilization, may be better tolerated by a thin wall glass container having an external coating, when compared with uncoated conventional glass containers having the same outer diameter. While it is generally expected that a glass container having a thinner sidewall will show an increased breakage rate due to the smaller cross-sectional area limiting the tolerable peak stresses resulting from the expanding contents, it has been unexpectedly found that an externally coated glass container formed with a reduced thickness is able to withstand freezing conditions better than uncoated conventional glass containers having the same outer diameter. Without wishing to be bound by theory, it is believed that the increased compliance arising from the thin wall in combination with the avoidance of flaw formation provided by the external coating results in a glass container with improved breakage resistance under freeze-thaw conditions.

To investigate this theory, a coated glass pharmaceutical vial having an ISO 8362-1 size designation of 2R with a wall thickness of 0.7 mm (70% of conventional wall thickness) and an uncoated glass pharmaceutical vial having an ISO 8362-1 size designation of 2R with a wall thickness of 1.0 mm (conventional) were subjected to identical freezing conditions, hereinafter referred to as the "Freeze-Thaw Test," and the freeze-thaw survivability rate was measured. The coating applied to the glass pharmaceutical vial having a reduced wall thickness was the low-friction, thermally stable polyimide coating described above. To replicate filling-line damage, a 20 mm 30 N scratch was applied to the exterior surface of the glass containers (i.e., the coating for coated vials or the glass for uncoated vials), using the vial-on-vial jig 700 shown in FIG. 32. The vial-on-vial jig 700 and method of applying scratches to the exterior surface of glass containers is discussed in more detail herein. The glass containers were then filled with a 5% mannitol solution to 50% of their brimful capacities and placed in a −40° C. freezing chamber for at least 24 hours, and then removed from the freezing chamber and allowed to cool naturally. 100 samples were tested for each of the vial types. A sample is deemed to have "survived" the Freeze-Thaw Test if no fracture is observed after the sample is cooled. The freeze-thaw survivability rate is determined by calculating the percentage of the sample population that survived the Freeze-Thaw Test.

The externally coated glass containers having a reduced wall thickness of 0.7 mm had a freeze-thaw survivability rate of 99%, while the uncoated glass pharmaceutical vials having a wall thickness of 1.0 mm had a freeze-thaw survivability rate of 44%. The low-friction coating applied to the thin wall glass containers of this experiment was the polyimide coating as described herein and having a coating thickness of 20 nm to 40 nm. The results indicate that externally coated glass containers, such as the externally coated glass pharmaceutical vials described herein, exhibit improved breakage resistance in cold storage conditions relative to conventional glass vials with the same outer diameter. That is, it has been unexpectedly found that reducing the thickness of the sidewalls of the vial and including a thin coating to the sidewall of the vial has the synergistic effect of improving the mechanical performance of the glass container under freezing (and thawing) conditions.

In embodiments, the term "cold storage factor," as used herein, refers to the ratio between (i) the freeze-thaw survivability rate of the glass container (or an externally coated glass container, if a coating is present) comprising a sidewall having an average wall thickness $T_i$ that is less than or equal to $0.85*s_1$, wherein $s_1$ is a wall thickness of the glass vial of size X as defined by ISO 8362-1 and X is one of 2R, 3R, 4R, 6R, 8R, 10R, 15R, 20R, 25R, 30R, 50R, and 100R as defined by ISO 8362-1, and (ii) the freeze-thaw survivability rate of a glass pharmaceutical vial of size X having a sidewall thickness $s_1$ as defined by ISO 8362-1. In embodiments, the term "cold storage factor" may refer to the ratio between (i) the freeze-thaw survivability rate of the glass container (or an externally coated glass container, if a coating is present) comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the freeze-thaw survivability rate of a glass pharmaceutical vial of size X having a sidewall thickness $s_1$ as defined by ISO 8362-1. In embodiments, the term "cold storage factor," as used herein, may refer to the ratio between (i) the freeze-thaw survivability rate of the glass container (or an externally coated glass container, if a coating is present) comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the freeze-thaw survivability rate of a glass pharmaceutical vial of size X having a sidewall thickness $s_1$ as defined by ISO 8362-1.

In some embodiments, the externally coated glass container 100 may have a cold storage factor of at least 1.5, of at least 1.75, of at least 2.0, or of at least 2.25.

Further, glass containers 100 formed with thinner sidewalls may allow the glass to cool more quickly due to lower thermal mass. This, in turn, allows for freezing of the contents to nucleate at the sidewall of the container. Without wishing to be bound by theory, it is believed that promoting nucleation at the sidewall of the container in addition to the bottom of the container will allow the contents of the glass container to freeze more quickly.

In general, glass containers 100 formed with thinner sidewalls may be heated and/or cooled faster than glass containers formed with relatively thicker sidewalls. This results in an energy savings and faster throughput rates for any processes requiring thermal manipulation of the glass containers.

Manufacturability

The reduced thickness of the sidewalls of the glass containers may also improve the manufacturability of the glass containers. In particular, the reduced thickness of the sidewalls of the glass containers may enhance the throughput of the tube-to-vial converting process allowing for the production of more glass containers per unit of time. For context regarding the tube-to-vial conversion process, see U.S. Patent Publication No. 2022/0048804.

The throughput/speed of a tube-to-vial converting process may be calculated based on the step of thermally separating the formed container from the tube feed stock as this step of the converting process is generally the rate limiting step in converting standard vials, such as ISO 8362-1 vials. Additionally, on skilled in the art can quantify metrics based on thermal separation due to the constant wall thickness of the glass tube and considering the thermal separation process typically involves heating the same area over three consecutive stations of the tube-to-vial converter.

The heat capacity formula may be used to model the thermal separation process. In particular the heat energy q during the thermal separation process may be defined as:

$$q=m\cdot C_p\cdot\Delta T \qquad \text{(Equation 1)}$$

where q is the heat energy, m is the mass, $C_p$ is the specific heat capacity, and $\Delta T$ is the change in temperature. The mass m is represented by the cross-sectional area A of the glass tube such that:

$$A=\frac{\pi}{4}\left[OD^2-ID^2\right]=\frac{\pi}{4}\left[OD^2-\left(OD^2-2\cdot \text{wall}\right)^2\right] \qquad \text{(Equation 2)}$$

where OD is the outer diameter of the glass tube, ID is the inner diameter of the glass tube, and wall is the thickness of the sidewall of the glass tube.

The specific heat capacity $C_p$ is constant for a given glass composition. The change in temperature $\Delta T$ is relatively constant for a given converter machine setup (i.e., room temperature to the separation temperature).

Consider a tube-to-vial conversion process in which a glass tube having an OD of 16 mm and a wall thickness of 1 mm is converted to a glass pharmaceutical vial. If a glass tube with a greater wall thickness (e.g., greater than 1.0 mm) is used in the same process (i.e., the same thermal separation process with the same burner settings), the glass tube would not separate because the relatively thicker glass would not reach the desired viscosity to facilitate separation (i.e., the glass is too cold) due to the increased area (i.e., mass). That is, if the heating rate of the burners used for thermal separation are left constant, then the part rate of the tube-to-vial conversion process would need to be slowed down to achieve adequate heating of the glass tube for thermal separation. However, if a glass tube with a thinner wall thickness is used (e.g., less than 1.0 mm) and the heating rate of the burners used for thermal separation are left constant, then the part rate of the tube-to-vial conversion process may be increased to maintain the same total heat input into the glass tube to facilitate thermal separation.

Therefore, the part rate of the tube-to-vial conversion process is inversely proportional to the cross-sectional area of the tube for a given process setup. That is:

$$\text{Part Rate} \propto \frac{1}{\text{Area}} \qquad \text{(Equation 3)}$$

Figure 12:
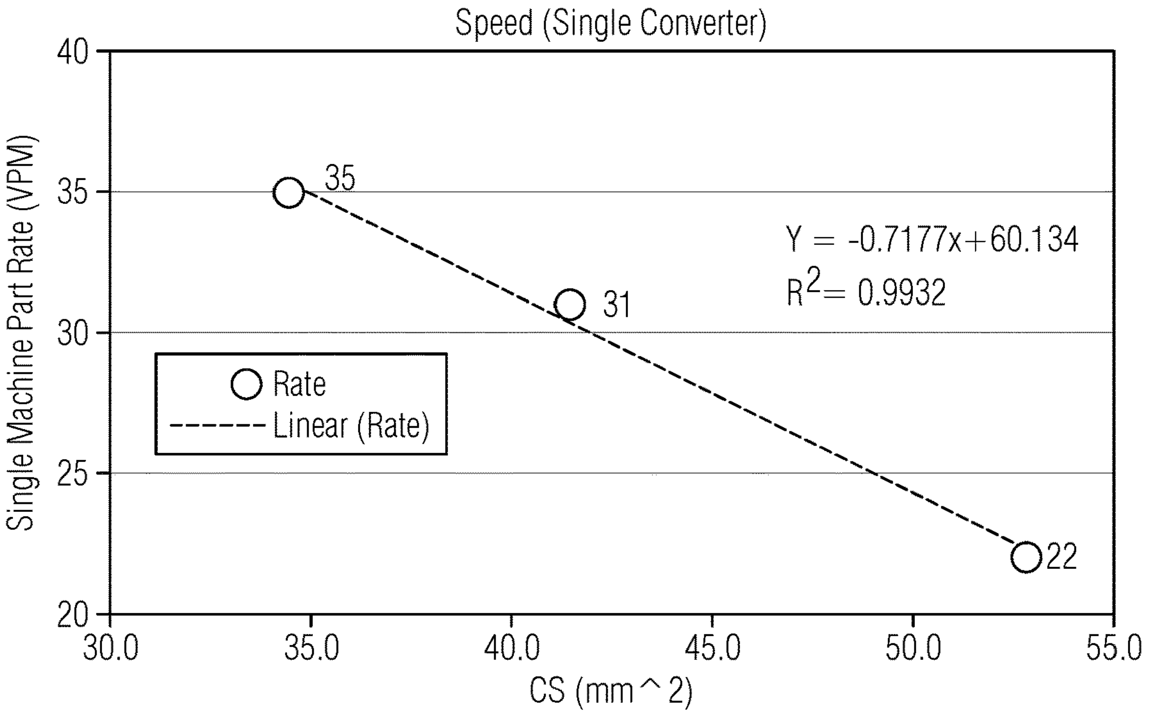
FIG. 12 is a plot of separation part rate (y-axis) as a function of tube wall thickness (x-axis) of a tube-to-vial converting process.

This relationship has been verified experimentally. FIG. 12 shows the separation rate as function of cross-sectional tube area, at constant burner output, for 3 ml vials having wall thicknesses of 0.7 mm, 0.85 mm, and 1.1 mm. As can be seen in FIG. 12, the separation rate is inversely proportional to the cross-sectional area of the tube. Accordingly, because other steps can similarly be sped up for the thinner wall vial, it is expected that the use of glass tubes having a reduced sidewall thickness will increase the part rate of the tube-to-vial conversion process, thereby increasing overall throughput of the tube-to-vial conversion process. Alternatively, the same part rate can be achieved by lowering the flame temperature, and the energy usage, in the tube-to-vial conversion process when producing a vial having reduced thickness wall.

Another step in the tube-to-vial conversion process is the heating and forming of the flange portion of the vial. This processing step, herein referred to as "gathering," is different for thin wall glass containers because the tube length, or "gathering height," required to produce a flange having the same glass volume will be greater. For example, to produce a glass vial having a flange with dimensions as defined by ISO 8362-1, a greater gathering height will be required as the relatively thin glass tube has less glass per unit length. The question thus arises whether the gathering rate, e.g., mm of tube per second, can be increased for vials having thinner walls such that the gathering step can be performed in the same or less time than the gathering step for a vial of the same size having a conventional wall thickness (e.g., as defined by ISO 8362-1). It has been discovered that by slightly increasing the heat output from the gas burner used to heat the glass tubes during the gathering step, the gathering rate can be significantly increased. To confirm this, a gathering study was performed wherein glass pharmaceutical vials formed from Type 1B borosilicate glass and having a 2R size designation according to ISO 8362-1 with thicknesses of 1.0 mm and 0.7 mm, respectively, were converted while controlling the gas flow rate to the burners to modify the heat output. With only an 8% increase in the gas flow rate to the burner, the gathering rate was increased by 181%. This increase was maintained through the gathering stage for approximately 500 vials for each of the 1.0 mm and 0.7 mm 2R vials (see Table 13 for specific values). This improvement in the gathering rate was enough to achieve an equal gathering part rate (vials per minute or "VPM") for the 0.7 mm 2R vial of 47 VPM as was obtained for the 1.0 mm 2R vial. Moreover, significantly, the increase in burner output during the gathering step did not diminish the chemical durability of the 0.7 mm glass vial.

In particular, the Surface Hydrolytic Resistance (SHR) of the inner surface of the vials from the gathering study was assessed according to the USP <660>"Surface Glass Test" described above. The USP <660> test was repeated using ten test specimens for each of the 0.7 mm and 1.0 mm wall thicknesses, the results of which are shown below in Table 3A.

TABLE 3A

| | Titration Volume (ml HCl 0.01M) | |
|---|---|---|
| Wall Thickness | 1.0 mm | 0.7 mm |
| | 1.2 | 1.1 |
| | 1.0 | 1.2 |
| | 1.0 | 1.2 |
| | 1.1 | 1.1 |
| | 1.1 | 1.1 |
| | 1.0 | 1.1 |
| | 1.0 | 1.1 |
| | 1.0 | 1.1 |
| | 1.0 | 1.0 |
| | — | 1.0 |
| Average = | 1.0 | 1.1 |

The SHR measurements shown in Table 3A indicate that the 2R vials having a wall thickness of 0.7 mm and produced using an 8% higher burner output (to increase the gathering rate) maintain a Type I or Type II classification according to USP <660> (i.e., less than 1.6 ml HCl 0.01 M titration volume), similar to the 2R vials having a wall thickness of 1.0 mm. A vial having a Type I and Type II classification according to USP <660> is considered to have a high hydrolytic resistance.

Table 3B below shows the results of the <USP>660 "Glass Grains Test" for vials from the gathering study.

TABLE 3B

| Condition | Consumed 0.01N HCl Corrected by Blank (umoL/50 mL) | USP Glass Grains |
|---|---|---|
| 0.7 mm 2R set 1 | 7.4350 | 0.037 |
| 0.7 mm 2R set 2 | 6.8110 | 0.034 |
| 0.7 mm 2R set 3 | 6.6970 | 0.033 |
| 1.0 mm 2R set 1 | 7.7090 | 0.039 |
| 1.0 mm 2R set 2 | 7.5610 | 0.038 |
| 1.0 mm 2R set 3 | 7.5330 | 0.038 |

Three sets of glass grains from 2R glass pharmaceutical vials having a 0.7 mm wall thickness and three sets of glass grains from 2R glass pharmaceutical vials having a 1.0 mm wall thickness were tested under the USP <660>"Glass Grains Test." The mean value for the titrant volume per grams of glass tested (ml/g) for the 2R 0.7 mm wall thickness vial was 0.035, and the mean value for the titrant volume per grams of glass tested (ml/g) for the 2R 1.0 mm wall thickness vial was 0.038. Accordingly, the 2R glass pharmaceutical vial having a wall thickness of 0.7 mm maintained a Type I designation according to the USP <660>"Glass Grains Test."

The propensity for delamination of the glass pharmaceutical vials was measured in terms of the chemical durability ratio and the method for determining the CDR introduced and described above. The CDR measurements were performed on two 2R glass pharmaceutical vials having a wall thickness of 0.7 mm and two 2R glass pharmaceutical vials having a wall thickness of 1.0 mm. The results of the CDR measurements are shown below in Table 4.

TABLE 4

| Wall Thickness (mm) | CDR |
|---|---|
| 0.7 | 10 |
| 0.7 | 9.3 |
| 1 | 9.9 |
| 1 | 9 |

The CDR measurements shown in Table 4 indicate that the 2R vials having a wall thickness of 0.7 mm and produced using an 8% higher burner output (to increase the gathering rate) do not have an increased propensity for delamination relative to 2R glass pharmaceutical vials having a wall thickness of 1.0 mm gathered with a lower burner output.

Figure 11A:
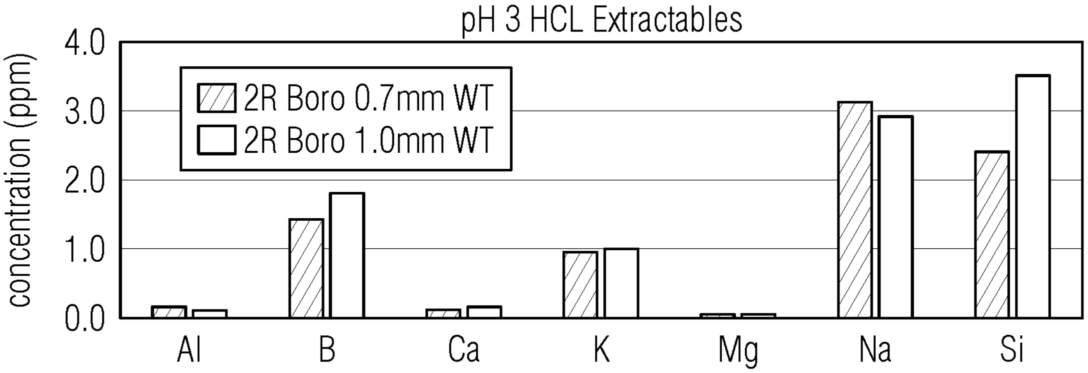
FIG. 11A is a plot showing extractable elements (y-axis) of glass pharmaceutical vials of varying thickness (x-axis) as measured by inductively coupled plasma mass spectrometry (ICP-MS), wherein the test solution comprises an acidic pH.
Figure 11B:
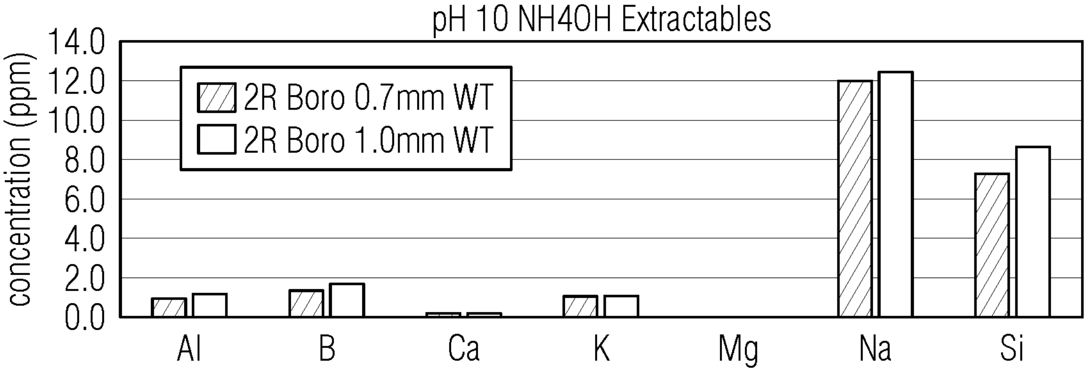
FIG. 11B is a plot showing extractable elements (y-axis) of glass pharmaceutical vials of varying thickness (x-axis) as measured by inductively coupled plasma mass spectrometry (ICP-MS), wherein the test solution comprises a basic pH.
Figure 11C:
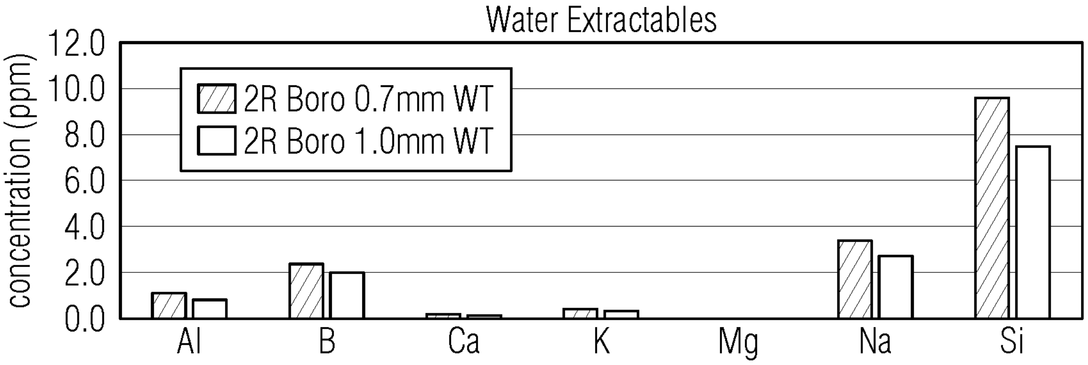
FIG. 11C is a plot showing extractable elements (y-axis) of glass pharmaceutical vials of varying thickness (x-axis) as measured by inductively coupled plasma mass spectrometry (ICP-MS), wherein the test solution is water.

Finally, to further evaluate the influence a reduced wall thickness of glass pharmaceutical vials has on the resulting chemical durability, the ICP-MS method for measuring extractable elements described above was implemented on 2R glass pharmaceutical vials formed from Type 1B borosilicate glass and having a wall thickness of 0.7 mm and 2R glass pharmaceutical vials having a wall thickness of 1.0 mm. The vials used for the ICP-MS measurements were produced during the gathering study described above. The ICP-MS testing described herein involved three samples for each vial type (0.7 mm 2R and 1.0 mm 2R) filled with each of the three solutions, and two aliquots from each sample are measured. The results of the ICP-MS measurements are shown in FIGS. 11A-11C. The differing concentrations of extractable elements shown in FIGS. 11A-11C is what would be expected based on typical converting process variation. Therefore, the ICP-MS results reinforce the chemical durability results discussed above in further evidencing that the increased burner output utilized to gather that thin wall glass pharmaceutical vials at a faster rate did not sacrifice the resulting chemical durability.

While the glass vials in the foregoing examples were formed from Type 1B borosilicate glass, it is believed that vials formed from aluminosilicate glass, such as Corning® Valor® aluminosilicate glass would exhibit similar trends in terms of SHR and CDR and ICP-MS measurements at least because aluminosilicate glasses, particular boron-free or low boron aluminosilicate glasses, generally have chemical durability as good as or better than Type 1B borosilicate glasses.

The ability of the described herein glass containers having a reduced wall thickness to maintain chemical durability properties despite being gathered with higher burner outputs can be at least partially attributed to the reduced thermal gradient associated with the relatively thinner walls. Moreover, it is believed that the burner output during the gathering step could be further increased, without sacrificing chemical durability, such that the thin wall glass containers herein disclosed achieve gathering rates higher than those achievable with a counterpart vial of conventional wall thickness as defined by ISO 8362-1.

By way of further explanation, part rate or total cycle time of the tube-to-vial conversion process is the sum of the index time (i.e., the time to move glass tube in the machine from station to station) and the dwell time of the glass tube at each station (i.e., the time the glass tube spends in front of a burner of the tube-to-vial conversion process). For the same tube size, part rate has been scaled successfully using dwell time and Mass Flow Controllers (MFC's) for feeding fuel to the burners. For example, consider a glass tube having 16.00 mm OD and a 1.00 mm sidewall thickness converted into a glass pharmaceutical vial in a tube-to-vial conversion process running at a part rate of 45 vials per minute (VPM). Assume the index time of the tube-to-vial conversion process is 0.30 sec. The total cycle time is 60/45=1.33 sec. The dwell time is 1.33−0.30 sec=1.03 sec. If the process is slowed to 35 VPM, the new total cycle time is 60/35=1.71 sec. The dwell time is 1.71−0.30 sec=1.41 sec. The dwell time is 37% less with the process having a part rate of 45 vials per minute (VPM). Therefore, the flow of fuel through the MFC needs to be reduced by 37% to maintain the same amount of heat. Conversely, going from a dwell time of 1.41 seconds to 1.03 seconds is associated with an increase in part rate from 35 VPM to 45 VPM, a 29% increase.

Figure 13:
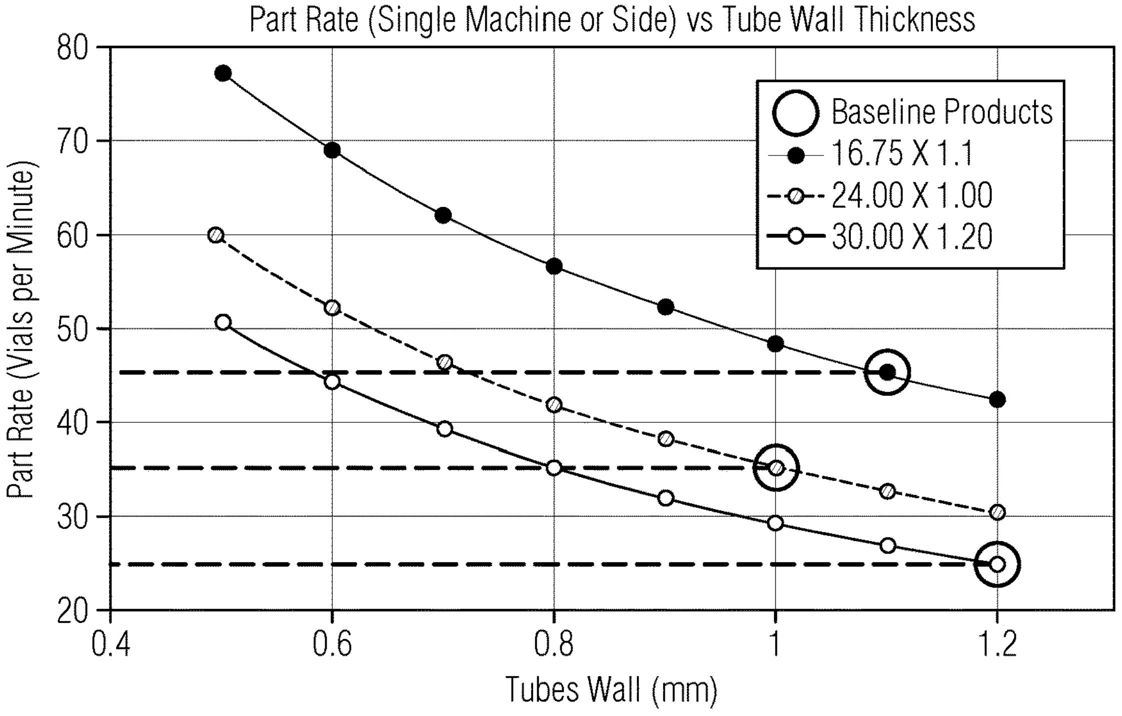
FIG. 13 is a plot of separation part rate (y-axis) as a function of tube wall thickness (x-axis) of a tube-to-vial converting process.

Therefore, to evaluate the impact of glass tubes having reduced sidewall thickness on the part rate of the tube-to-vial converting process, only the cross-section of the tube is required and the index time of the machine (assuming gathering rate could be increased at least as much as the separation rate). The result of this analysis has been graphically depicted in FIG. 13 for three different glass tube dimensions (16.75 mm OD×1.1 mm wall thickness; 24 mm OD×1.0 mm wall thickness; and 30 mm OD×1.2 mm wall thickness) and baseline tube-to-vial conversion processes (i.e., VPM rates of 45 VPM, 35 VPM, and 25 VPM, respectively). In particular, the analysis of the process using glass tubes of three different dimensions and corresponding part rates shows the impact of reducing the wall thickness of the glass tube where the baseline speed may be different. The cross-sectional area scaling was used to generate new converting speeds based on differential tube wall thicknesses from 0.5 mm to 1.2 mm. As shown in FIG. 13, it is believed that the use of glass tubes having a reduced sidewall thickness will significantly increase the part rate of the tube-to-vial conversion process, thereby increasing overall throughput of the tube-to-vial conversion process.

Table 5 below includes data related to the impact reduced wall thickness of the glass tubing has on part rate (VPM) in a tube-to-vial conversion process. In Table 5, "CS" refers to the cross-sectional area of a glass tube used to form the vial, and "CS Ratio" refers to the ratio of the cross-sectional area of the glass tube to the cross-sectional area of a glass tube having a 16.75 mm OD and a 1.1 mm wall thickness. In particular, calculations of the tube-to-vial conversion part rate were made for 16.75 mm OD glass tube having wall thicknesses from 1.2 mm to 0.5 mm. The calculations show that the part rate (VPM) of the tube-to-vial conversion process can be increased by using glass tubes with reduced wall thickness. That is, the throughput of the tube-to-vial conversion process can be increased by decreasing the wall thickness of the glass tubing used in the tube-to-vial conversion process.

TABLE 5

| OD [mm] | Wall [mm] | Index [sec] | ID [mm] | CS [mm$^2$] | CS Ratio [−] | Scaled Dwell [sec] | Scaled Cycle [sec] | Scaled Speed [VPM] |
|---|---|---|---|---|---|---|---|---|
| 16.75 | 1.2 | 0.28 | 14.35 | 58.6 | 1.084 | 1.142 | 1.422 | 42 |
| 16.75 | 1.1 | 0.28 | 14.55 | 54.1 | 1.000 | 1.053 | 1.333 | 45 |
| 16.75 | 1.0 | 0.28 | 14.75 | 49.5 | 0.915 | 0.964 | 1.244 | 48 |
| 16.75 | 0.9 | 0.28 | 14.95 | 44.8 | 0.829 | 0.873 | 1.153 | 52 |
| 16.75 | 0.8 | 0.28 | 15.15 | 40.1 | 0.741 | 0.781 | 1.061 | 57 |
| 16.75 | 0.7 | 0.28 | 15.35 | 35.3 | 0.653 | 0.687 | 0.967 | 62 |
| 16.75 | 0.6 | 0.28 | 15.55 | 30.4 | 0.563 | 0.593 | 0.873 | 69 |
| 16.75 | 0.5 | 0.28 | 15.75 | 25.5 | 0.472 | 0.497 | 0.777 | 77 |

In view of the above, it is believed that the use of glass tubes having a reduced sidewall thickness will increase the part rate of the tube-to-vial conversion process, thereby increasing overall throughput of the tube-to-vial conversion process.

Reduced Volume Flange

Figure 14:
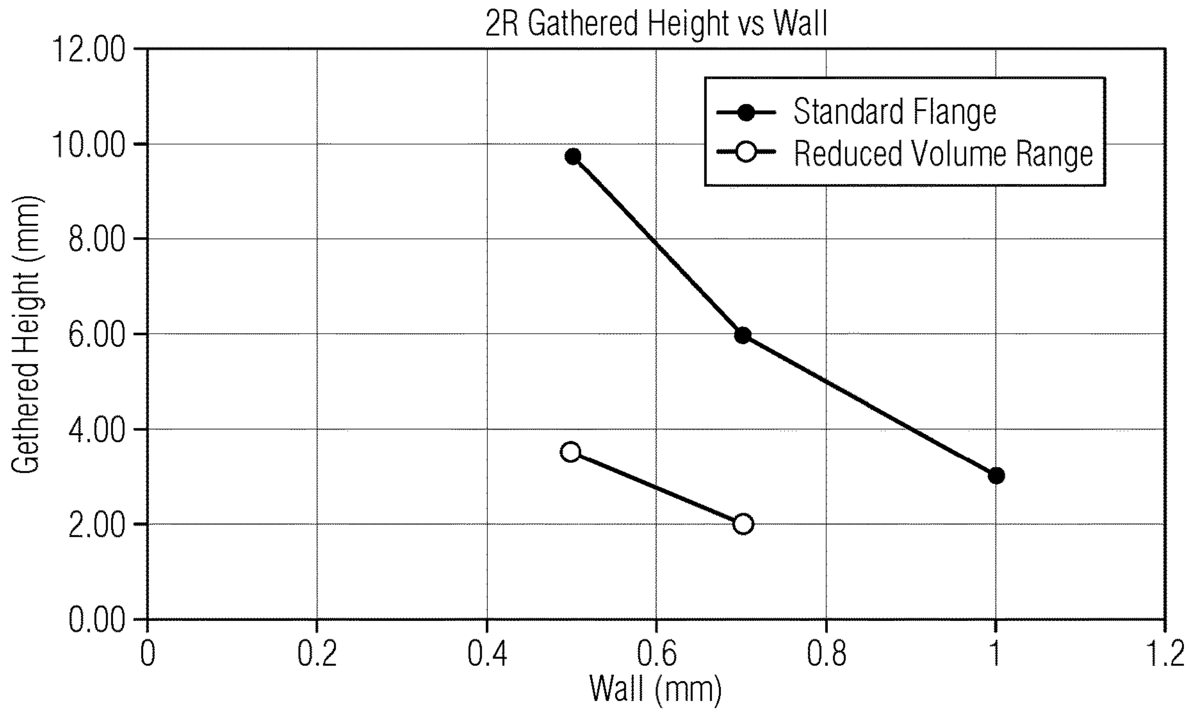
FIG. 14 is a plot of gathered height (y-axis) as a function of wall thickness (x-axis) for standard flange and cold-storage flange designs, according to one or more embodiments shown and described herein.

As discussed above, in some embodiments, the glass container 100 is formed with a region having a reduced glass volume relative to the same region of a standardized glass container of the same type and size. For example, the flange 126 of the glass container 100 of size X may be modified so as to comprise less volume than a flange of a glass vial of size X as defined by ISO 8362-1 where X is one of a size designation of 2R, 3R, 4R, 6R, 8R, 10R, 15R, 20R, 25R, 30R, 50R, and 100R. Such embodiments are shown in FIGS. 3 and 4. It has been discovered that the gathering time (i.e., the time it takes to gather softened glass of a tube to form the flange portion of the container) may be decreased in such designs as the required gathering height decreases as less glass is needed to form the flange. The gathering height required to make a reduced volume flange relative to a standard flange is presented in FIG. 14. The demonstrated decreased gathering height decreases the amount of heating required during the gathering step of the conversion process. Accordingly, for the same burner output, producing a flange with reduced volume, such as those discussed above with respect to low temperature storage applications, will decrease the time required for gathering glass into the flange. Therefore, the combination of a reduced wall thickness and reduced volume flange synergistically improve the overall throughput of the tube-to-vial conversion process by separately increasing the separation speed and the decreasing the time required for gathering.

A further benefit of a reduced volume flange is the potential for a mitigated or eliminated annealing step. Residual stresses from the conversion process typically require an annealing cycle to remove the stresses and obtain a uniform vial stress distribution. However, it has been found that glass articles having thinner walls may show reduced residual thermal stresses as a result of having a reduced thermal gradient through the thickness of the sidewall during cooling. However, the flange of a glass pharmaceutical vial, for example, is cooled from the gathering conversion step in a relatively thicker state and thus does not benefit from a thinner wall to the same extent as the sidewall of the vial. The flange thus incurs a higher thermal gradient and the corresponding residual stresses upon cooling. Therefore, in some embodiments, the glass article comprises a reduced volume flange region which, like the sidewall of the disclosed thin wall glass containers, possesses a reduced thermal gradient upon cooling. As such, the combination of a decreased wall thickness and a reduced volume flange may be particular advantageous when it comes to reducing or eliminating the annealing cycle as the combination reduces the residual thermal stresses the annealing step is meant to alleviate.

Vial Neck Geometry

As briefly mentioned above with reference to the reduced volume flange (see FIGS. 3 and 4), formed glass pharmaceutical vials may be filled with a pharmaceutical composition and thereafter capped using a capping machine. During the capping process, the neck 128 of the vial may come into contact with a portion of the capping machine referred to as the rail. Contact between the rail of the capping machine and the neck 128 of the glass pharmaceutical vial may result in cosmetic damage to the neck 128 of the glass pharmaceutical vial or even more severe flaws (i.e., more severe than superficial, cosmetic damage) which may reduce the strength of the glass pharmaceutical vial, potentially resulting in failure of the vial and loss of product.

It has now been found that reducing the thickness of the sidewall of the glass pharmaceutical vial may, in turn, reduce the thickness of the neck 128 of the glass pharmaceutical vial as well as the OD of the neck 128 which, in turn, may reduce the risk of contact between the rail of the capping machine and the neck 128 of the glass pharmaceutical thereby mitigating the potential for damage to the glass pharmaceutical vial. With reference to FIG. 1, if the neck internal diameter (neck ID) $N_{ID}$ of a glass container is kept constant, a glass container formed from a thinner sidewall will have a smaller neck outside diameter (neck OD) $N_{OD}$ (assuming no intentional thickening of the neck wall thickness). The flange outer diameter $F_{OD}$ is typically fixed according to vial specifications.

Figure 15:
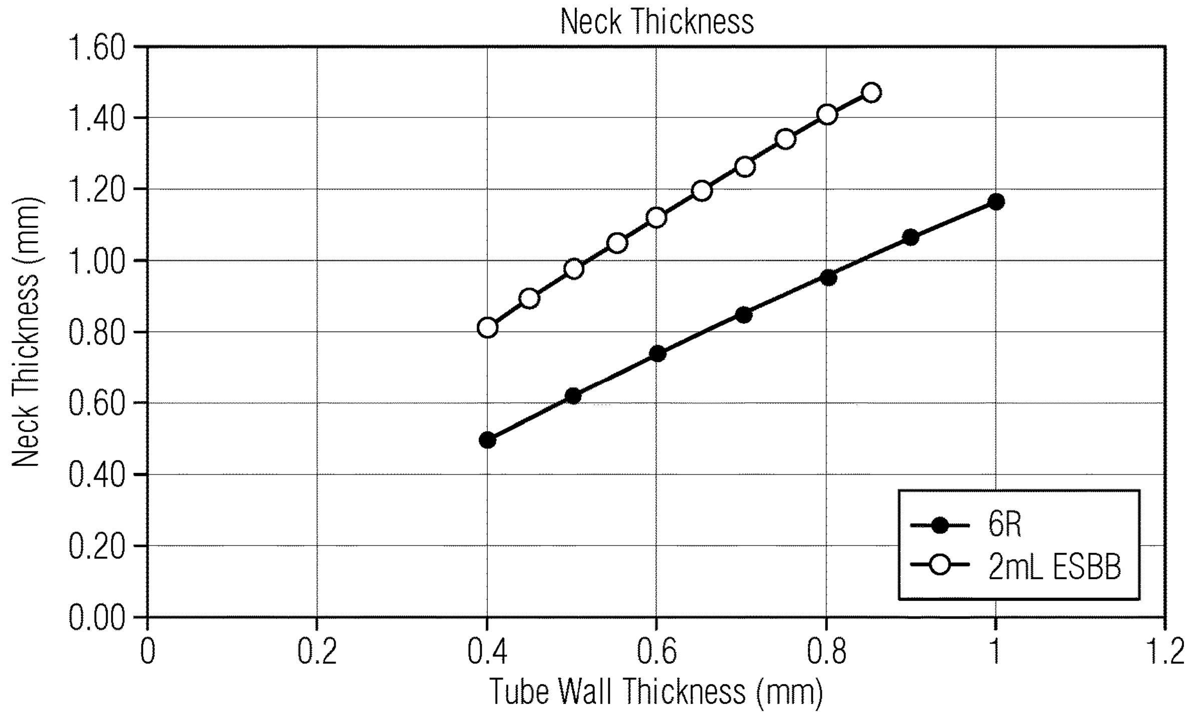
FIG. 15 a plot of vial neck thickness (y-axis) as a function of tube wall thickness (x-axis)
Figure 16:
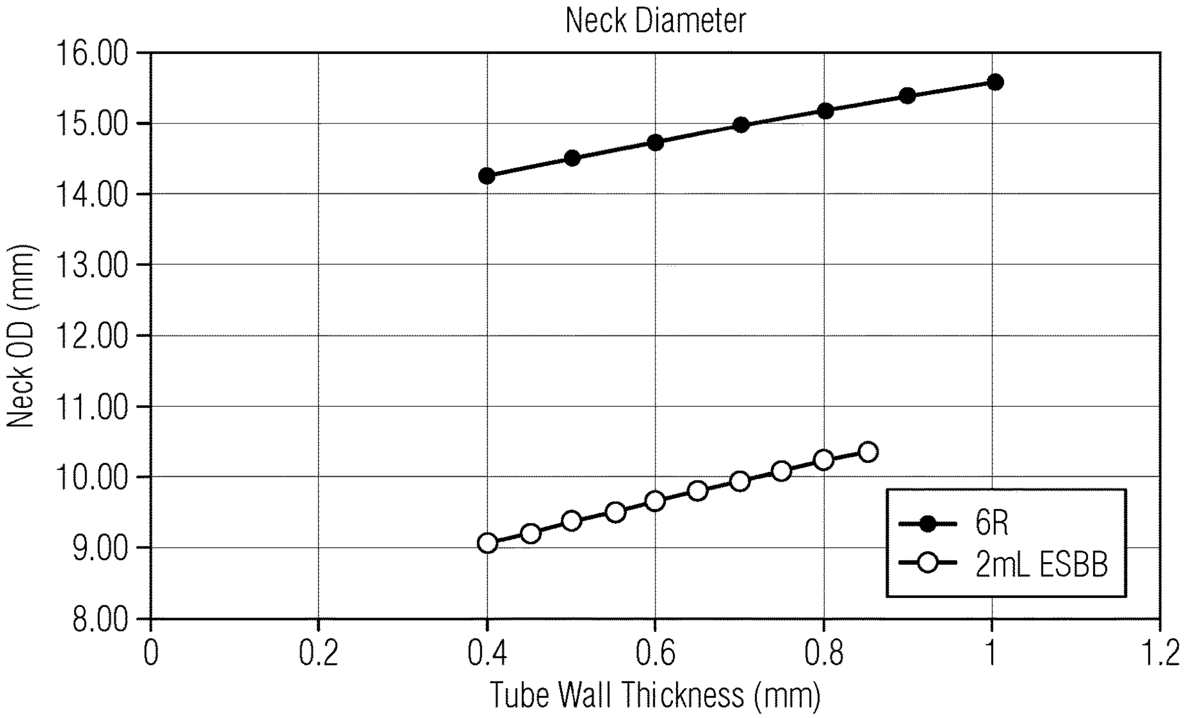
FIG. 16 a plot of vial neck outside diameter (y-axis) as a function of tube wall thickness (x-axis)

In particular, for most vials, glass tubing with a sidewall thickness of 1.0 mm or less results in glass pharmaceutical vials having a sufficient neck OD to avoid damage from the rail of the capping machine. For example, FIG. 15 shows the relationship between tube wall thickness and the neck thickness of the resultant glass vials (i.e., glass vials having a size designation of 6R and 2 ml (with a European Standard Blowback (ESBB)). As shown in FIG. 15, as the tube wall thickness decreases, the neck thickness also decreases. FIG. 16 shows the relationship between tube wall thickness and the neck OD of the resultant glass vials (i.e., glass vials having a size designation of 6R and 2 ml). As shown in FIG. 16, as the tube wall thickness decreases, the outer diameter of the neck also decreases. As noted herein, decreasing the neck OD of the glass pharmaceutical vials aids in avoiding contact with the rail of the capping machine which, in turn, reduces or mitigates damage to the glass pharmaceutical vial. That is, reducing wall thickness of the glass pharmaceutical vial may aid in avoiding damage to the glass pharmaceutical vial during filling and capping.

Figure 17:
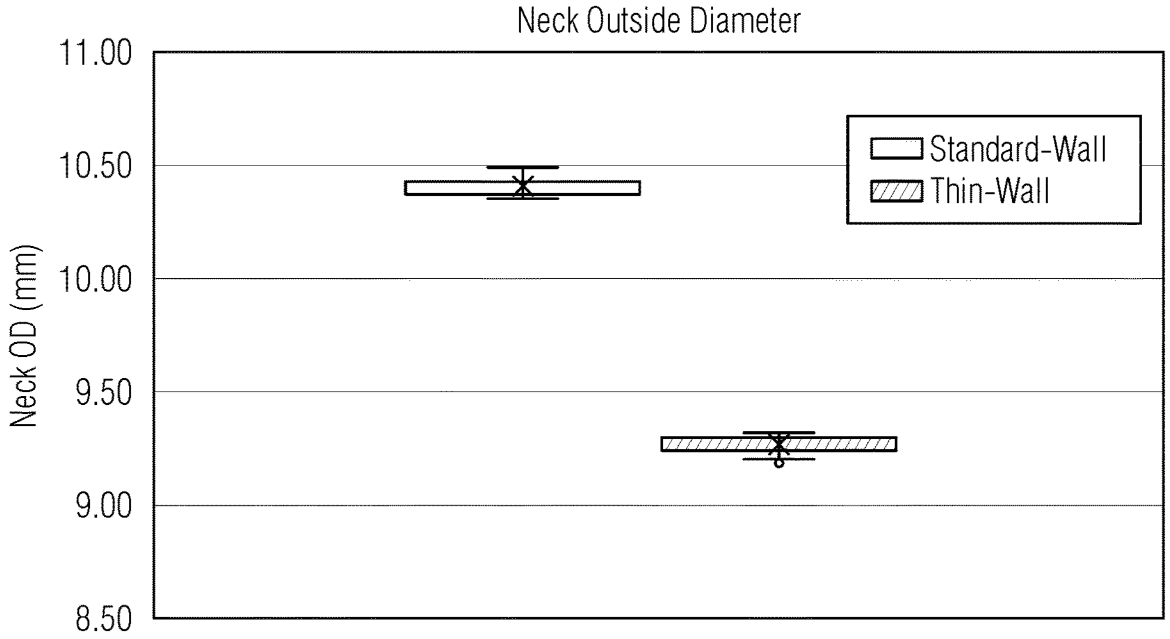
FIG. 17 a plot of vial neck outside diameter for a glass pharmaceutical vial comprising a standard wall thickness and a thin wall glass pharmaceutical vial, according to one or more embodiments shown and described herein.

FIG. 17 presents neck outside diameter data (30 vials each) measured for 3 ml thin wall vials (0.7 mm wall thickness) and 3 ml standard wall vials (1.1 mm wall thickness). As can be seen, the thin wall vials have a neck outside diameter at least 1 mm less than the neck outside diameter of the corresponding standard wall vial. One specific manufacturing benefit a decreased neck outside diameter offers is a larger process window of the position of the rail capper that is able to avoid damage or breakage of the vial.

Figure 18:
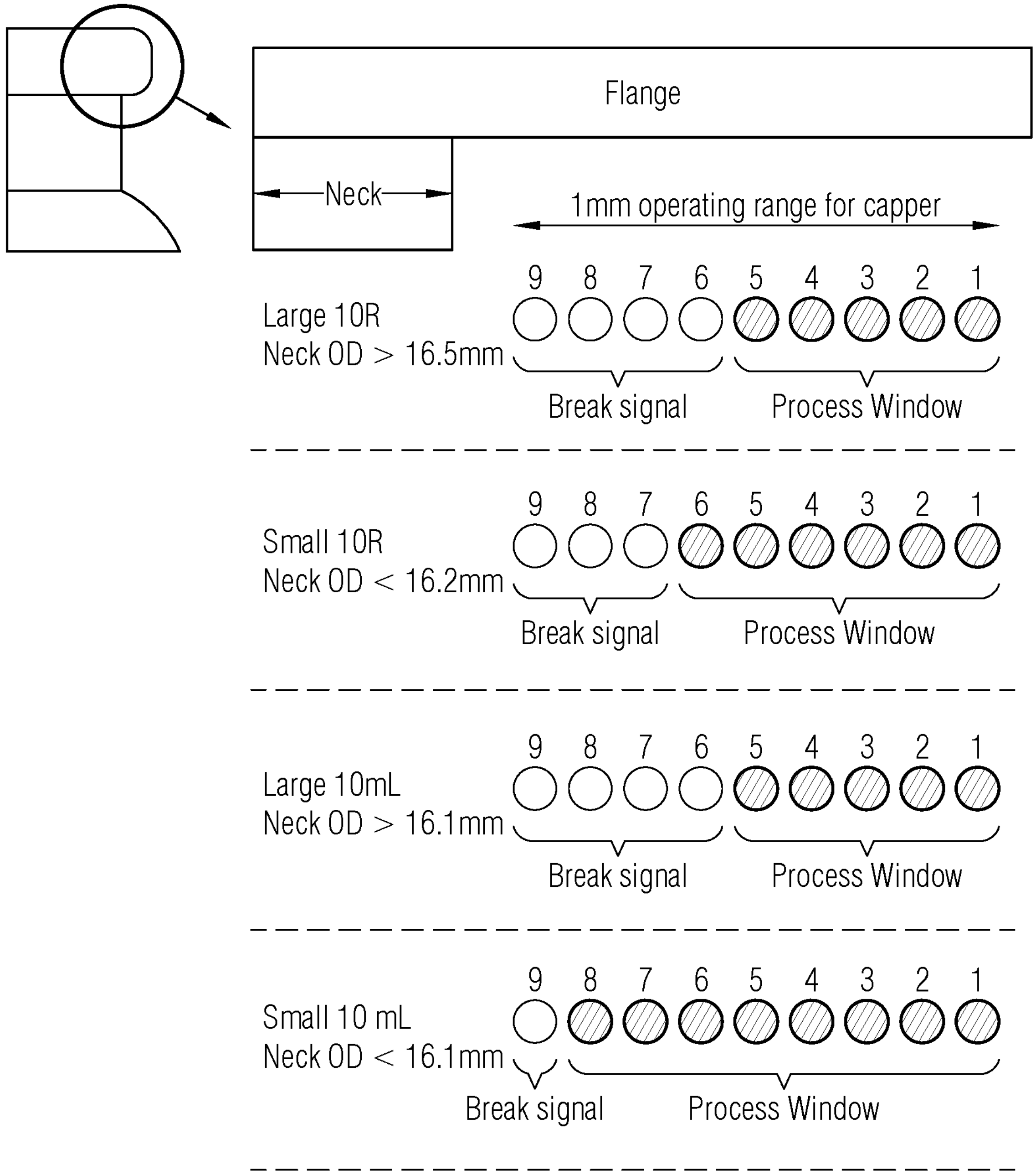
FIG. 18 is a diagram showing the process window of the position of the rail capper during a rail capper experiment described herein.

To understand the process window of the position of the rail capper in regards to damage incurred on the vial neck, a vial capping experiment was performed, the results of which demonstrate how a vial with a smaller neck outside diameter allows for a wider process window. FIG. 18 shows the process window of the position of the rail capper during the experiment, wherein two vial sizes were tested: 10R and 10 ml. The “Large 10R” and “Large 10 mL” vials having a neck outside diameter greater than 16.5 mm and greater than 16.1 mm, respectively, represent vials having conventional wall thicknesses. The “Small 10R” and “Small 10 mL” vials having a neck outside diameter less than 16.5 mm and less than 16.1 mm, respectively, represent vials formed with relatively thinner walls. The numbers in FIG. 18 correspond to incremental positions in which the capper can be positioned relative to the rail capper apparatus. As can be seen, the operating range for the capper is greater for the vials having a smaller neck outside diameter. Accordingly, it has been demonstrated that vial neck outside diameters can be reduced through the use of thinner walls, and the resulting reduced neck outside diameter may increase the operating window of the position of the rail capper. Moreover, a larger operating window for the rail capper will decrease the probability of neck damage during cap crimping by increasing the distance between cap crimping tooling and the vial neck.

Filling Line Benefits

The glass containers described herein comprise an increased compliance relative to conventional glass containers. The increased flexibility of the glass containers 100 due to the thinner sidewalls 120 decreases the probability of process upsets and breakage associated with misalignment of the glass containers with filling line equipment such as star wheels and screw feeds. In particular, the increased flexibility of glass containers 100 formed with thinner sidewalls results in lower filling line forces on the containers during abrupt stoppage events on the filling line. That is, the increased flexibility of the glass containers 100 due to the thinner sidewalls causes the forces to be distributed over a larger area as the container flexes under the applied load, reducing the overall force per unit area on the container. These lower forces result in lower stress on the containers, less incurred damage, and ultimately less breakage.

In addition, the increased flexibility of the glass container in combination with the presence of a low-friction coating applied to the exterior surfaces of the glass container have a synergistic effect that provides several benefits. To demonstrate these benefits, an Accumulator Table Experiment was performed wherein jams and intervention events were monitored for uncoated 1.1 mm 3 ml vials and coated 0.7 mm 3 ml vials. The phrase "intervention rate" refers to the rate of events (in events per hour (eph)) which require human intervention to remediate jams or stoppages along the filling line. These events may be caused by, for example and without limitation, jams due to the interaction between containers or between containers and equipment, stoppages due to broken containers, and the like, each of which may cause down time and/or underutilization of the equipment of the filling line. The phrase "jam rate" refers specifically to the rate of jams per minute.

Figure 19:
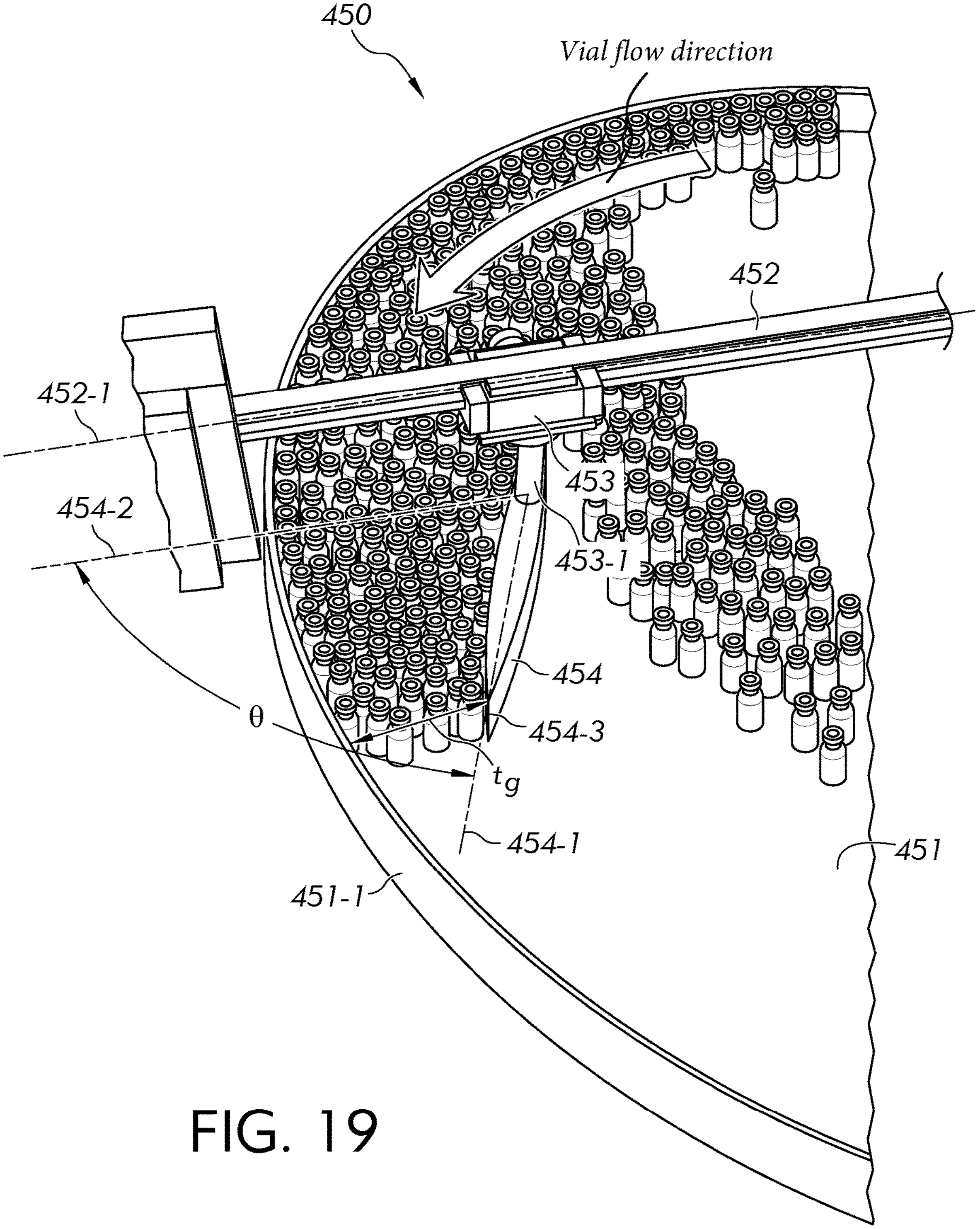
FIG. 19 schematically depicts a restriction table used for an Accumulator Table Experiment.

The coating composition, application procedure, and thickness of the coating is described hereinabove. The Accumulator Table Experiment involved running the vials through the restriction table 450 shown in FIG. 19 at a speed of 400 vials per minute, which is typical of a filling line. The restriction table 450 comprises a table surface 451, a track 452 containing paddle position gauges (not shown in FIG. 19), and a positioning block 453 used to position a wedge-shaped Delrin paddle 454 in the path of the vials (labeled "vial flow direction" in FIG. 19). The table surface 451 is circularly shaped and has a diameter of 42 inches. The track 452 extends radially from the center of the table surface 451 and comprises a longitudinal axis 452-1. The paddle 454 comprises a longitudinal axis 454-1 and has a longitudinal length of approximately 8 inches. The paddle 454 is connected to the positioning block 453 via a rod 453-1. A zero line 454-2 extends from the connection point between the paddle 454 and the rod 453-1 in a direction parallel to the longitudinal axis 452-1 of the track 452. The paddle 454 may be rotated such that an angle θ between the longitudinal axis 454-1 of the paddle 454 and the zero line 454-2 may be adjusted, thereby changing the angle between the approaching vials and the paddle 454 as well as the gap $t_g$ between an outer tip 454-3 of the paddle 454 and a circumferential border 451-1 of the table surface 451. For the Accumulator Table Experiment, the angle θ was set to 80° and the gap $t_g$ was set to approximately 117 mm. The rotational speed of the table surface 451 was set to 3.8 rpms.

Figure 20A:
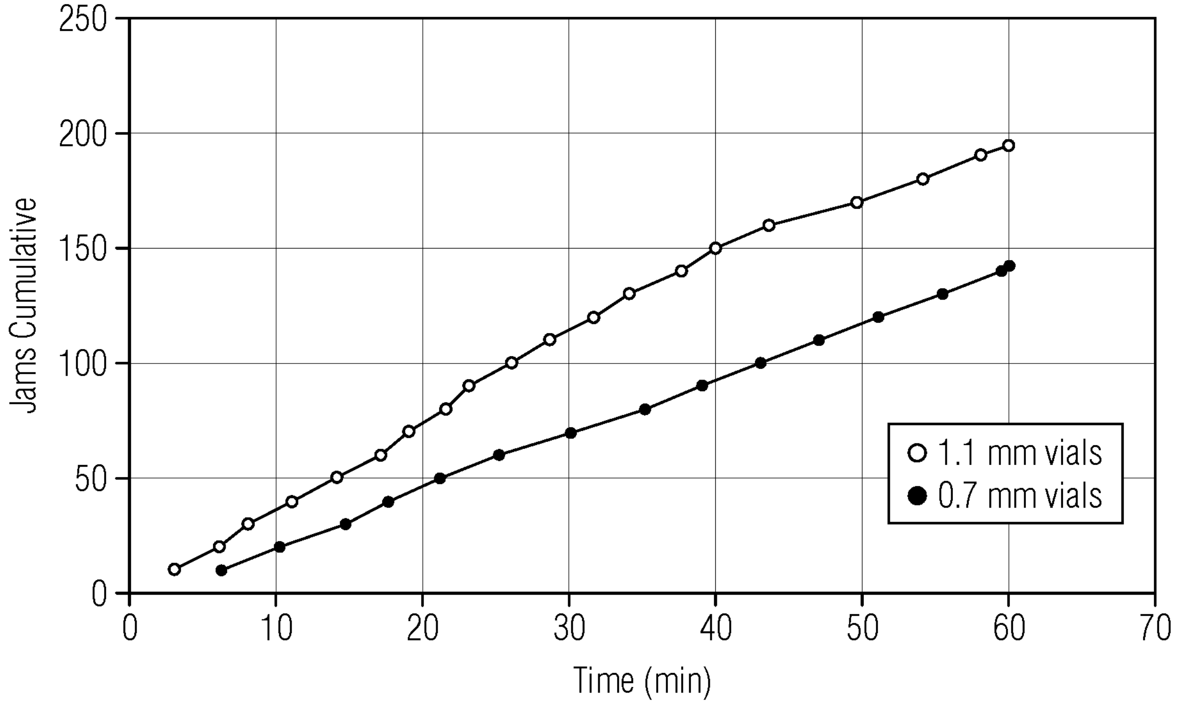
FIG. 20A is a plot showing cumulative jams (y-axis) as a function of run time (x-axis) obtained during an Accumulator Table Experiment.

FIG. 20A shows the number of jams recorded over a 1 hour period for each of the tested vial types. As can be seen, the 0.7 mm vial test run involved significantly less jam events, which can be at least partially attributed to the combination of the improved vial compliance and the low friction coating. While running the vials through the restriction table 450 at a rate of 400 vials per minute, the 0.7 mm vials had a jam rate of approximately 2.4 jams/minute and the 1.0 mm vials had a jam rate of approximately 3.2 jams/minute. Accordingly, in embodiments of the coated glass containers described herein, the jam rate may be less than or equal to 3 jams/minute, less than or equal to 2.75 jams/minute, or even less than or equal to 2.5 jams/minute.

Figure 20B:
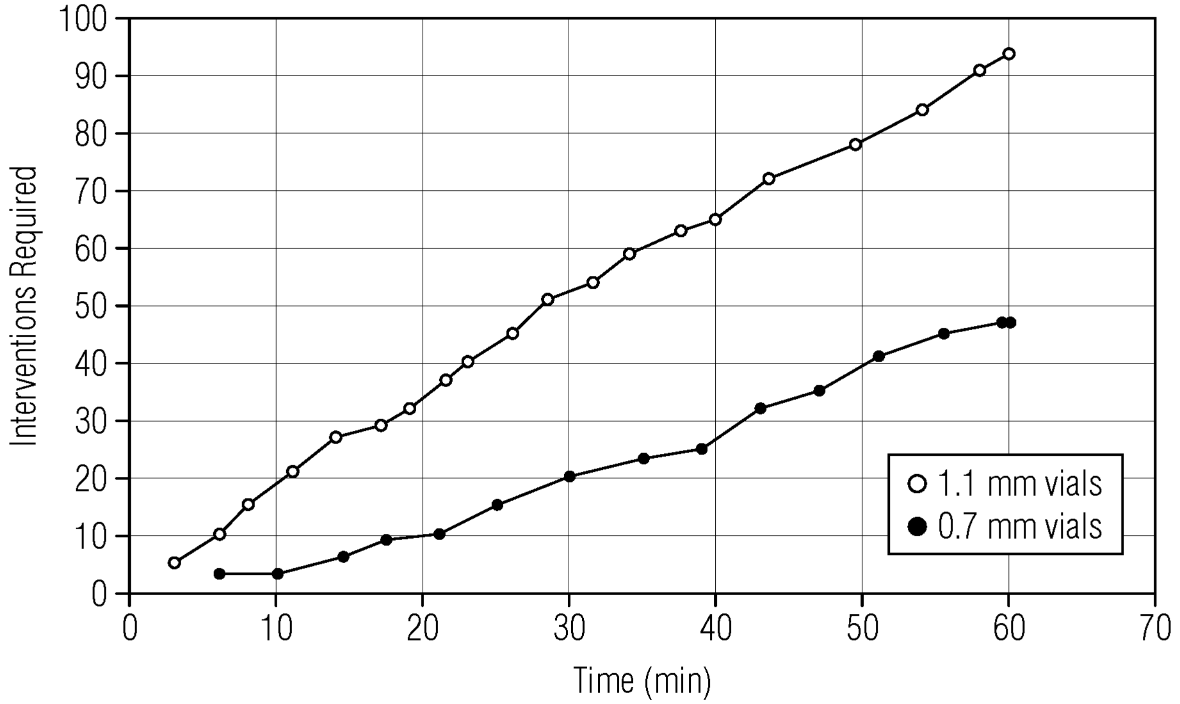
FIG. 20B is a plot showing interventions required (y-axis) as a function of run time (x-axis) obtained during an Accumulator Table Experiment.

Additionally, as shown in FIG. 20B, the coated 2R vials having a wall thickness of 0.7 mm vials required significantly less line interventions. While running the vials through the restriction table 450 at a rate of 400 vials per minute over the course of one hour, the 2R vials having a wall thickness of 0.7 mm had an intervention rate of approximately 47 eph and the uncoated 2R vials having a wall thickness of 1.0 mm had an intervention rate of approximately 94 eph.

In embodiments, the coated glass containers described herein may have an intervention rate of less than or equal to $1.0\times R_I$, where $R_I$ is the intervention rate of an uncoated glass container having a conventional thickness. In embodiments, the intervention rate may be less than or equal to $0.90\times R_I$, less than or equal to $0.80\times R_I$, less than or equal to $0.70\times R_I$, less than or equal to $0.60\times R_I$, or even less than or equal to $0.50\times R_I$.

Without wishing to be bound by theory, these improvements are believed to arise from the combination of the improved compliance of the thin wall vials and the presence of the low friction coating. Moreover, the improved filling performance of the thin wall vials may permit filling lines using such thin wall vials to be operated at greater speeds while requiring the same amount of interventions as vials having a conventional thickness vials operated at relatively slower speeds. Accordingly, in some embodiments, the externally coated glass containers having a reduced wall thickness are capable of being run through filling lines at faster speeds compared to conventional glass vials with the same outer diameter, but lacking the compliance and external coating.

Mechanical Performance

As previously discussed, glass containers, such as glass pharmaceutical vials, formed with sidewalls having a reduced thickness relative to conventional glass vials with the same diameter, may possess certain mechanical advantages. In particular, reducing the thickness of the sidewall increases the flexibility or compliance of a vial under applied loads directed orthogonally into the sidewall. Because the sidewall flexes in response to an applied load, the force of the applied load is distributed over a larger area of the sidewall. Accordingly, for a given applied load, a vial having a more flexible sidewall will experience lower peaks loads at the point of loading than a vial having a sidewall that is more rigid (i.e., thicker). In particular, because the vial flexes in response to the applied load, the force of the applied load is distributed over a larger area. Moreover, under certain loading conditions, reducing the overall stress in the material per unit area may reduce the likelihood of surface damage and/or breakage. This is especially true with an externally coated vial, such as the coating compositions and application procedures discussed above and disclosed in U.S. Pat. Nos. 10,273,049 and 9,763,852. That is, it has been unexpectedly found that reducing the thickness of the sidewalls of the vial and including a thin coating to the sidewall of the vial has the synergistic effect of improving the mechanical performance of the glass container.

For example, decreasing the thickness of the sidewall of a vial lowers the strength of a vial. However, when a vial is provided with an external coating, the coating is able to limit the introduction of flaws in the surface of the glass on filling lines or even during shipping and handling. When compared with an uncoated conventional vial (i.e., a vial with a greater thickness), a coated thin wall vial has an increased resistance to damage and breakage during shipping and typical pharmaceutical filling line processes. This is unexpected at least because it is generally understood that reducing the thickness of glass article, such as glass container, increases the propensity of the glass article to mechanical failure.

In addition, it has been found that frictive stresses experienced during, for example, vial-to-vial contact may be reduced in glass containers 100 with thinner sidewalls 120 due to the increased flexibility of the sidewalls. Specifically, during a frictive event, the sidewalls of the glass container may flex, increasing the surface area at the point of contact and thereby distributing the frictive force over a larger area, thereby lowering the frictive stress per unit area. This may result in less surface damage on the glass during frictive events. Less surface damage (e.g., fewer scuffs, scratches, glass checks, etc.), in turn, results in a reduced propensity for breakage and failure as there are fewer crack-origination sites. This increased flexibility can also be used to increase the line speeds of the pharmaceutical filling lines beyond speeds used with containers having relatively thicker sidewalls.

Compliance

The Vial Compliance Test is used to determine the compliance of the glass containers described herein, in particular, the glass pharmaceutical vials described herein. The Vial Compliance Test involves quasi-static mechanical loading on the outer surface of the sidewall of the glass container and is performed according to the following procedure.

Figure 21:
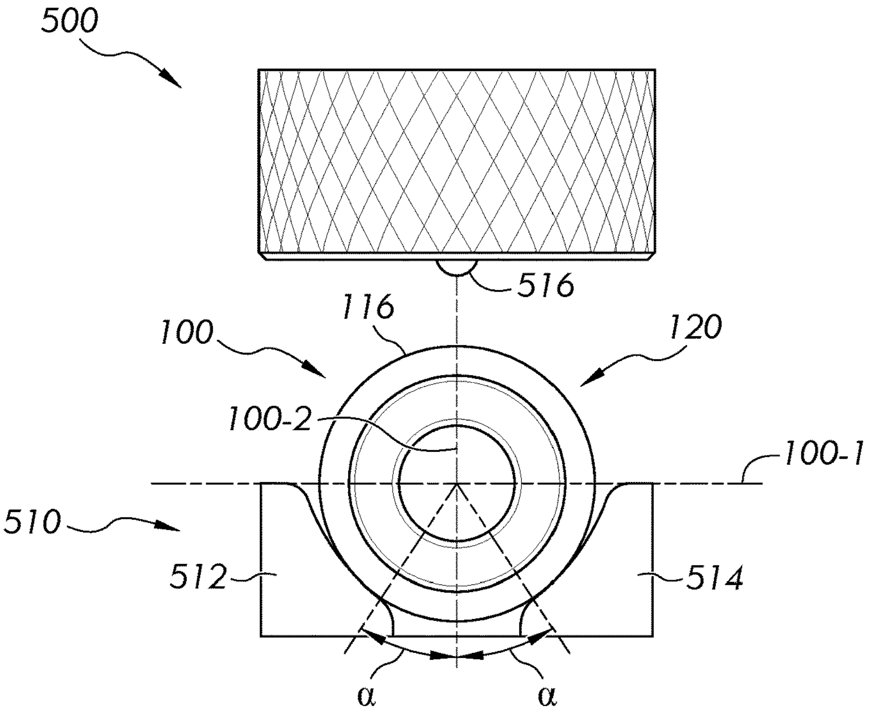
FIG. 21 schematically depicts a Vial Compliance Test described herein.

The Vial Compliance Test apparatus 500 shown in FIG. 21 is used to perform compliance measurements on the glass containers described herein, in particular, the glass pharmaceutical vials described herein. The glass container 100 is positioned in a fixture 510 that cradles the lower half of the glass container 100. The fixture 510 comprises a left support structure 512 and a right support structure 514, each of the left and right support structures 512, 514 being configured to support a portion of the circumference of the glass container 100 in a bottom quadrant of the glass container 100. The support structures 512, 514 are stainless steel. In particular, each support structure 512, 514 supports roughly 60-70 degrees of the circumference of the glass container 100 in a bottom quadrant of the glass container 100, as shown in FIG. 21 ($\alpha$=20 degrees). The supported portions along the circumference in the bottom quadrants of the glass container 100 generally extend from a horizontal split line 100-1 of the glass container 100 down to approximately 20 degrees from the vertical split line 100-2 of the glass container 100. However, the supported portion of the glass container 100 will vary slightly as the glass container 100 flexes in response to the applied load.

A universal testing machine (UTM) is used to perform the Vial Compliance Test. In particular, a ⅛" hardened steel ball 516 is pressed into the exterior surface 116 of the sidewall 120 and the displacement-load curve is recorded. The force between the hardened steel ball 516 and the glass container 100 is ramped up from 0 to 400 N at a displacement rate of 0.25 mm/min. The compliance of the glass container is determined by fitting a straight line to displacement-load data in the region between 100 N and 250 N of applied force, wherein the slope of the line is the compliance.

Figure 22A:
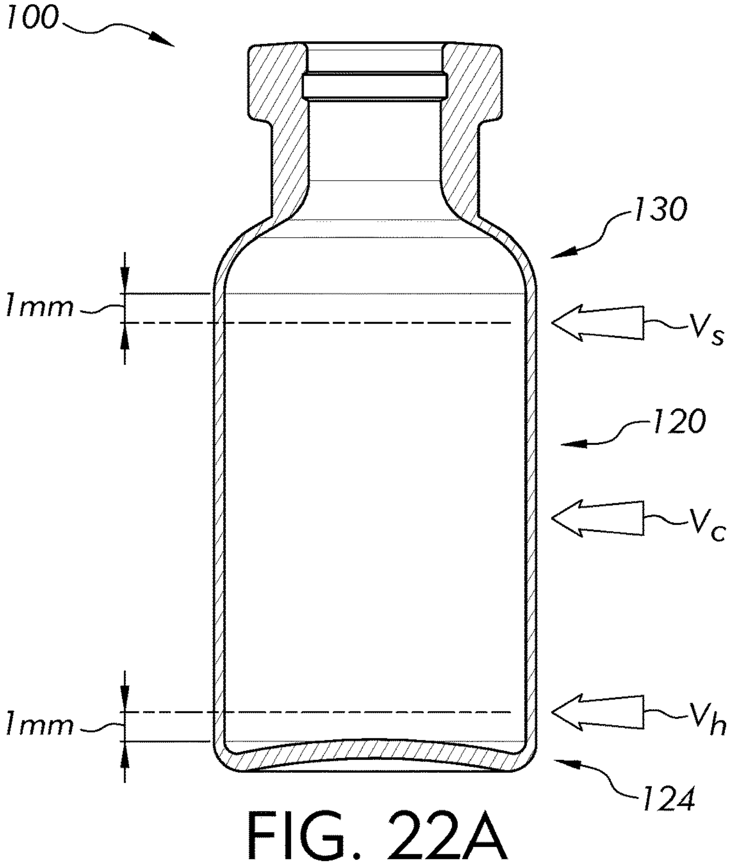
FIG. 22A schematically depicts the test locations for the Vial Compliance Test described herein.

Referring to FIG. 22A, the Vial Compliance Test involves performing three local compliance measurements at the following positions along the sidewall 120: the center of the sidewall 120 ($v_c$); adjacent to the heel portion 124 ($v_h$); and adjacent to the shoulder 130 ($v_s$). As shown in FIG. 22A, the sidewall test location adjacent to the heel portion 124, $v_h$, is 1 mm away from the heel portion-sidewall transition in a direction parallel the central axis. As shown in FIG. 22A, the sidewall test location adjacent to the shoulder 130, $v_s$, is 1 mm away from the shoulder-sidewall transition in a direction along the sidewall 120 and parallel the central axis. The center of the sidewall 120 test location, $v_c$, is centered between $v_h$ and $v_s$. The average sidewall compliance of the glass container is determined by averaging the center sidewall compliance, the heel portion compliance, and the shoulder compliance.

Figure 22B:
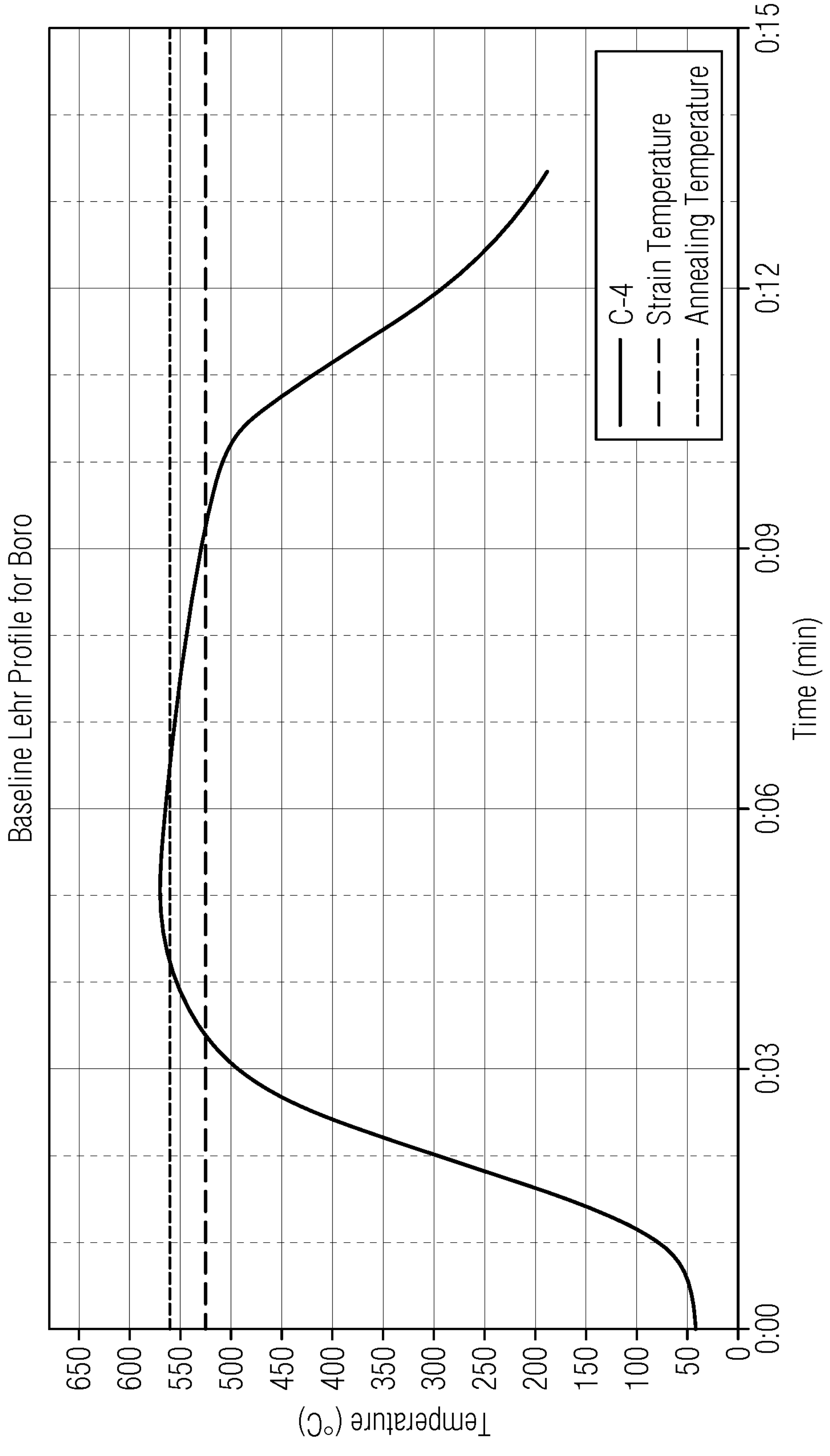
FIG. 22B is a plot showing a temperature profile of a LEHR furnace used to anneal embodiments of glass containers described herein.
Figure 23:
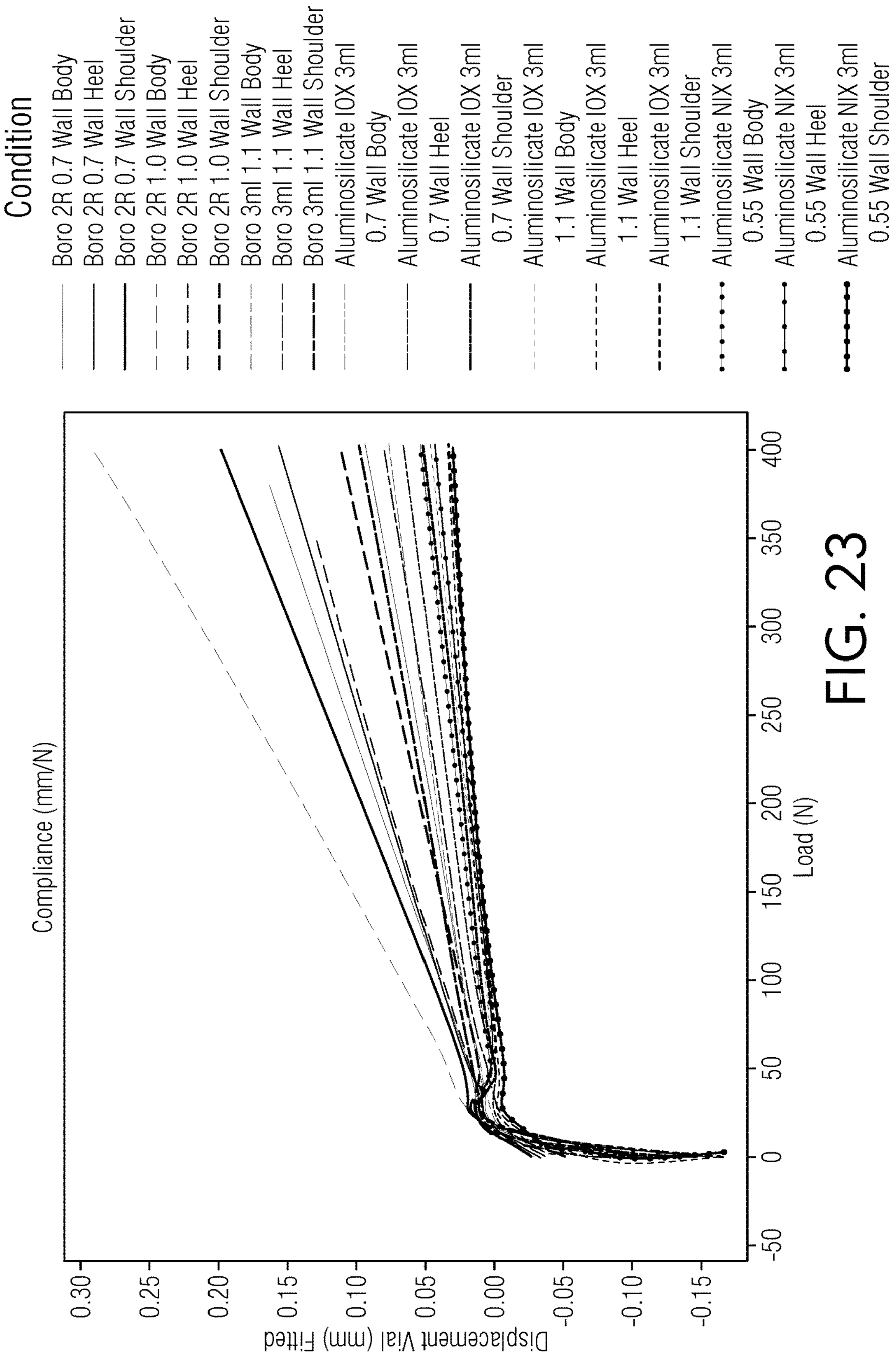
FIG. 23 is a plot showing displacement-load data for measurements performed according to the Vial Compliance Test described herein.

The Vial Compliance Test was performed on glass pharmaceutical vials having an ISO 8362-1 size designation of 2R as well as standard 3 ml vials (described above). For the 2R vials, tests were performed on: (i) borosilicate glass vials having a wall thickness as defined by ISO 8362-1 (i.e., 1.0 mm) and (ii) borosilicate glass vials having a wall thickness less than or equal to 0.7 times the standard wall thickness as defined by ISO 8362-1 (i.e., 0.7 mm for vials having a conventional thickness of 1.0 mm). For the 3 ml vial compliance measurements, tests were performed on borosilicate glass vials having a wall thickness of 1.1 mm. Additionally, for the 3 ml compliance measurements, tests were performed on aluminosilicate (Corning® Valor®) ion-exchanged and non-ion-exchanged glass vials, the non-ion-exchanged vials having a wall thickness of 0.55 mm and the ion-exchanged vials having wall thicknesses of 0.7 mm and 1.1 mm. All vials tested for compliance were annealed in a furnace according to the LEHR temperature profile shown in FIG. 22B. The ion-exchange treatment for the aluminosilicate glass vials measured for compliance involved placing the glass containers into a 470° C. molten salt bath comprising $KNO_3$ for 5.5 hours. The resulting surface compressive stress for the 1.1 mm and 0.7 mm ion-exchanged vials was ~500 MPa and ~511 MPa, respectively. The resulting depth of compression for the 1.1 mm and 0.7 mm ion-exchanged vials was ~69 μm and 63 μm, respectively. None of the vials tested for compliance were provided with an external coating. The data obtained from the compliance measurements is shown in FIG. 23, wherein presented compliance measurements were averaged over 10 tests for each vial type/location. The individual compliances determined for the three locations along the sidewall of the glass container are determined by evaluating the slope of the displacement-load in the elastic region spanning from 100 N to 50 N of applied force. The resulting individual compliance measurements (averaged over 10 tests) for each of the vial types are shown below in Table 6.

TABLE 6

| Vial Type and Test Location | Compliance (mm/kN) |
|---|---|
| Boro 2R 0.7 Wall Heel | 0.226 |
| Boro 2R 0.7 Wall Body | 0.431 |
| Boro 2R 0.7 Wall Shoulder | 0.290 |
| Boro 2R 1.0 Wall Heel | 0.135 |
| Boro 2R 1.0 Wall Body | 0.208 |
| Boro 2R 1.0 Wall Shoulder | 0.177 |
| Boro 3 ml 1.1 Wall Heel | 0.103 |
| Boro 3 ml 1.1 Wall Body | 0.153 |
| Boro 3 ml 1.1 Wall Shoulder | 0.144 |
| Valor ® IOX 3 ml 0.7 Wall Heel | 0.260 |
| Valor ® IOX 3 ml 0.7 Wall Body | 0.398 |
| Valor ® IOX 3 ml 0.7 Wall Shoulder | 0.266 |
| Valor ® IOX 3 ml 1.1 Wall Heel | 0.102 |
| Valor ® IOX 3 ml 1.1 Wall Body | 0.148 |
| Valor ® IOX 3 ml 1.1 Wall Shoulder | 0.142 |
| Valor ® NIX 3 ml 0.55 Wall Heel | 0.383 |
| Valor ® NIX 3 ml 0.55 Wall Body | 0.709 |
| Valor ® NIX 3 ml 0.55 Wall Shoulder | 0.494 |

Figure 24:
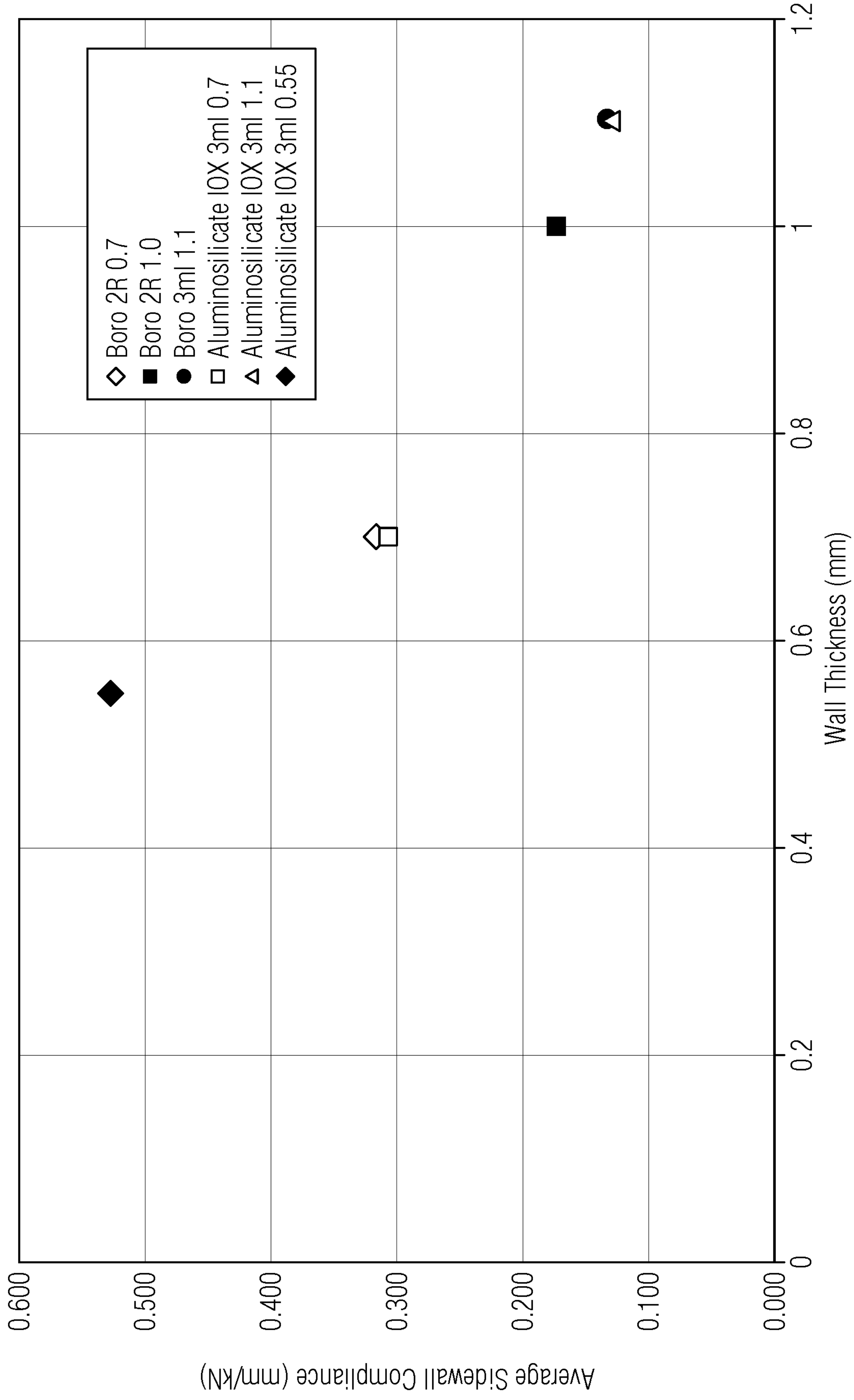
FIG. 24 is a plot showing average sidewall compliance (y-axis) as a function of wall thickness (x-axis) for glass pharmaceutical vials according to one or more embodiments shown and described herein.

Table 7 below shows the average sidewall compliance (i.e., average of the individual compliances measured at $v_h$, $v_s$, and $v_c$) for each of the tested vial types. The average sidewall compliance values presented in Table 7 are shown in FIG. 24 as a function of wall thickness.

TABLE 7

| Vial Type | Average Sidewall Compliance (mm/kN) |
|---|---|
| Boro 2R 0.7 | 0.316 |
| Boro 2R 1.0 | 0.173 |

TABLE 7-continued

| Vial Type | Average Sidewall Compliance (mm/kN) |
|---|---|
| Boro 3 ml 1.1 | 0.133 |
| Valor ® IOX 3 ml 0.7 | 0.308 |
| Valor ® IOX 3 ml 1.1 | 0.131 |
| Valor ® NIX 3 ml 0.55 | 0.529 |

In embodiments, the term "compliance factor" refers to the ratio between (i) the average sidewall compliance of a glass pharmaceutical vial comprising: a glass body having a sidewall enclosing an interior volume and an outer diameter D, wherein: the outer diameter D is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to $0.85*s_1$, wherein $s_1$ is a wall thickness of the glass vial of size X as defined by ISO 8362-1, and (ii) the average sidewall compliance of a glass pharmaceutical vial of size X having a sidewall thickness $s_1$ as defined by ISO 8362-1. In embodiments, the term "compliance factor" may refer to the ratio between (i) the average sidewall compliance of a glass pharmaceutical vial having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the average sidewall compliance of a glass pharmaceutical vial of size X having a sidewall thickness $s_1$ as defined by ISO 8362-1. In embodiments, the term "compliance factor" may refer to the ratio between (i) the average sidewall compliance of a glass pharmaceutical vial having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the average sidewall compliance of a glass pharmaceutical vial of size X having a sidewall thickness $s_1$ as defined by ISO 8362-1.

To facilitate discussion, the glass pharmaceutical vial associated with the denominator of the compliance factor may also be referred to as the "parent vial." Table 8 below shows the measured compliance factor for a borosilicate 2R vial having a reduced wall thickness of 0.7 mm as well as an ion-exchanged aluminosilicate 3 ml vial having a reduced wall thickness of 0.7 mm.

TABLE 8

| Vial Type | Wall Thickness of "Parent Vial" | Measured Compliance Factor |
|---|---|---|
| Boro 2R 0.7 mm | 1.0 mm | 1.821 |
| Valor ® IOX 3 ml 0.7 mm | 1.1 mm | 2.357 |

Accordingly, embodiments of the present disclosure include a glass pharmaceutical vial comprising: a glass body comprising a sidewall enclosing an interior volume and an outer diameter D, wherein: the outer diameter D of the glass body is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to $0.85*s_1$, wherein $s_1$ is a wall thickness of the glass vial of size designation X as defined by ISO 8362-1; and the glass pharmaceutical vial comprises a compliance factor of at least 1.5, at least 1.75, at least 2.0, or even at least 2.25, as determined in accordance with the Vial Compliance Test. Embodiments include a glass pharmaceutical vial comprising: a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of the glass vial of size designation X as defined by ISO 8362-1; and the glass pharmaceutical vial comprises a compliance factor of at least 1.5, at least 1.75, at least 2.0, or even at least 2.25, as determined in accordance with the Vial Compliance Test. Embodiments include a glass pharmaceutical vial comprising: a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of the glass vial of size designation X as defined by ISO 8362-1; and the glass pharmaceutical vial comprises a compliance factor of at least 1.5, at least 1.75, at least 2.0, or even at least 2.25, as determined in accordance with the Vial Compliance Test.

Figure 25:
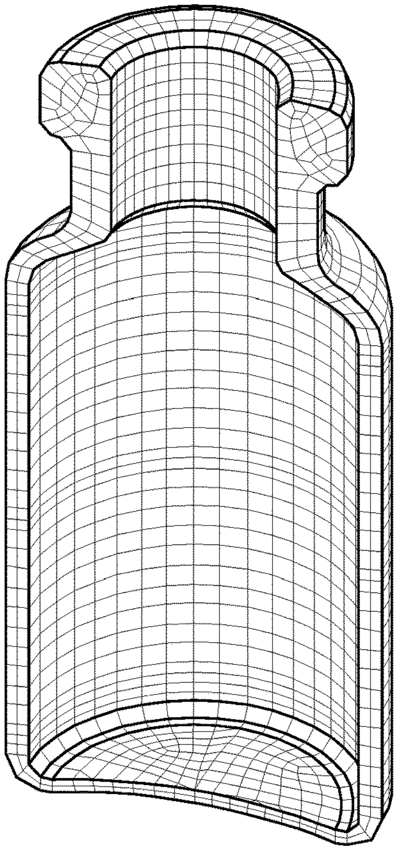
FIG. 25 schematically depicts a mesh of a glass pharmaceutical vial used for finite element analysis.

To evaluate the influence of wall thickness on the sidewall compliance of other standard sized glass containers, finite element analysis (FEA) was performed using ANSYS Engineering Simulation Software. A representative mesh used for the simulations is shown in FIG. 25 (2R structure). All simulated vial structures were created using specifications provided by ISO 8362-1 with the exception of the standard 3 ml vial, which does not have a corresponding ISO 8362-1 size designation. The material parameters input into the model were the Young's modulus, which was set at 70.88 GPa, and the Poisson's ratio, which was set at 0.199.

Figure 26:
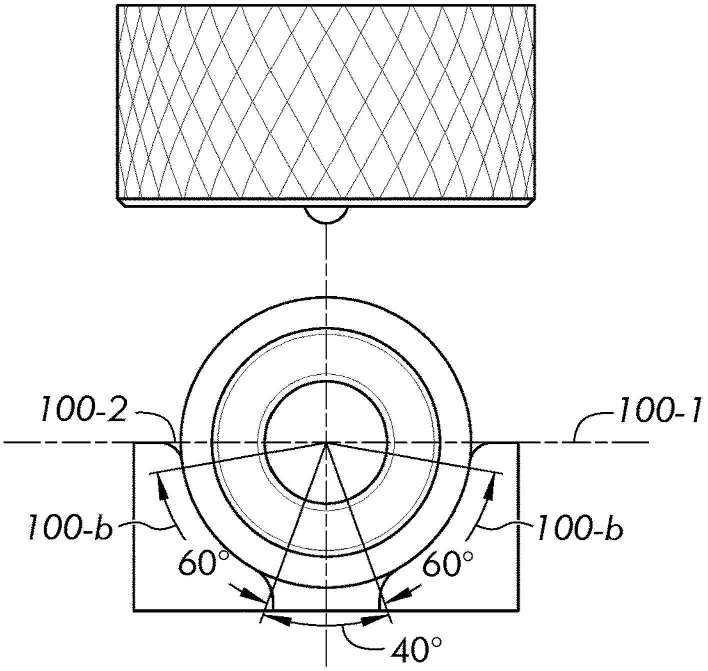
FIG. 26 schematically depicts boundary conditions implemented for finite element analysis described herein.
Figure 27:
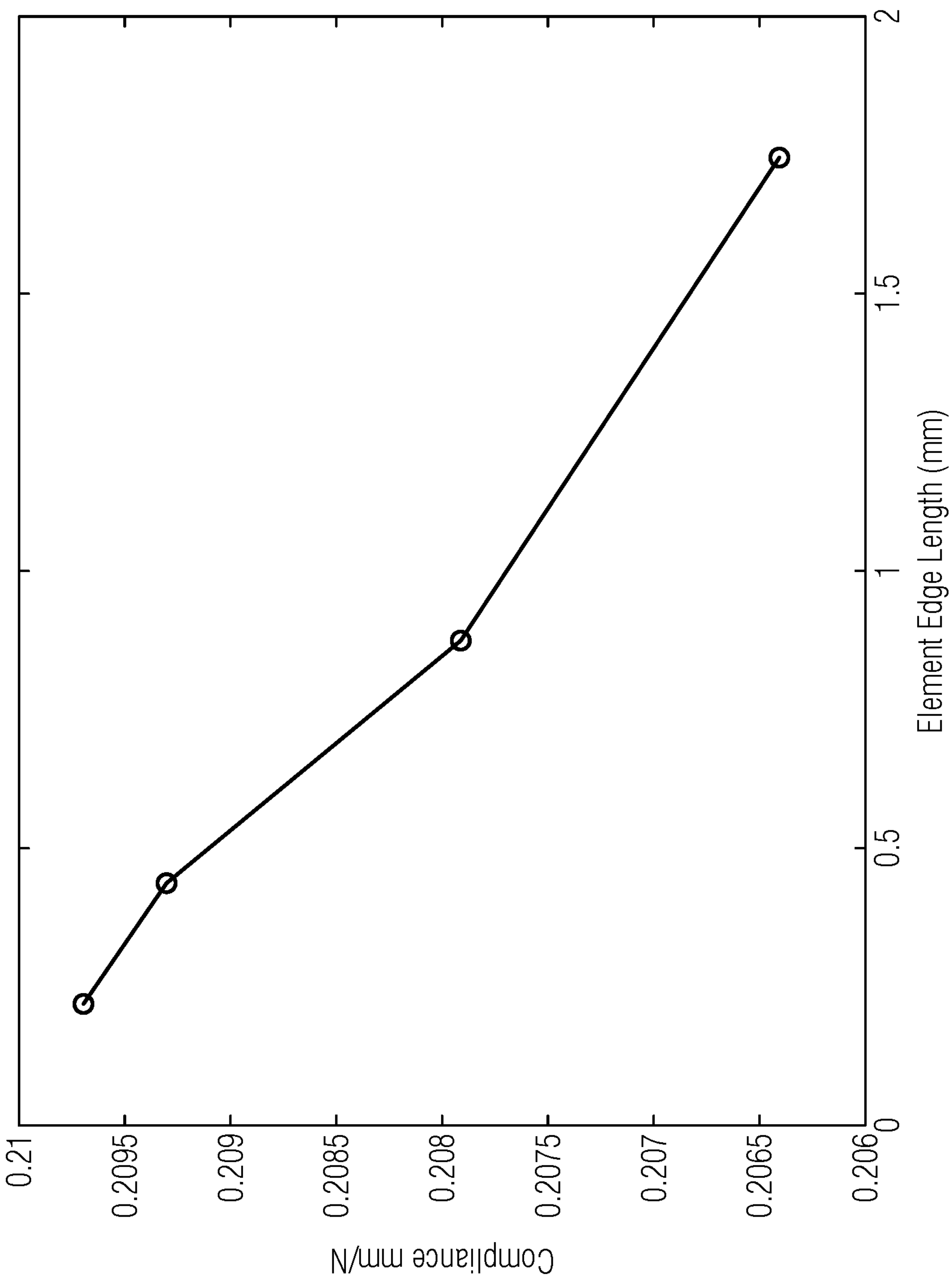
FIG. 27 is a plot demonstrating mesh convergence validation for finite element analysis described herein.

The boundary conditions used for the FEA compliance measurement simulations were set to match the vial compliance test apparatus 500 described above and shown in FIG. 26. Accordingly, the exterior surface 116 of the sidewall 120 of the modeled vial was constrained in all directions along 60 degrees of the vial circumference in each of the bottom quadrants of the vial. The constrained portions 100-*b* begin 10 degrees away from the horizontal split line 100-1 and extend downwards toward the vertical split line 100-2, as shown in FIG. 26. A surface load of 1 $N/mm^2$ was added within a small region (0.5 mm by 1.0 mm) to represent the hardened steel ball 516 used for the physical measurements described above. The simulated compliance is computed by dividing the displacement at the loading position by the total applied load. To validate the mesh convergence, meshes of varying levels of coarseness (default element edge length in mm (ANSYS parameter)) were implemented and the results were compared. The difference in the computed compliance for the coarsest mesh to the finest mesh was within 2% indicating the mesh coarseness in this range has relatively little impact on the simulated compliance measurements. The results of the convergence study are shown in FIG. 27. A mesh size corresponding to an element edge length of 0.9 mm was used for the simulations. The compliance measurement simulations were performed in the same three locations on each modeled vial as in the Vial Compliance Test described herein (i.e., $v_h$, $v_s$, and $v_c$).

Figure 28:
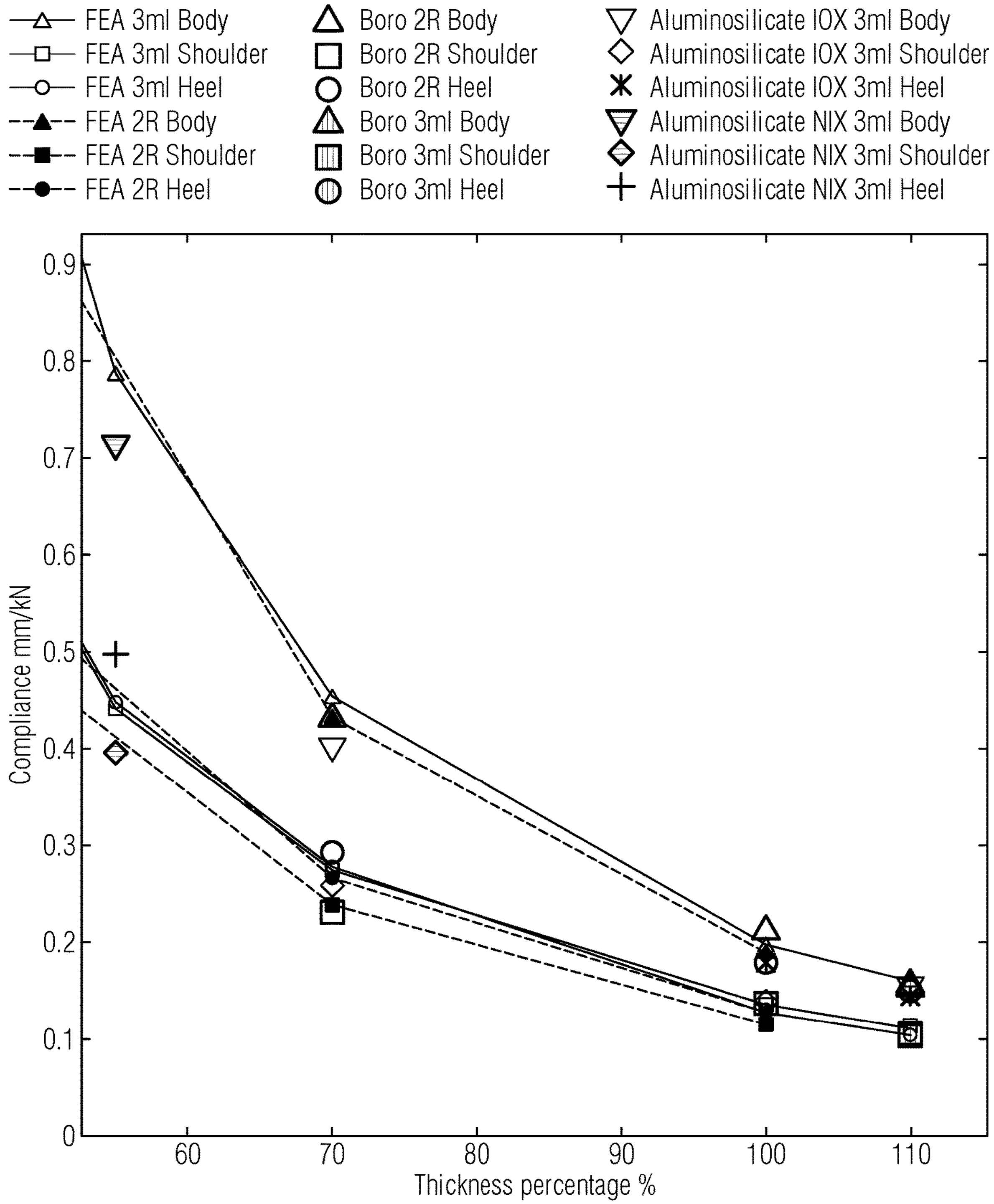
FIG. 28 is plot showing compliance measurements alongside experimental measurements demonstrating the validity of the finite element model used to determine the compliance of glass containers described herein.

FIG. 28 is a plot showing compliance measurements alongside experimental measurements demonstrating the validity of the finite element model used to determine the compliance of glass containers described herein. As can be seen, the finite element model captures the general trend of compliance as a function of thickness and also captures individually measured values for the compliance on various vial types at different sidewall locations, i.e., $v_h$, $v_s$, and $v_c$.

The modeled compliance factors for the 2R and 3 ml vials with reduced wall thickness are shown below in Table 9. The modeled compliance factor was within 20% of the experimentally measured compliance factor for each of the vials, as shown in Table 9.

TABLE 9

| Vial Type | Wall Thickness of "Parent Vial" | Measured Compliance Factor | Modeled Compliance Factor |
|---|---|---|---|
| Boro 2R 0.7 mm | 1.0 mm | 1.821 | 2.187 |
| Valor ® IOX 3 ml 0.7 mm | 1.1 mm | 2.357 | 2.642 |

Once the model was validated according to the procedure described above, a number of simulations were performed on the remaining ISO 8362-1 vial size designations to determine modeled compliance factors for vials having a reduced wall thickness, the results of which are present below in Table 10.

TABLE 10

| Vial Type (wall thickness) | Wall Thickness of "Parent Vial" | Modeled Compliance Factor |
|---|---|---|
| 30R (0.84 mm) | 1.2 mm | 2.177 |
| 25R (0.84 mm) | 1.2 mm | 2.148 |
| 20R (0.84 mm) | 1.2 mm | 2.112 |
| 15R (0.7 mm) | 1.0 mm | 2.205 |
| 10R (0.7 mm) | 1.0 mm | 2.143 |
| 8R (0.7 mm) | 1.0 mm | 2.162 |
| 6R (0.7 mm) | 1.0 mm | 2.136 |
| 4R (0.7 mm) | 1.0 mm | 2.214 |
| 2R (0.7 mm) | 1.0 mm | 2.187 |

The modeling results make it clear that by decreasing the wall thickness of the glass container, an increased compliance can be obtained across the range of ISO 8362-1 vial sizes. It should be understood that consistent compliance factors greater than 2.0 across the range of ISO 8362-1 vial sizes with reduced wall thicknesses was not an expected result. The modeled compliance factors shown in Table 10 correspond to a wall thickness reduction of 30%, while the resulting improvement in compliance relative to the same size ISO-8362-1 vial having a wall thickness as defined by ISO 8362-1 was greater than 100% for each of the simulated vials. While a similarly surprising compliance factor of around 2 was obtained via physical measurements on thin wall vials of 2R and 3 ml sizes (discussed above), it was not expected that the decreased wall thickness would consistently improve the compliance of the sidewall 120 across the range of ISO 8362-1 vial sizes, at least in part because the geometries of the vial in the near vicinity of the tested locations vary among the ISO 8362-1 vial sizes.

In view of the modeling results discussed above, embodiments of the present disclosure include a glass pharmaceutical vial comprising: a glass body comprising a sidewall enclosing an interior volume and an outer diameter D, wherein: the outer diameter D of the glass body is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_l$ that is less than or equal to $0.85{*}s_1$, wherein $s_1$ is a wall thickness of the glass vial of size designation X as defined by ISO 8362-1; and the glass pharmaceutical vial comprises a compliance of at least 2.0, at least 2.05, or even at least 2.1, as determined in accordance with the Vial Compliance Test. Embodiments include a glass pharmaceutical vial comprising: a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_l$ that is less than or equal to $0.85{*}s_1$, wherein $s_1$ is a wall thickness of the glass vial of size designation X as defined by ISO 8362-1; and the glass pharmaceutical vial comprises a compliance factor of at least 2.0, at least 2.05, or even at least 2.1, as determined in accordance with the Vial Compliance Test. Embodiments include a glass pharmaceutical vial comprising: a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of the glass vial of size designation X as defined by ISO 8362-1; and the glass pharmaceutical vial comprises a compliance factor of at least 2.0, at least 2.05, or even at least 2.1, as determined in accordance with the Vial Compliance Test.

One benefit provided by the improved compliance of the glass containers described herein is the ability to distribute impact forces over a larger area of the vial thereby lowering peak stresses experienced by the vial. As discussed above, it is believed that reduced peak stresses may reduce the likelihood of surface damage and/or breakage. The Dynamic Impact Test is used to evaluate the ability of the glass pharmaceutical vials described herein to distribute peak stresses upon impact.

Figure 29:
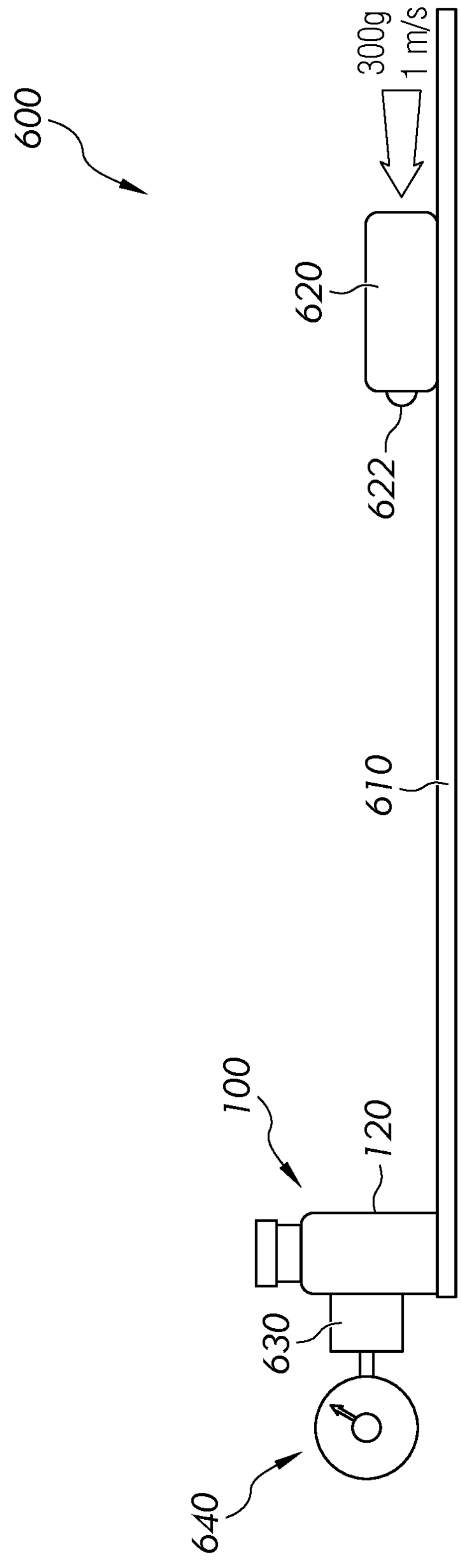
FIG. 29 schematically depicts an apparatus used for the Dynamic Impact Test described herein.
Figure 30:
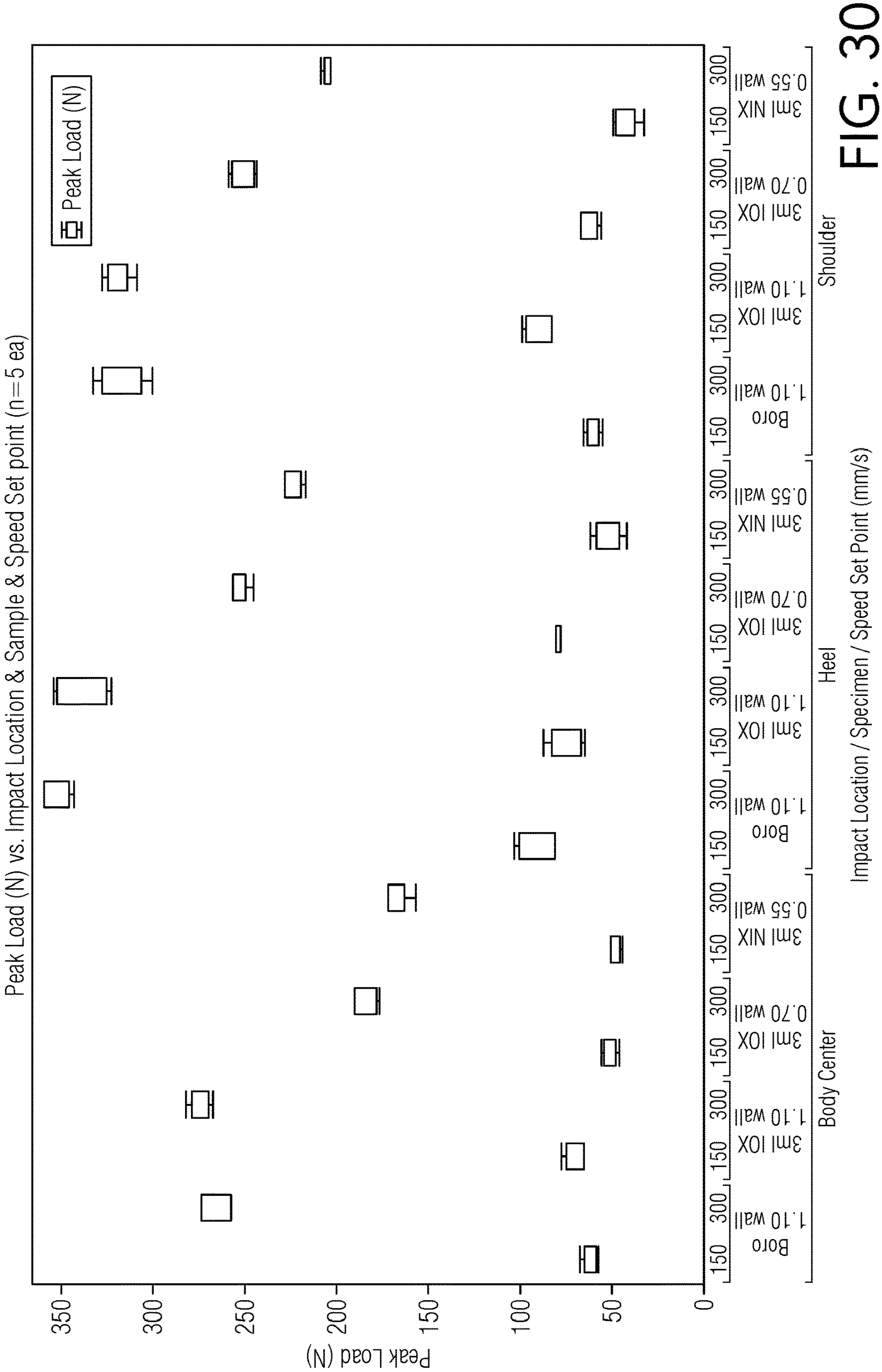
FIG. 30 is a box plot showing peak load (y-axis) for different glass pharmaceutical vials (x-axis) measured in accordance with the Dynamic Impact Test.

The Dynamic Impact Test is performed by the apparatus 600 shown in FIG. 29. The apparatus 600 used for the Dynamic Impact Test includes a linear belt slide 610 equipped with an impactor 620 and a fixture 630 to hold the glass container 100 at one end of the belt slide 610. The glass container 100 is constrained by the fixture 630 with the belt slide 610 on one side of the glass container 100 and a load cell 640 on the opposite side of the glass container 100. The fixture 630 is the same fixture 510 described above with respect to the Vial Compliance Test. Accordingly, the fixture 630 cradles the glass container 100 in the same manner as described above for the Vial Compliance Test, however, the fixture 630 is vertical oriented for the Dynamic Impact Test. The impactor 620 comprises a weight of 300 grams and has a spherical tip 622. The spherical tip 622 is the same as the ⅛" hardened steel ball 516 described above with respect to the Vial Compliance Test. The impactor 620 is provided with a velocity of 150 mm/s and 300 mm/s and configured to impact the sidewall 120 of the vial in the same locations as described above for the Vial Compliance Test (i.e., $v_s$, $v_h$, and $v_c$). Upon impact, load-time data is recorded by the load cell 640 to evaluate the ability of the vial to distribute stress upon an impact event. The peak load is recorded for each test. The results of the Dynamic Impact Test measurements are shown in FIG. 30 and correspond to 5 measurements per vial type/location. With the exception of the borosilicate 2R vial having a wall thickness of 0.7 mm, the vials tested according to the Dynamic Impact Test were the same as described above with regards to the compliance measurements (i.e., the borosilicate 2R vial having a wall thickness of 0.7 mm and tested for compliance as described above, was not tested under the Dynamic Impact Test).

Figure 31:
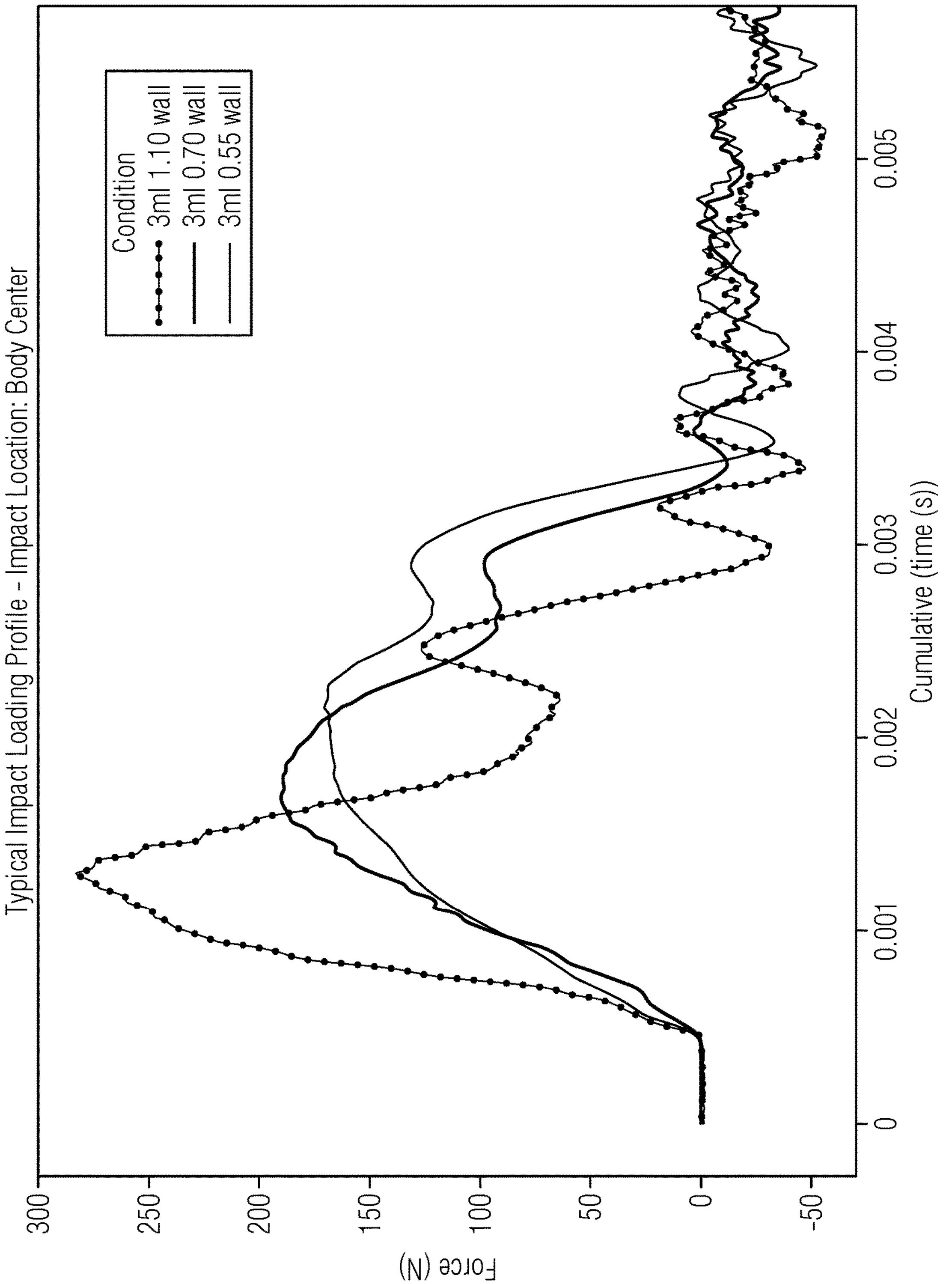
FIG. 31 is plot showing loading impact profiles for glass pharmaceutical vials of varying thickness according to one or more embodiments shown and described herein.

As evident from FIG. 30, vials comprising a reduced wall thickness demonstrated reduced peak loads as measured by the load cell 640. It was thus discovered that the improved compliance of the vial arising out of the reduced wall thickness provides the vial with the ability to redistribute impact loads over a larger area so as to reduce local stress concentrations in the vial. This result is more apparent in FIG. 31, which shows the impact loading profile at $v_c$ for 3 ml vials having three different wall thicknesses: 1.1 mm, 0.7 mm, and 0.55 mm. By comparing the impact loading profiles, it can be seen that the more rigid 1.1 mm vial experienced significantly higher peak stresses, albeit over a smaller period of time. Without wishing to be bound by theory, it is contemplated that higher local stress concentrations may result in damage and/or breakage of the vial. Accordingly, it is believed that the reduced peak stress loads experienced by the vials having 0.7 mm and 0.55 mm sidewall thicknesses may contribute to improved mechanical performance in terms of damage resistance.

Two discernible characteristics demonstrated by the Dynamic Impact Test for glass containers formed with sidewalls having reduced thickness relative to conventional glass vials with the same outer diameter are the peak load and the full width at half maximum (FWHM) seen on the impact loading profile.

In embodiments, the term "Dynamic Impact Factor" refers to the ratio between (i) the peak load (averaged over measurements taken at $v_h$, $v_s$, and $v_c$) of a glass pharmaceutical vial comprising: a glass body having a sidewall enclosing an interior volume and an outer diameter D, wherein: the outer diameter D is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to $0.85*s_1$, wherein $s_1$ is a wall thickness of the glass vial of size X as defined by ISO 8362-1, and (ii) the peak load (averaged over measurements taken at $v_h$, $v_s$, and $v_c$) of a glass pharmaceutical vial of size X having a sidewall thickness $s_1$ as defined by ISO 8362-1. In embodiments, the term "Dynamic Impact Factor" may also be used to refer to the ratio between (i) the peak load (averaged over measurements taken at $v_h$, $v_s$, and $v_c$) of a glass pharmaceutical vial having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the peak load (averaged over measurements taken at $v_h$, $v_s$, and $v_c$) of a glass pharmaceutical vial of size X having a sidewall thickness $s_1$ as defined by ISO 8362-1. In embodiments, the term "Dynamic Impact Factor" may also be used to refer to the ratio between (i) the peak load (averaged over measurements taken at $v_h$, $v_s$, and $v_c$) of a glass pharmaceutical vial having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the peak load (averaged over measurements taken at $v_h$, $v_s$, and $v_c$) of a glass pharmaceutical vial of size X having a sidewall thickness $s_1$ as defined by ISO 8362-1.

In embodiments, the term "FWHM Factor" refers to the ratio between (i) the FWHM (averaged over measurements taken at $v_h$, $v_s$, and $v_c$) of a glass pharmaceutical vial comprising: a glass body having a sidewall enclosing an interior volume and an outer diameter D, wherein: the outer diameter D is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to $0.85*s_1$, wherein $s_1$ is a wall thickness of the glass vial of size X as defined by ISO 8362-1, and (ii) the FWHM (averaged over measurements taken at $v_h$, $v_s$, and $v_c$) of a glass pharmaceutical vial of size X having a sidewall thickness $s_1$ as defined by ISO 8362-1. In embodiments, the term "FWHM Factor" may also be used to refer to the ratio between (i) the FWHM (averaged over measurements taken at $v_h$, $v_s$, and $v_c$) of a glass pharmaceutical vial having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the FWHM (averaged over measurements taken at $v_h$, $v_s$, and $v_c$) of a glass pharmaceutical vial of size X having a sidewall thickness $s_1$ as defined by ISO 8362-1. In embodiments, the term "FWHM Factor" may also be used to refer to the ratio between (i) the FWHM (averaged over measurements taken at $v_h$, $v_s$, and $v_c$) of a glass pharmaceutical vial having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the FWHM (averaged over measurements taken at $v_h$, $v_s$, and $v_c$) of a glass pharmaceutical vial of size X having a sidewall thickness $s_1$ as defined by ISO 8362-1.

The Dynamic Impact Factor for the 3 ml ion-exchanged aluminosilicate vial having a wall thickness of 0.70 mm relative to the 3 ml ion-exchanged aluminosilicate vial having a wall thickness of 1.1 mm was determined to be 0.74. The FWHM Factor for the 3 ml ion-exchanged aluminosilicate vial having a wall thickness of 0.70 mm relative to the 3 ml ion-exchanged aluminosilicate vial having a wall thickness of 1.1 mm was determined to be 1.48.

Accordingly, embodiments of the present disclosure include a glass pharmaceutical vial comprising: a glass body comprising a sidewall enclosing an interior volume and an outer diameter D, wherein: the outer diameter D of the glass body is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a Dynamic Impact Factor of less than 1.0, less than 0.9, or less than 0.8, as determined in accordance with the Dynamic Impact Test. Embodiments include a glass pharmaceutical vial comprising: a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of the glass vial of size designation X as defined by ISO 8362-1; and the glass pharmaceutical vial comprises a Dynamic Impact Factor of less than 1.0, less than 0.9, or less than 0.8, as determined in accordance with the Dynamic Impact Test. Embodiments include a glass pharmaceutical vial comprising: a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of the glass vial of size designation X as defined by ISO 8362-1; and the glass pharmaceutical vial comprises a Dynamic Impact Factor of less than 1.0, less than 0.9, or less than 0.8, as determined in accordance with the Dynamic Impact Test.

Accordingly, embodiments of the present disclosure include a glass pharmaceutical vial comprising: a glass body comprising a sidewall enclosing an interior volume and an outer diameter D, wherein: the outer diameter D of the glass body is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a FWHM Factor of at least 1.2, at least 1.3, at least 1.4, or at least 1.45, as determined in accordance with the Dynamic Impact Test. Embodiments include a glass pharmaceutical vial comprising: a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of the glass vial of size designation X as defined by ISO 8362-1; and the glass pharmaceutical vial comprises a FWHM Factor of at least 1.2, at least 1.3, at least 1.4, or at least 1.45, as determined in accordance with the Dynamic Impact Test. Embodiments include a glass pharmaceutical vial comprising: a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_l$ that is less than or equal to $0.85*s_1$, wherein $s_1$ is a wall thickness of the glass vial of size designation X as defined by ISO 8362-1; and the glass pharmaceutical vial comprises a FWHM Factor of at least 1.2, at least 1.3, at least 1.4, or at least 1.45, as determined in accordance with the Dynamic Impact Test.

Compression Strength

As discussed above, decreasing the thickness of the sidewall of a glass container generally lowers the strength of a glass container (at least in the context of quasi-static loading). However, without wishing to be bound by theory, it is believed that the increased compliance of the sidewall of the glass container may help distribute compressive loads throughout the glass container such as to minimize the strength penalty resulting from the thinner wall.

The glass containers described herein, such as the glass pharmaceutical vials described herein, have a horizontal compression strength. The horizontal compression strength, as described herein, is measured using the Horizontal Compression Test, which comprises positioning the glass pharmaceutical vial horizontally between two parallel steel platens having loading surfaces parallel to the central axis A of the glass pharmaceutical vial. A mechanical load is then applied to the glass container 100 with the platens in the direction perpendicular to the central axis A of the glass pharmaceutical vial. The horizontal compression strength is measured using "as-converted" (annealed according to the furnace temperature profile shown in FIG. 22B, but not being provided with an external coating) glass pharmaceutical vials and abraded glass pharmaceutical vials, i.e., annealed vials having a 20 mm 30 N scratch applied to the exterior surface of the sidewall in the manner described below. The vials provided with a scratch prior to testing are meant reflect the vial compression strength after incurring surface damage vials typically experience during manufacturing, shipping, and handling. For the samples tested in compression having a coating, the coating composition, application procedure, and thickness of the coating is described hereinabove.

Figure 32:
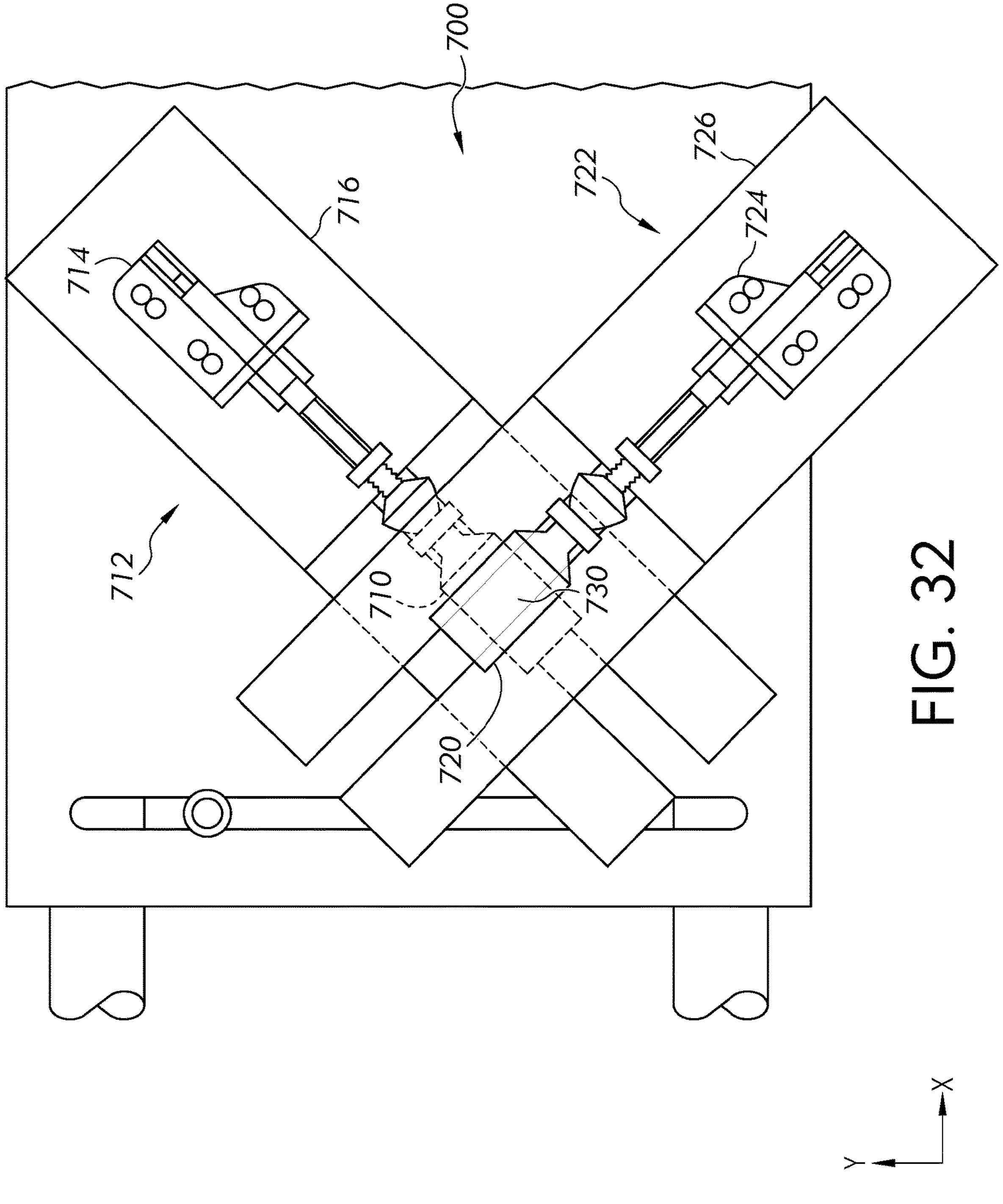
FIG. 32 schematically depicts a vial-on-vial jig for abrading glass containers, according to one or more embodiments shown and described herein.

The vial-on-vial jig 700 shown in FIG. 32 is used to create scratches in the outer-most surface of coated or uncoated glass pharmaceutical vials tested. The vial-on-vial jig 700 may be used to scratch a first glass container 710, e.g., a glass container 100, with a second glass container 720 so as to replicate vial-on-vial contact during manufacturing operations. The vial-on-vial jig 700 comprises a first clamp 712 and a second clamp 722 arrange in a cross configuration. The first clamp 712 comprises a first securing arm 714 attached to a first base 716. The first securing arm 714 attaches to the first glass container 710 and holds the first glass container 710 stationary relative to the first clamp 712. Similarly, the second clamp 722 comprises a second securing arm 724 attached to a second base 726. The second securing arm 724 attaches to the second glass container 720 and holds it stationary relative to the second clamp 722. The first glass container 710 is positioned on the first clamp 712 and the second glass container 720 is positioned on the second clamp 722 such that the central axis A of the first glass container 710 and the central axis A of the second glass container 720 are positioned at about a 90° angle relative to one another and on a horizontal plane defined by the x-y axis.

The scratch can be characterized by the selected normal pressure and the scratch length applied by a vial-on-vial jig 700, to the contact region 730. Unless identified otherwise, scratches for abraded glass pharmaceutical vials 100 for the horizontal compression procedure comprise a 20 mm scratch created by a normal load of 30 N. When the glass container 100 is positioned between the two platens for testing, the scratch is positioned at a furthest point away from the platens and oriented parallel to the central axis A of the glass container 100.

Figure 33:
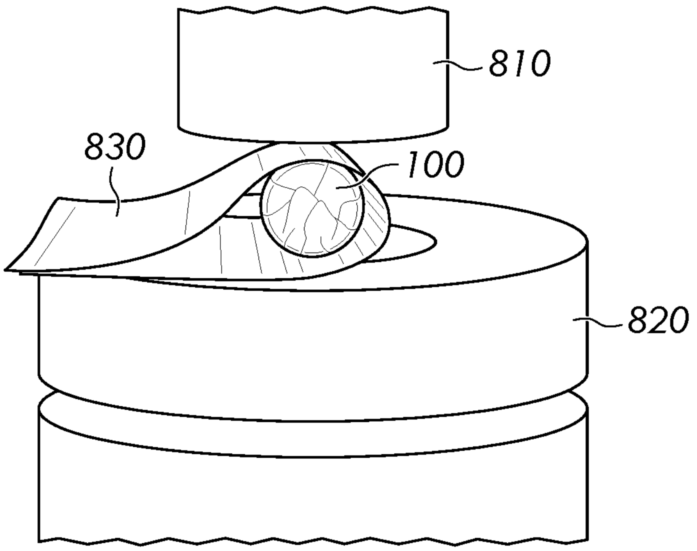
FIG. 33 schematically depicts the setup used to measure the horizontal compression strength of glass containers according to one or more embodiments shown and described herein.

Once the 30 N scratch has been incorporated into the sidewall 120 of the glass container 100, the glass container 100 is prepared for horizontal compression testing according to the following procedure. With reference to FIG. 33, prior to being placed between an upper platen 810 and a lower platen 820, the glass container 100 is wrapped in 2 inch tape (Scotch 3M 471), and the overhang at each end of the glass container 100 is folded around its respective end of the glass container 100. The glass container 100 is then positioned within an index card 830 (Oxford 3×5 index cards) that is stapled around the glass container. The purpose of the tape and index card is to contain broken glass. The prepared glass container 100 is then positioned between the two parallel platens 810, 820 as shown in FIG. 33. The load rate for the horizontal vial compression test is 0.5 in/min, meaning that the platens 810, 820 move towards each other at a rate of 0.5 in/min. The horizontal compression strength is measured at 25° C.±2° C. and 50%±5% relative humidity. The horizontal compression strength is a measurement of the peak load at failure, and the horizontal compression strength can be given as a failure probability at a selected normal compression load. As used herein, failure occurs when the glass container ruptures under a horizontal compression in least 50% of samples. 50 samples are tested for each glass vial type evaluated.

In embodiments, the term "horizontal strength factor" refers to the ratio between (i) the horizontal compression strength of a glass pharmaceutical vial (or an externally coated glass pharmaceutical vial, if a coating is present) comprising: a glass body having a sidewall enclosing an interior volume and an outer diameter D, wherein: the outer diameter D is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_l$ that is less than or equal to $0.85*s_1$, wherein $s_1$ is a wall thickness of the glass vial of size X as defined by ISO 8362-1, and (ii) the horizontal compression strength of a glass pharmaceutical vial of size X having a sidewall thickness $s_1$ as defined by ISO 8362-1. In embodiments, the term "horizontal strength factor" may also be used to refer to the ratio between (i) the horizontal compression strength of a glass pharmaceutical vial (or an externally coated glass pharmaceutical vial, if a coating is present) having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the 116% of diameter $d_1$ is greater than or equal to D; the sidewall of the glass pharmaceutical vial comprises an average wall thickness $T_l$ that is less than or equal to $0.85*s_1$, wherein $s_1$ is a wall thickness of a glass vial of size designation X as defined by ISO 8362-1, and (ii) the horizontal compression strength of a glass pharmaceutical vial of size X having a sidewall thickness $s_1$ as defined by ISO 8362-1. In embodiments, the term "horizontal strength factor" may also be used to refer to the ratio between (i) the horizontal compression strength of a glass pharmaceutical vial (or an externally coated glass pharmaceutical vial, if a coating is present) having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the horizontal compression strength of a glass pharmaceutical vial of size X having a sidewall thickness $s_1$ as defined by ISO 8362-1.

Figure 35:
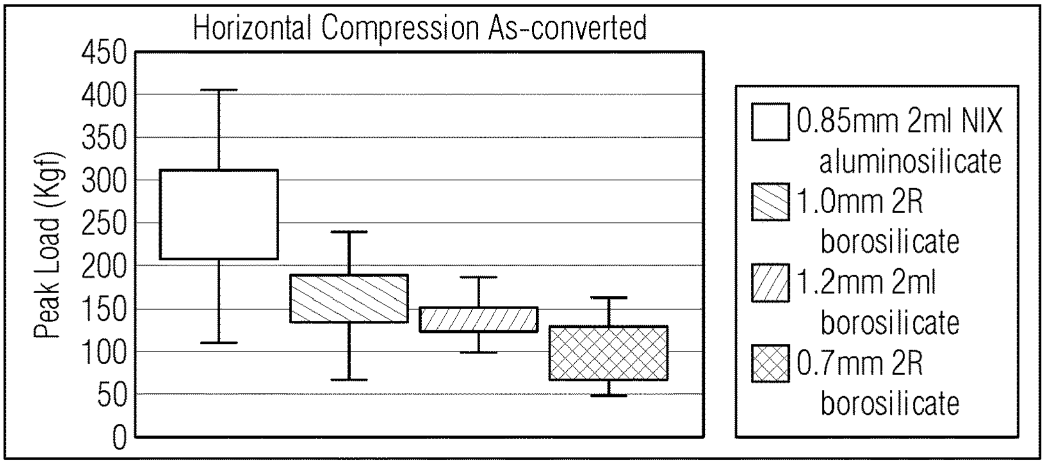
FIG. 35 is a plot showing the horizontal compression strength of as-converted glass containers according to one or more embodiments shown and described herein.

FIG. 35 presents the horizontal compression strength for as-converted glass vials (no scratch on surface and without an external coating) determined in accordance with the Horizontal Compression Test described above. The results shown in FIG. 35 correspond to: (i) aluminosilicate 2 ml vials having a wall thickness of 0.85 mm; (ii) borosilicate 2 ml vials having a wall thickness of 1.2 mm; (iii) borosilicate 2R vials having a wall thickness of 0.7 mm; and (iv) borosilicate vials having a wall thickness of 1.0 mm. The horizontal strength factor for the 2R borosilicate vial having a wall thickness of 0.70 mm relative to the 2R borosilicate vial having a wall thickness of 1.0 mm was determined to be 0.75. Accordingly, embodiments of the present disclosure include a glass pharmaceutical vial comprising: a glass body comprising a sidewall enclosing an interior volume and an outer diameter D, wherein: the outer diameter D of the glass body is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a horizontal strength factor of at least 0.5, at least 0.65, at least 0.7, or at least 0.75, determined in accordance with Horizontal Compression Test. Embodiments of the present disclosure include a glass pharmaceutical vial comprising a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a horizontal strength factor of at least 0.5, at least 0.65, at least 0.7, or at least 0.75, determined in accordance with Horizontal Compression Test. Embodiments of the present disclosure include a glass pharmaceutical vial comprising a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a horizontal strength factor of at least 0.5, at least 0.65, at least 0.7, or at least 0.75, determined in accordance with Horizontal Compression Test.

As discussed above, providing the glass pharmaceutical vial with an external coating may limit the formation of flaws that might be generated on filling lines or even during shipping and handling. When compared with an uncoated conventional vial, a coated thin wall vial has an increased resistance to damage and breakage during shipping and typical pharmaceutical filling line processes. To demonstrate the increased resistance to damage and breakage of the glass pharmaceutical vials described herein, the vials were provided with the external coating described above and subjected to the horizontal compression testing after the surface of the glass vials were abraded so as to have surface damage typically experienced during manufacturing, shipping, and handling. The resulting horizontal compression strength of the externally coated glass pharmaceutical vials was then used to determine the horizontal strength factor for the externally coated glass pharmaceutical vials described herein in the manner as described above.

Figure 36:
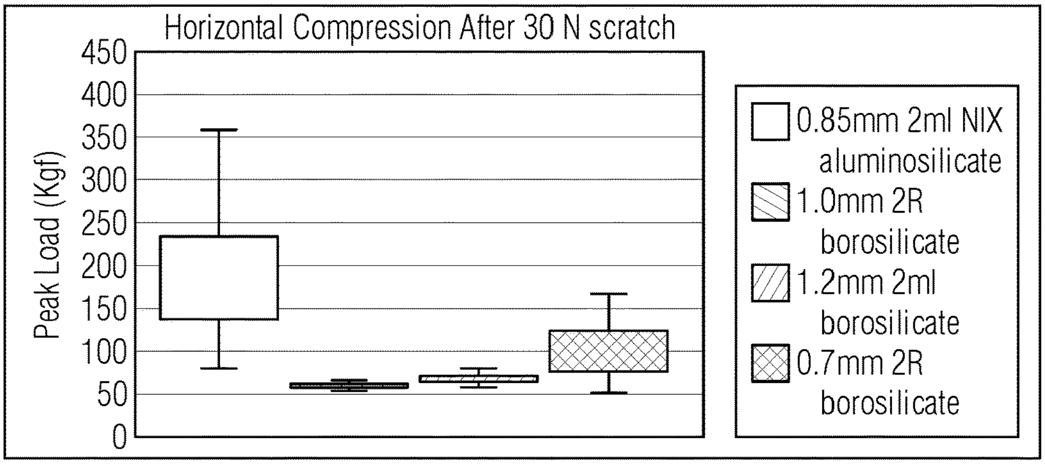
FIG. 36 is a plot showing horizontal compression strength of glass containers according to one or more embodiments shown and described herein, the glass containers being abraded prior to testing.

FIG. 36 presents the horizontal compression strength for several glass vials determined in accordance with the Horizontal Compression Test described above, wherein the vials have a 20 mm 30 N scratch applied to the surface in the manner described above. The results shown in FIG. 36 correspond to: (i) coated aluminosilicate 2 ml vials having a wall thickness of 0.85 mm; (ii) uncoated borosilicate 2 ml vials having a wall thickness of 1.2 mm; (iii) coated borosilicate 2R vials having a wall thickness of 0.7 mm; and (iv) uncoated borosilicate vials having a wall thickness of 1.0 mm. The horizontal strength factor for the externally coated 2R borosilicate vial having a wall thickness of 0.70 mm relative to the uncoated 2R borosilicate vial having a wall thickness of 1.0 mm was determined to be 1.97, when the tested vials were provided with the 20 mm 30 N scratch. Accordingly, embodiments of the present disclosure include an externally coated glass pharmaceutical vial comprising: a glass body comprising a sidewall enclosing an interior volume and an outer diameter D, wherein: the outer diameter D of the glass body is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a horizontal strength factor of at least 1.5, at least 1.6, at least 1.7, at least 1.8, or at least 1.9, determined in accordance with Horizontal Compression Test. Embodiments of the present disclosure include a glass pharmaceutical vial comprising a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a horizontal strength factor of at least 1.5, at least 1.6, at least 1.7, at least 1.8, or at least 1.9, determined in accordance with Horizontal Compression Test. Embodiments of the present disclosure include a glass pharmaceutical vial comprising a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a horizontal strength factor of at least 1.5, at least 1.6, at least 1.7, at least 1.8, or at least 1.9, determined in accordance with Horizontal Compression Test.

It was unexpectedly found that the application of a coating to the exterior surfaces of the 0.7 mm vial was able to counteract the strength decrease associated with having reduced thickness compared to conventional glass vials with the same outer diameter. Accordingly, relative to an uncoated 2R glass pharmaceutical vial having a conventional wall thickness of 1.0 mm, the externally coated 2R glass pharmaceutical vials described herein having a wall thickness of 70% the wall thickness of a conventional vial demonstrated a 97% improvement in horizontal compression strength.

The glass containers described herein, such as the glass pharmaceutical vials described herein, also have a vertical compression strength. The vertical compression strength, as described herein, is measured using the Vertical Compression Test, which comprises positioning the glass container 100 vertically between two parallel steel platens which are oriented normal to the central axis A of the glass pharmaceutical vial. A mechanical load is then applied to the glass container 100 with the platens in the direction normal to the central axis A of the glass pharmaceutical vial. The vertical compression strength was determined using abraded glass pharmaceutical vials, i.e., the vials are provided with a 20 mm 30 N scratch as described above. Like the vials tested in horizontal compression, vials tested for their vertical compression strength were annealed according to the furnace temperature profile shown in FIG. 22B. Like with the horizontal compression testing, the vials are provided with a scratch prior to testing to replicate the surface damage glass vials may experience during manufacturing, shipping, and handling. The 30 N scratches in the sidewall 120 of the glass container 100 are oriented parallel to the central axis A of the glass container 100.

Figure 34:
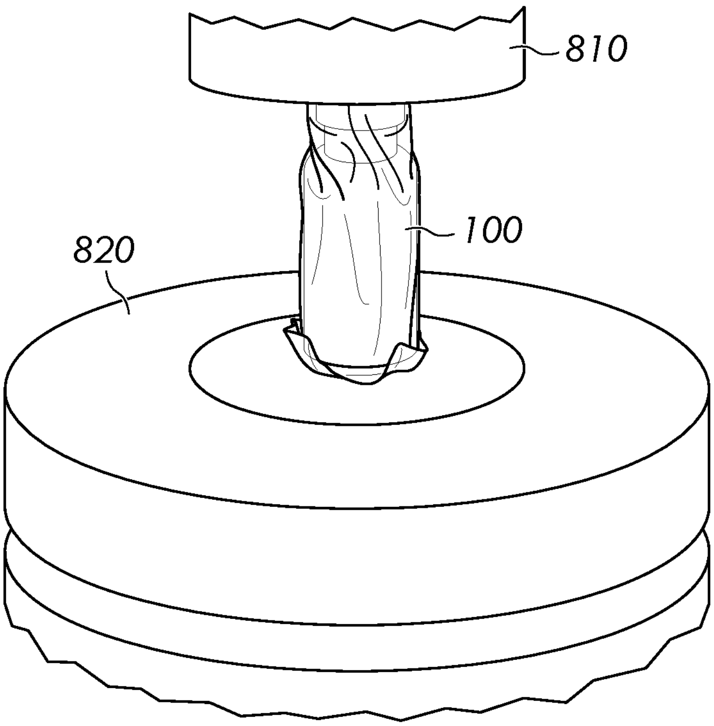
FIG. 34 schematically depicts the setup used to measure the vertical compression strength of glass containers according to one or more embodiments shown and described herein.

To prepare the glass container 100 for vertical compression testing, the glass container 100 is wrapped with a 1.5-inch piece of tape (Scotch 3M 471) and a 1-inch tape (Scotch 3M 471) is placed on the bottom of the sample to ensure the glass container sits flat on the lower platen 820. The overhang from the piece of tape placed on the bottom of the glass container 100 is folded up against the side of the glass container 100. The prepared glass container 100 is then positioned between the two parallel platens 810, 820 as shown in FIG. 34. The load rate for the vertical vial compression test is 0.2 in/min, meaning that the platens 810, 820 move towards each other at a rate of 0.2 in/min. The vertical compression strength is measured at 25° C.±2° C. and 50%±5% relative humidity. The vertical compression strength is a measurement of load at failure, and the vertical compression strength can be given as a failure probability at a selected normal compression load. As used herein, failure occurs when the glass pharmaceutical vial ruptures under a vertical compression in least 50% of samples. 50 samples are tested for each glass vial type evaluated.

In embodiments, the term "vertical strength factor" refers to the ratio between (i) the vertical compression strength of a glass pharmaceutical vial (or an externally coated glass pharmaceutical vial, if a coating is present) comprising: a glass body having a sidewall enclosing an interior volume and an outer diameter D, wherein: the outer diameter D is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to $0.85*s_1$, wherein $s_1$ is a wall thickness of the glass vial of size X as defined by ISO 8362-1, and (ii) the vertical compression strength of a glass pharmaceutical vial of size X having a sidewall thickness $s_1$ as defined by ISO 8362-1. In embodiments, the term "vertical strength factor" may also be used to refer to the ratio between (i) the vertical compression strength of a glass pharmaceutical vial (or an externally coated glass pharmaceutical vial, if a coating is present) having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the vertical compression strength of a glass pharmaceutical vial of size X having a sidewall thickness $s_1$ as defined by ISO 8362-1. In embodiments, the term "vertical strength factor" may also be used to refer to the ratio between (i) the vertical compression strength of a glass pharmaceutical vial (or an externally coated glass pharmaceutical vial, if a coating is present) having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter d 1 is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1, and (ii) the vertical compression strength of a glass pharmaceutical vial of size X having a sidewall thickness $s_1$ as defined by ISO 8362-1.

Figure 37:
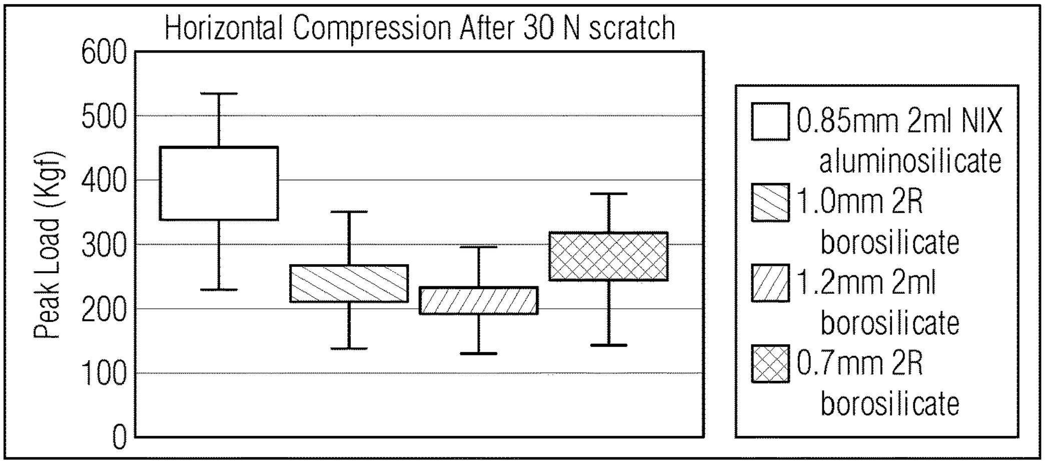
FIG. 37 is a plot showing the vertical compression strength of glass containers according to one or more embodiments shown and described herein.

FIG. 37 presents the vertical compression strength for several glass vials determined in accordance with the Vertical Compression Test described above, wherein the vials have a 20 mm 30 N scratch applied to the surface in the manner described above. The results shown in FIG. 37 correspond to: (i) coated aluminosilicate 2 ml vials having a wall thickness of 0.85 mm; (ii) uncoated borosilicate 2 ml vials having a wall thickness of 1.2 mm; (iii) coated borosilicate 2R vials having a wall thickness of 0.7 mm; and (iv) uncoated borosilicate vials having a wall thickness of 1.0 mm. The vertical strength factor for the externally coated 2R borosilicate vial having a wall thickness of 0.70 mm relative to the uncoated 2R borosilicate vial having a wall thickness of 1.0 mm was determined to be 1.33, when the tested vials were provided with the 20 mm 30 N scratch. Accordingly, embodiments of the present disclosure include an externally coated glass pharmaceutical vial comprising: a glass body comprising a sidewall enclosing an interior volume and an outer diameter D, wherein: the outer diameter D of the glass body is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a vertical strength factor of at least 1.1, at least 1.2, or at least 1.3, determined in accordance with the Vertical Compression Test. Embodiments of the present disclosure include a glass pharmaceutical vial comprising a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a vertical strength factor of at least 1.1, at least 1.2, or at least 1.3, determined in accordance with the Vertical Compression Test, determined in accordance with Horizontal Compression Test. Embodiments of the present disclosure include a glass pharmaceutical vial comprising a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a vertical strength factor of at least 1.1, at least 1.2, or at least 1.3, determined in accordance with the Vertical Compression Test, determined in accordance with Horizontal Compression Test.

It was unexpectedly found that the application of a coating to the exterior surfaces of the 0.7 mm vial was able to counteract the strength decrease associated with the thinner wall. Accordingly, relative to a 2R glass pharmaceutical vial having a conventional wall thickness of 1.0 mm, the externally coated glass pharmaceutical vials herein disclosed having a wall thickness of 70% the wall thickness of a conventional vial demonstrated a 30% improvement in vertical compression strength.

Breakage Resistance

Without wishing to be bound by theory, it is believed that the improved vial compliance resulting from the thinner wall may have a synergistic relationship with the avoidance of flaw formation provided by the external coating to produce a glass container with improved breakage resistance when compared to a glass container lacking this combination of these features.

In order to evaluate the breakage resistance of the externally coated glass pharmaceutical vials described herein relative to a glass pharmaceutical vial having the same ISO 8362-1 size designation but with a thickness as defined by ISO 8362-1, a “breakage factor” is determined according to the Pendulum Impact Test. The Pendulum Impact Test is performed using the pendulum apparatus 900 shown in FIG. 38 and in accordance with the following test procedure. First, a 20 mm 30 N scratch is created on the side of the vial using the vial-on-vial jig 700 shown in FIG. 32. The scratch extends in a direction parallel to the central axis A of the glass container 100 along the exterior surface 116 of the sidewall 120. With reference to FIG. 1, the midpoint of the scratch is located approximately at a distance of ½ $h_2$ from the bottom of the vial.

Figure 38:
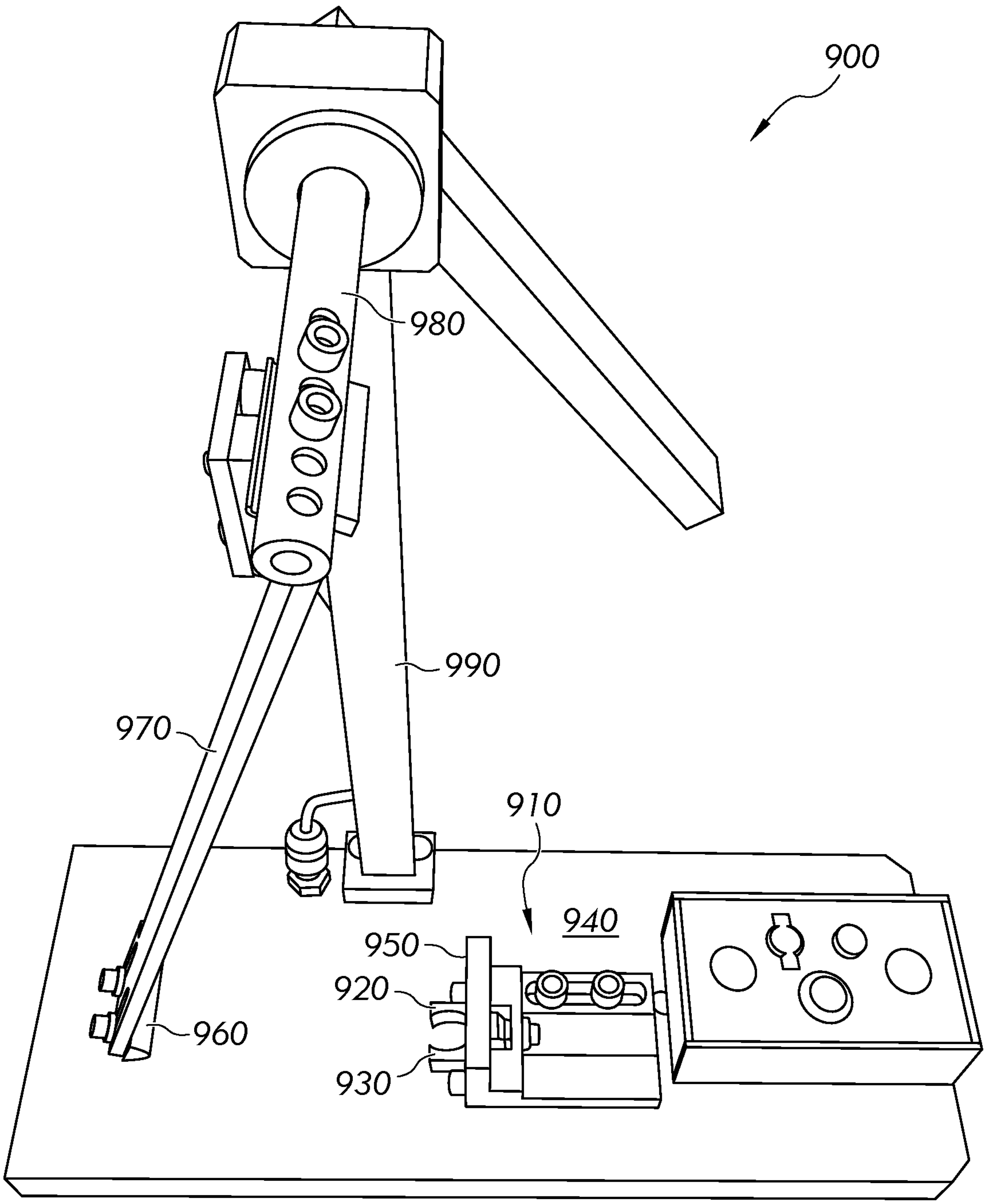
FIG. 38 schematically depicts an apparatus used for the Pendulum Impact Test described herein.
Figure 39:
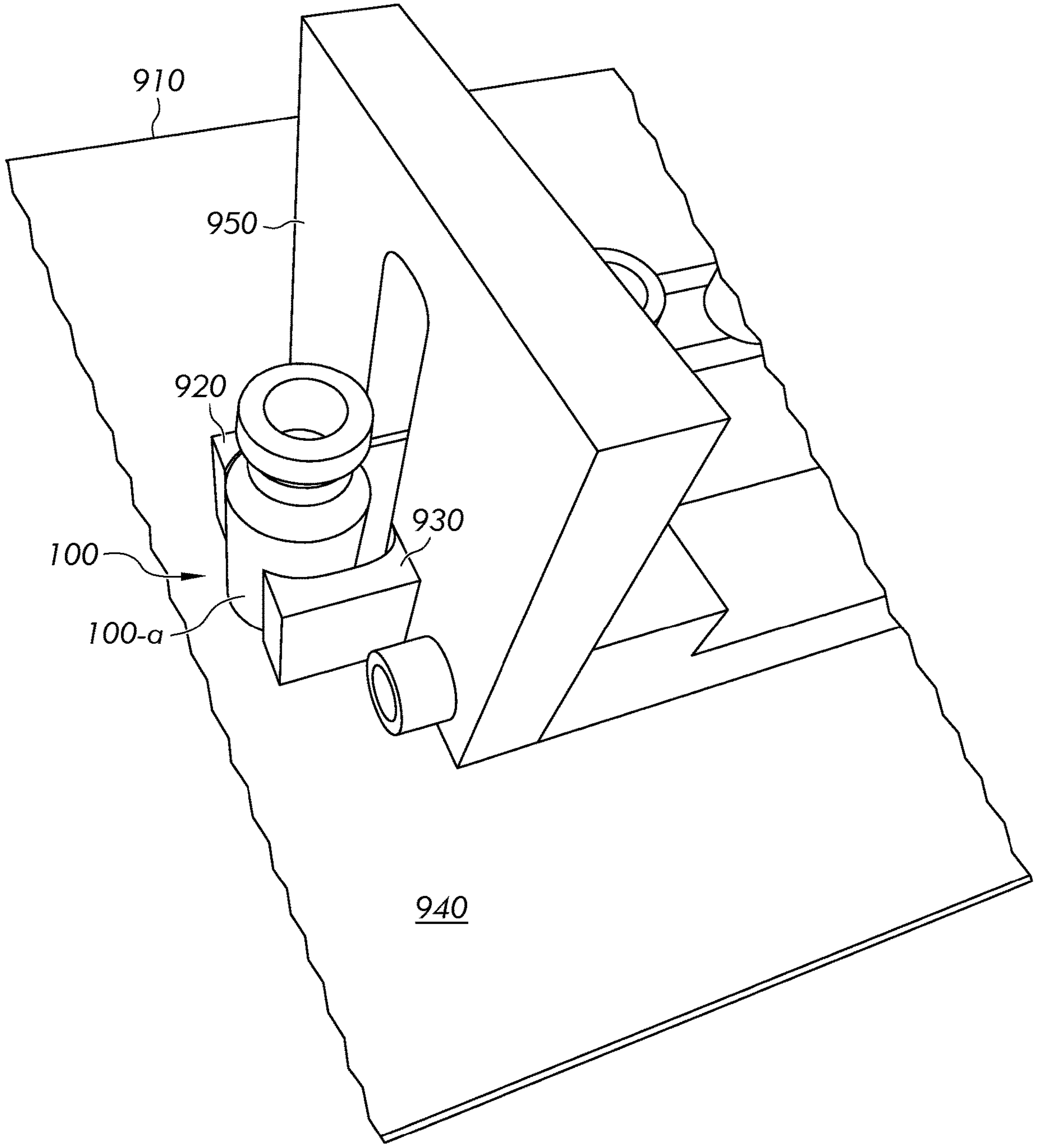
FIG. 39 schematically depicts a vial holder used for the Pendulum Impact Test described herein.
Figure 42:
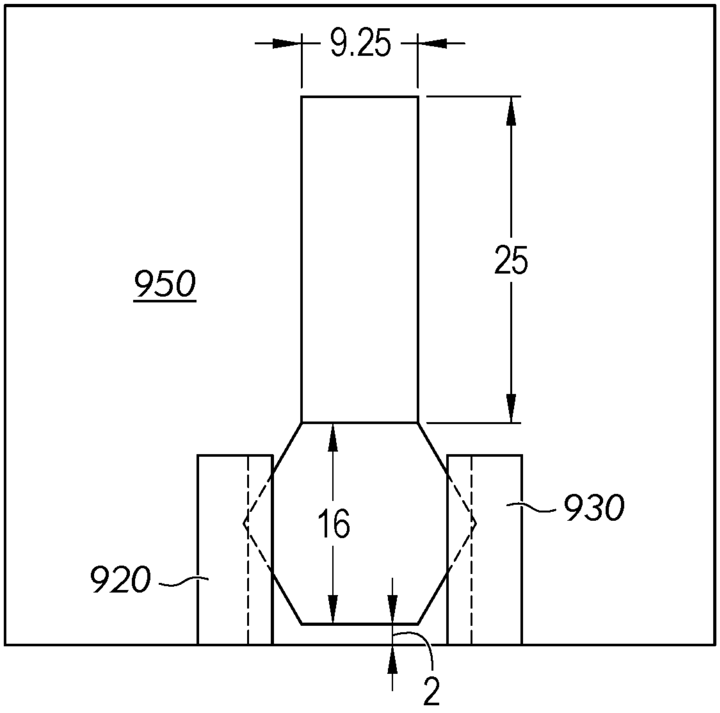
FIG. 42 schematically depicts a front view of a vial holder used for Pendulum Impact Test.
Figure 43:
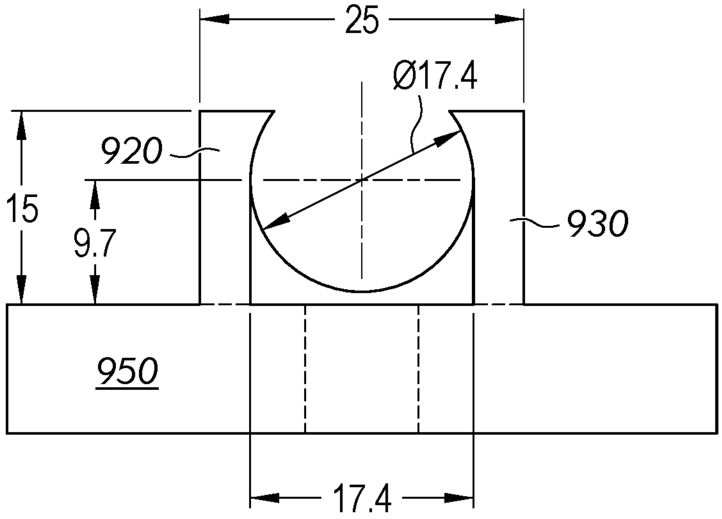
FIG. 43 schematically depicts a top view of the vial holder used for the Pendulum Impact Test.

Next, the vials are placed in a vial holder 910 as shown in FIGS. 38 and 39. The vial holder 910 is made of stainless steel and has dimensions as shown in FIGS. 42 (front view) and 43 (top view) (dimensions in mm). With reference to FIG. 39, the sides of the vial are supported by a left vial bracket 920 and a right vial bracket 930 which extend from the base 940 of the vial holder 910 and terminate prior to reaching the transition point between the sidewall 120 and the shoulder 130 of the glass container 100. The front and back of the glass container, i.e., the regions between the vial brackets, are exposed, and the back of the glass container 100 is placed in contact with the back 950 of the vial holder 910. The glass container 100 is oriented with the scratch positioned 90 degrees from the front of the vial holder 910, such that the scratch is positioned substantially in the center of one of the vial brackets 920, 930. As can be seen in FIG. 39, the front of the glass container 100 extends beyond the vial brackets 920, 930 to define an impact area 100-*a* for the impactor to hit, which is discussed in more detail below.

Figure 40:
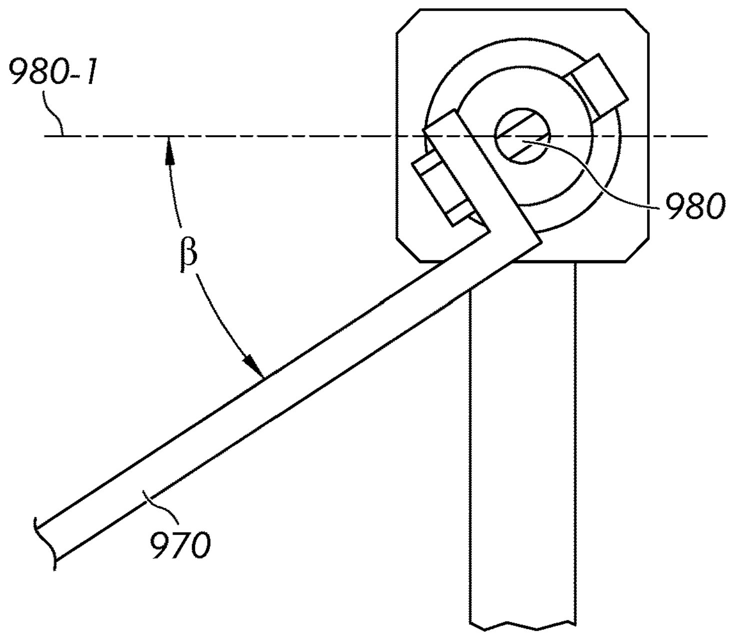
FIG. 40 schematically depicts the drop angle for the apparatus used for the Pendulum Impact Test described herein.
Figure 41:
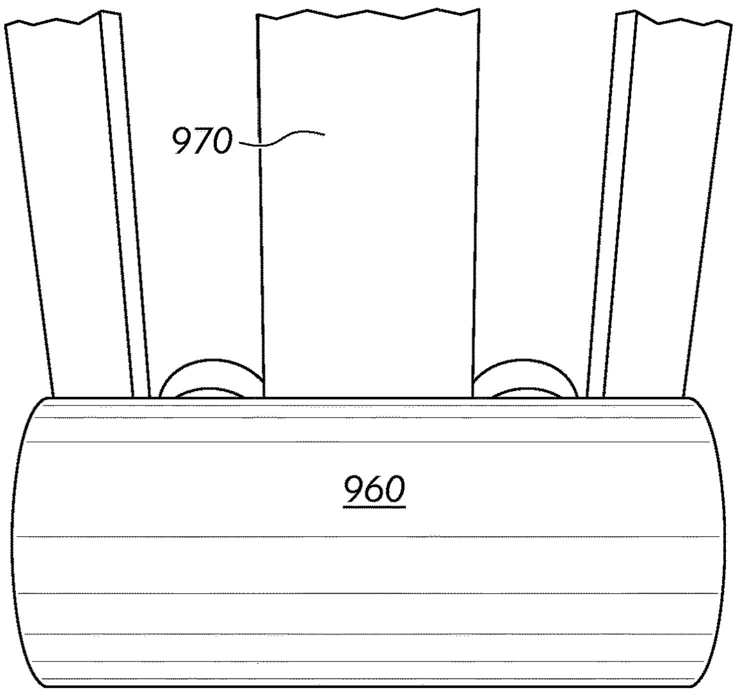
FIG. 41 schematically depicts the impactor used for Pendulum Impact Test described herein.

The vial impactor 960 used for the Pendulum Impact Test comprises a hardened steel semicylinder having its longitudinal axis perpendicular to the central axis A of the glass container 100 when the glass container 100 is positioned in the vial holder 910. The semicylinder forming the vial impactor 960 has a radius of 10 mm and a length of 40 mm. A close-up view of the vial impactor 960 can be seen in FIG. 41. The vial impactor 960 is positioned at a distal end of a pendulum arm 970 of the pendulum apparatus 900. The proximal end of the pendulum arm is connected to a pivot 980 which permits an adjustment of the pendulum arm 970 to various drop positions. The drop positions are measured in terms of the angle R shown in FIG. 40, which is the angle between the pendulum arm 970 and a horizontal line 980-1 extending from the pivot 980. The pivot 980 is supported by a vertical support beam 990 via a standard bearing (not shown). The pendulum apparatus 900 comprises a load cell (not shown) which is in contact with the back of the glass container 100 when the glass container 100 is placed in the vial holder 910. During the Pendulum Impact Test, the load cell records force-time data.

With reference to FIGS. 1 and 38, the pendulum arm 970 is configured such that the hardened steel vial impactor 960 impacts the glass container 100 at a vertical position corresponding a distance of ½ $h_2$ from the bottom of the glass container 100. For the purposes of the Pendulum Impact Test described herein, the drop position was set to 35 degrees, which corresponds to an impulse between 0.08 and 0.12 newton-seconds.

At least five samples are tested for each vial (having same processing history), although larger numbers of samples may be tested to raise the confidence level of the results. A sample is deemed to have "survived" the Pendulum Impact Test if no fracture is observed after being impacted under the above-specified conditions. The survivability rate is determined by calculating the percentage of the sample population that survived the Pendulum Impact Test. For example, if tested sample population is 10, and no fracture is observed in 5 samples after being impacted under the above-specified conditions, the survivability rate for the corresponding vial type would be 50%. Results obtained from Pendulum Impact Test Measurements are shown below in Table 11. All samples tested under the Pendulum Impact Test were annealed according to the furnace temperature profile showed in FIG. 22B, and none of the tested aluminosilicate vials had been ion-exchanged.

TABLE 11

| Vial Size | Wall Thickness | Glass composition | Outer Diameter | Test condition | Survivability Rate |
|---|---|---|---|---|---|
| 2R | 0.7 mm | Borosilicate | 16 mm | Uncoated; NO scratch | 99% |
| 2R | 1.0 mm | Borosilicate | 16 mm | Uncoated; NO scratch | 81% |
| 2 ml | 0.55 mm | Alumino-silicate | 16.38 mm | Uncoated; NO scratch | 98-99% |
| 2 ml | 0.85 mm | Alumino-silicate | 16.25 mm | Coated; 30N scratch | 95% |
| 2 ml | 1.2 mm | Borosilicate | 16.25 mm | Uncoated; 30N scratch | <1% |

In embodiments, the term "breakage factor" refers to the ratio between (i) the survivability rate of a glass pharmaceutical vial (or an externally coated glass pharmaceutical vial, if a coating is present) comprising: a glass body having a sidewall enclosing an interior volume and an outer diameter D, wherein: the outer diameter D is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to 0.85*$s_1$, wherein $s_1$ is a wall thickness of the glass vial of size X as defined by ISO 8362-1, and (ii) the survivability rate of a glass pharmaceutical vial of size X having a sidewall thickness $s_1$ as defined by ISO 8362-1. In embodiments, the term "breakage factor" may also be used to refer to the ratio between (i) the survivability rate of a glass pharmaceutical vial (or an externally coated glass pharmaceutical vial, if a coating is present) having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to 0.85*$s_1$, wherein $s_1$ is a wall thickness of a glass vial of size designation X as defined by ISO 8362-1, and (ii) the survivability rate of a glass pharmaceutical vial of size X having a sidewall thickness $s_1$ as defined by ISO 8362-1. In embodiments, the term "breakage factor" may also be used to refer to the ratio between (i) the survivability rate of a glass pharmaceutical vial (or an externally coated glass pharmaceutical vial, if a coating is present) having a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to 0.85*$s_1$, wherein $s_1$ is a wall thickness of a glass vial of size designation X as defined by ISO 8362-1, and (ii) the survivability rate of a glass pharmaceutical vial of size X having a sidewall thickness $s_1$ as defined by ISO 8362-1.

The breakage factor for the externally coated 0.85 aluminosilicate vial having a wall thickness of 0.85 mm relative to the uncoated 2R borosilicate vial having a wall thickness of 1.2 mm was determined to be >95 (less than 1% survivability rate for the 2R borosilicate vial having a wall thickness of 1.2 mm), when the tested vials were provided with the 20 mm 30 N scratch.

Accordingly, embodiments of the present disclosure include an externally coated glass pharmaceutical vial comprising: a glass body comprising a sidewall enclosing an interior volume and an outer diameter D, wherein: the outer diameter D of the glass body is equal to a diameter $d_1$ of a glass vial of size X as defined by ISO 8362-1, wherein X is one of 2R, 3R, 4R, 6R, 8R, 10R, 15R, 20R, 25R, 30R, 50R, and 100R as defined by ISO 8362-1; the sidewall of the glass pharmaceutical vial comprises an average wall thickness $T_i$ that is less than or equal to 0.85*$s_1$, wherein $s_1$ is a wall thickness of the glass vial of size designation X as defined by ISO 8362-1; and the glass pharmaceutical vial comprises a breakage factor of at least 50, at least 60, at least 70, at least 80, at least 90, or at least 95, determined in accordance with the Pendulum Impact Test. Embodiments of the present disclosure include a glass pharmaceutical vial comprising a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which 116% of the diameter $d_1$ is greater than or equal to D; the sidewall of the glass pharmaceutical vial comprises an average wall thickness $T_i$ that is less than or equal to 0.85*$s_1$, wherein $s_1$ is a wall thickness of a glass vial of size designation X as defined by ISO 8362-1; and the glass pharmaceutical vial comprises a breakage factor of at least 50, at least 60, at least 70, at least 80, at least 90, or at least 95, determined in accordance with Vertical Compression Test, determined in accordance with the Pendulum Impact Test. Embodiments of the present disclosure include a glass pharmaceutical vial comprising a glass body comprising a sidewall enclosing an interior volume and an outer diameter D, wherein: the outer diameter D of the glass body is greater than or equal to 84% and less than or equal to 116% of a diameter $d_1$ of a glass vial of size designation X as defined by ISO 8362-1, wherein X is a smallest size designation of 2R, 3R, 4R, 6R, 8R, 10R, 15R, 20R, 25R, 30R, 50R, and 100R, as defined by ISO 8362-1, for which the diameter $d_1$ is greater than or equal to D; the sidewall of the glass pharmaceutical vial comprises an average wall thickness $T_i$ that is less than or equal to $0.85*s_1$, wherein $s_1$ is a wall thickness of a glass vial of size designation X as defined by ISO 8362-1; and the glass pharmaceutical vial comprises a breakage factor of at least 50, at least 60, at least 70, at least 80, at least 90, or at least 95, determined in accordance with Vertical Compression Test, determined in accordance with the Pendulum Impact Test.

Inspection

Forming the glass pharmaceutical vials with sidewalls having reduced thickness may also improve visual and automated inspection of the glass pharmaceutical vials. In particular, glass pharmaceutical vials are generally inspected visually and/or using automated vision systems to detect defects and/or nonconformities such that vials having these defects and/or nonconformities may be discarded. While not wishing to be bound by theory, it is believed that forming the glass pharmaceutical vials with sidewalls having reduced thickness may improve the surface quality of the glass pharmaceutical vials by minimizing and/or mitigating defects caused by tooling and the like.

The improved surface quality may also enhance visual and/or automated inspection of the glass pharmaceutical vials, making it easier to detect defects and/or nonconformities. In particular, glass pharmaceutical vials having improved light transmission and reflectance characteristics may enhance defect contrast detection and thereby improve automated inspection systems.

Moreover, it is also believed that stock glass tubing formed from thinner walls may be manufactured with less defects. Accordingly, glass containers formed from stock glass tubing having a reduced wall thickness may also comprise less defects leading to improved inspection-related properties of the glass containers described herein.

Sustainability and Cost

Significantly, forming the glass pharmaceutical vials with sidewalls having reduced thickness provides for more sustainable, lower cost pharmaceutical packaging. In particular, forming the glass pharmaceutical vials with sidewalls having reduced thickness results in vials that utilize less glass material than conventional glass vials having the same outer diameter D. Reduced glass material results in less post-consumer waste. Reduced glass material also results in lower weight packaging which, when scaled, decreases fuel consumption in transporting the finished products.

Table 12 below shows the amounts of glass material required to make 2R glass pharmaceutical vials having reduced wall thicknesses of 0.7 mm and 0.5 mm, for vials having a conventional flange design and vials having a reduced volume flange design. As the density of the glass can be considered constant throughout the container, the reduced glass mass can be calculated using the reduced volume of glass required to produce the particular vial.

TABLE 12

| | Conventional Flange | | | Reduced Volume Flange | |
|---|---|---|---|---|---|
| Wall Thickness (mm) | 1 | 0.7 | 0.5 | 0.7 | 0.5 |
| Volume of Glass Required per 2R Vial ($mm^3$) | 1,856 | 1,468 | 1,186 | 1,344 | 1,042 |
| Reduced Glass Mass | — | 21% | 36% | 28% | 44% |

It has been found that glass pharmaceutical vials having a wall thickness less than or equal to 0.7 times the wall thickness of a glass pharmaceutical container of the same ISO 8362-1 size designation can be formed using less than 90%, less than 85%, or even less than 80% of the glass mass used to form the glass pharmaceutical vial of the same size designation having a thickness as defined by ISO 8362-1. Accordingly, embodiments of the present disclosure include glass pharmaceutical vials wherein the sidewall of the glass pharmaceutical vial having an average wall thickness $T_i$ that is less than or equal to $0.85*s_1$ correlates to a reduction in a mass of glass used to make the vial of greater than or equal to 10%, greater than or equal to 15%, or even greater than or equal to 20%. Moreover, when the glass pharmaceutical vial is designed to have a reduced volume flange, as discussed in embodiments above, the glass pharmaceutical vial with a reduced wall thickness of 0.7 times the wall thickness of a glass pharmaceutical container of the same ISO 8362-1 size designation can be formed using less than 84%, less than 80%, less than 76%, or even less than 72% of the glass mass used to form the glass pharmaceutical vial of the same size designation having a thickness as defined by ISO 8362-1. Accordingly, embodiments of the present disclosure include glass pharmaceutical vials wherein the sidewall of the glass pharmaceutical vial having an average wall thickness $T_i$ that is less than or equal to $0.85*s_1$ correlates to a reduction in a mass of glass used to make the vial of greater than or equal to 16%, greater than or equal to 20%, greater than or equal to 24%, greater than or equal to 28%. Accordingly, the reduced wall thickness of the glass containers described herein leads to more glass containers being produced for a given amount of glass.

Reduced glass material in the containers also reduces the raw material costs as less glass is used in the manufacture of the stock glass tubing from which the containers are formed.

Glass containers formed with a reduced wall thickness may also have an increased fill volume relative to conventional glass containers having the same outer diameter. For example, glass pharmaceutical vials described herein having a 2R size designation according to ISO 8362-1 but with a reduced wall thickness (70% of the standard wall thickness according to ISO 8362-1) were able to hold 9% more fluid volume than a glass pharmaceutical vial of size 2R having a thickness as defined by ISO 8362-1. Similarly, glass pharmaceutical vials described herein having a 10R size designation according to ISO 8362-1 but with a reduced wall thickness (70% of the standard wall thickness according to ISO 8362-1) were able to hold 6% more fluid volume than a glass pharmaceutical vial of size 10R having a thickness as defined by ISO 8362-1.

As noted herein, with respect to manufacturing throughput, the reduced thickness of the sidewalls of the glass containers may improve the manufacturing throughput as the thinner glass tubing from which the glass containers are formed may be more rapidly heated to the temperatures necessary for the tube-to-vial conversion process. As discussed below, this results in reduced energy usage during manufacture of the glass containers. Similarly, the reduced thermal mass of the glass containers due to the reduced sidewall thickness may improve the efficiency of any heating and/or cooling processes used in the manufacture of the glass containers or the processing of the glass containers thereafter. For example, depyrogenation, freezing, and lyophilization processes may be completed with less energy consumption due to the relatively lower thermal mass of the glass containers having reduced wall thickness compared to conventional glass containers having the same outer diameter D. Moreover, filling line speeds may be increased due to the lower mass and increased compliance of the vials, making for more efficient filling lines.

In addition to the foregoing sustainability improvements, glass containers with reduced wall thicknesses may also result in an overall reduction in $CO_2$ emissions. With regards to the tube-to-vial conversion process, glass containers formed with reduced wall thickness may require less heating to accomplish various steps of the conversion process. To investigate this theory, a gas usage study was performed to determine whether the gas needed to convert thin wall glass containers could be decreased relative to counterpart glass containers formed with a convention thickness. Table 13 below presents gas usage numbers for the conversion of 2R glass pharmaceutical vials being formed from stock glass tubing having three different wall thicknesses.

TABLE 13

| | Gas Flow (Standard Liters Per Minute (SLPM)) | | | Gas Flow Difference | |
|---|---|---|---|---|---|
| Wall Thickness (mm) | 1.0 | 0.85 | 0.7 | 0.85 | 0.7 |
| Separation | 11.8 | 8.3 | 6.6 | −29% | −44% |
| Gathering | 23.1 | 27 | 24.9 | 17% | 8% |
| Bottoming | 8.5 | 6.5 | 7 | −24% | −18% |
| Total | 43.3 | 41.8 | 38.5 | −4% | −11% |
| Vials per tube | 34 | 31 | 30 | | |
| Total vials | 544 | 496 | 480 | | |
| Liters of NG/Vial | 0.95 | 0.92 | 0.85 | | |
| Percent Reduction | | 3% | 11% | | |

As can be seen from Table 13 above, the overall gas (i.e., energy) required to convert, from stock glass tubing, 2R vials having a wall thickness 0.7 times the wall thickness defined by ISO 8362-1 was able to be reduced by 11% compared to 2R glass pharmaceutical vials having a conventional wall thickness (i.e., 1 mm). Moreover, specifically with regards to the separation step of the conversion process, the energy required to separate, from stock glass tubing, 2R vials having a wall thickness 0.7 times the wall thickness defined by ISO 8362-1 was able to be reduced by 44% compared to 2R glass pharmaceutical vials having a conventional wall thickness (i.e., 1 mm). Accordingly, embodiments of the present disclosure include a glass pharmaceutical vial capable of being converted from stock glass tubing using less than 95%, less than 94%, less than 93%, less than 92%, less than 91%, or even less than 90% of the energy required to convert a glass pharmaceutical vial of the same ISO 8362-1 size designation having a thickness as defined by ISO 8362-1. Accordingly, embodiments of the present disclosure include glass pharmaceutical vials wherein the sidewall of the glass pharmaceutical vial having an average wall thickness $T_i$ that is less than or equal to $0.85*s_1$ correlates to a reduction in an amount of energy used to convert the glass pharmaceutical vial from stock glass tubing of greater than or equal to 5%, greater than or equal to 6%, greater than or equal to 7%, greater than or equal to 8%, greater than or equal to 9%, or even greater than or equal to 10%.

Embodiments of the present disclosure also include a glass pharmaceutical vial capable of being separated from stock glass tubing using less than 80%, less than 75%, less than 70%, less than 65%, or even less than 60% of the energy required to separate a glass pharmaceutical vial of the same ISO 8362-1 size designation having a thickness as defined by ISO 8362-1. Accordingly, embodiments of the present disclosure include glass pharmaceutical vials wherein the sidewall of the glass pharmaceutical vial having an average wall thickness $T_i$ that is less than or equal to $0.85*s_1$ correlates to a reduction in an amount of energy used to separate the glass pharmaceutical vial from stock glass tubing of greater than or equal to 20%, greater than or equal to 25%, greater than or equal to 30%, greater than or equal to 35%, or even greater than or equal to 40%. The above-described energy reductions associated with the relatively thinner wall will lead to proportional reductions in the amount of $CO_2$ emitted per converted glass vial.

In addition to energy savings and emissions reductions associated with the tube-to-vial conversion process, it has been found that such benefits are also realized with respect to the manufacturing of the stock glass tubing used to form the tubes.

To investigate potential $CO_2$ emissions reductions associated with the manufacture of stock glass tubing having a reduced thickness for use in the production of the thin wall glass containers described herein, an study was conducted to determine the $CO_2$ emissions on a per vial basis associated with 2R glass pharmaceutical vials having a reduced wall thickness of 0.7 mm and 0.5 mm. The amount of natural gas required to provide the amount of stock glass tubing needed to produce a 2R glass pharmaceutical vial was determined, and the associated $CO_2$ emissions are shown below in Table 14.

TABLE 14

| Wall Thickness | g $CO_2$/vial | $CO_2$ Emissions Reduction |
|---|---|---|
| 1 mm | 4.7 | — |
| 0.7 mm | 3.8 | 19% |
| 0.5 mm | 3.3 | 30% |

A further emissions study was performed comparing the overall $CO_2$ emissions on a per vial basis (including tube manufacturing and converting) for 2R, 10R, and 20R vials having a wall thicknesses of 1.0 mm, 0.7 mm, and 0.5 mm, the results of which are shown below in Table 15.

TABLE 15

| | $CO_2$ Emissions Reductions for Tube Manufacturing + Converting | |
|---|---|---|
| Vial Size | 0.7 mm wall thickness | 0.5 mm wall thickness |
| 2R | 12% | 16% |
| 10R | 5% | 10% |
| 20R | 10% | 10% |

In some instances where, tubing yields may be lower for some stock glass tubing having reduced wall thickness. Accordingly, the resulting emissions on a per vial basis shows some variance with the ISO 8362-1 vial size. While it is believed the manufacturing process for the stock glass tubing could be modified so as to improve tubing yields, the results of the study indicate that by reducing the wall thickness to 0.7 times the wall thickness defined by ISO 8362-1, an overall reduction in $CO_2$ emissions of at least 5% can be obtained considering both the raw glass material to stock glass tubing and the tube-to-vial conversion process. Accordingly, embodiments of the present disclosure include a glass pharmaceutical vial capable of being produced with 95% of the $CO_2$ emissions, 90% of the $CO_2$ emissions, or even 85% of the $CO_2$ emissions required to produce a glass pharmaceutical vial of the same ISO 8362-1 size designation having a thickness as defined by ISO 8362-1. Accordingly, embodiments of the present disclosure include glass pharmaceutical vials wherein the sidewall of the glass pharmaceutical vial having an average wall thickness $T_l$ that is less than or equal to $0.85{*}s_1$ correlates to a reduction in an amount of $CO_2$ emitted to produce the glass pharmaceutical vial of greater than or equal to 5%, greater than or equal to 10%, or even greater than or equal to 15%.

Without wishing to be bound by theory, it is believed that reducing the thickness of the sidewalls of the glass containers relative to conventional glass containers (such as those described by ISO 8362-1) may lead to significant reductions of $CO_2$ emissions for processes related to the filling and transportation of the glass containers.

With regards to transportation-related reductions in $CO_2$ emissions, a model for estimating the emissions reductions that considers the overall shipping weight, an Emission Factor provided by the EPA (https://www.epa.gov/sites/default/files/2018-03/documents/emission-factors_mar_2018_0.pdf), and an arbitrary distance travelled of 2,300 miles. With regards to overall shipping weight, the model includes the weight of the vials, the weight of pallets used to carry the vials, the weight of the truck (https://www.energy.gov/eere/vehicles/fact-620-april-26-2010-class-8-truck-tractor-weight-component), and the weight of an empty 53-foot trailer (https://bigrigpros.com/how-much-does-an-empty-semi-trailer-weigh/). Table 16 below presents assumptions of the model along with the model results corresponding thereto.

TABLE 16

| Assumptions | |
|---|---|
| Empty truck weight (lbs) | 17,000 |
| Empty 53-ft trailer weight (lbs) | 11,750 |
| Pallets/truck | 30 |
| Emission Factor (g/ton-mile) | 200 |
| Domestic truck rate ($/pound/mile) | $0.60 |
| Distance (miles) | 2300 |

| COST | | | |
|---|---|---|---|
| Pallet weights (lbs) | 1.0 mm | 0.7 mm | 0.5 mm |
| 2R Vials | 1,184 | 1,024 | 872 |

| Emissions | | | |
|---|---|---|---|
| Full truck weight (lbs) | 1.0 mm | 0.7 mm | 0.5 mm |
| 2R Vials | 64,270 | 59,470 | 54,910 |
| Emissions-metric tons CO2 | 1.0 mm | 0.7 mm | 0.5 mm |
| 2R Vials | 14.8 | 13.7 | 12.6 |

| | vials/pallet | vials/truck load |
|---|---|---|
| 2R Vials | 86,000 | 2,580,000 |

| Emissions/vial-g/CO2 | 1.0 mm | 0.7 mm | 0.5 mm |
|---|---|---|---|
| 2R Vials | 5.7 | 5.3 | 4.9 |

| Emission savings VS 1.0 mm --> | 1.0 mm | 0.7 mm | 0.5 mm |
|---|---|---|---|
| 2R Vials | — | −7% | −15% |

The model results shown in Table 16 above indicate that a reduction of transportation-related $CO_2$ emissions of 7% (5.7 g $CO_2$ to 5.3 g $CO_2$) is obtainable by reducing the wall thickness to 0.7 times the wall thickness defined by ISO 8362-1. Moreover, if the wall thickness is further reduced to 0.5 times the wall thickness defined by ISO 8362-1, a $CO_2$ emissions reductions of 15% (5.7 g $CO_2$ to 4.9 g $CO_2$) is obtainable.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

While embodiments of glass containers are described herein as having sidewalls with reduced thickness while maintaining the same outer diameter as a conventional glass container, or an outer diameter greater than or equal to 84% and less than or equal to 116% of a conventional glass container, it should be understood that other embodiments are contemplated and possible. For example, the glass containers may have sidewalls with reduced thickness, as described herein. However, the glass containers may be constructed such that the inner diameter is the same as a conventional glass container, or an inner diameter greater than or equal to 84% and less than or equal to 116% of a conventional glass container and the outer diameter is less than the outer diameter of a conventional glass container. In such embodiments, it is believed that the glass container will have the same property characteristics (i.e., mechanical behavior, chemical durability, etc.) as the embodiments of glass containers described herein having reduced wall thickness but the same outer diameter as a conventional glass container, or an outer diameter greater than or equal to 84% and less than or equal to 116% of a conventional glass container.

Moreover, while the present disclosure is primarily directed to glass containers converted from glass tubes, embodiments of the present disclosure also include molded glass containers comprising thin walls. The molded glass containers would demonstrate many of the improvements of converted glass containers. For example, regardless of the manufacturing method used to create the glass container, glass containers comprising thinner walls may use less glass and energy for their production, and may offer similar mechanical performance advantages related to improved compliance resulting from the thinner walls.

What is claimed is:

1. A glass pharmaceutical vial comprising:

a glass body comprising a sidewall enclosing an interior volume and an outer diameter D, wherein:

the outer diameter D of the glass body is greater than or equal to 84% and less than or equal to 116% of a diameter $d_1$ of a glass vial of size designation X as defined by ISO 8362-1:2018, wherein X is a smallest size designation of 2R, 3R, 4R, 6R, 8R, 10R, 15R, 20R, 25R, 30R, 50R, and 100R, as defined by ISO 8362-1:2018, for which 116% of the diameter $d_1$ is greater than or equal to D;

the sidewall of the glass pharmaceutical vial comprises an average wall thickness $T_i$ that is less than or equal to $0.85*s_1$, wherein $s_1$ is a wall thickness of the glass vial of size designation X as defined by ISO 8362-1:2018; and the glass pharmaceutical vial comprises an external organic coating and a horizontal strength factor of at least 1.5, as determined in accordance with Horizontal Compression Test.

2. The glass pharmaceutical vial of claim 1, wherein the glass pharmaceutical vial comprises a compliance factor of at least 1.75, as determined in accordance with a Vial Compliance Test.

3. The glass pharmaceutical vial of claim 1, wherein the external organic coating has a thickness greater than or equal to 20 nm and less than or equal to 40 nm.

4. The glass pharmaceutical vial of claim 1, wherein the glass pharmaceutical vial comprises a breakage factor of at least 50, as determined in accordance with a Pendulum Impact Test.

5. The glass pharmaceutical vial of claim 1, wherein the glass pharmaceutical vial comprises a cold storage factor of at least 2.25, as determined in accordance with a Freeze-Thaw Test.

6. The glass pharmaceutical vial of claim 1, wherein the glass pharmaceutical vial is formed from a Type I, Class B glass according to ASTM Standard E438-92.

7. The glass pharmaceutical vial of claim 1, wherein the glass pharmaceutical vial is formed from an aluminosilicate glass composition.

8. The glass pharmaceutical vial of claim 1, wherein the sidewall of the glass pharmaceutical vial having an average wall thickness $T_i$ that is less than or equal to $0.85*s_1$ correlates to a reduction in a mass of glass used to make the glass pharmaceutical vial of greater than or equal to 10%.

9. The glass pharmaceutical vial of claim 1, wherein the sidewall of the glass pharmaceutical vial having an average wall thickness $T_i$ that is less than or equal to $0.85*s_1$ correlates to a reduction in an amount of energy used to convert the glass pharmaceutical vial from stock glass tubing of greater than or equal to 5%.

10. The glass pharmaceutical vial of claim 1, wherein the sidewall of the glass pharmaceutical vial having an average wall thickness $T_i$ that is less than or equal to $0.85*s_1$ correlates to a reduction in an amount of $CO_2$ emitted to produce the glass pharmaceutical vial of greater than or equal to 5%.

11. The glass pharmaceutical vial of claim 1, wherein the sidewall of the glass pharmaceutical vial having an average wall thickness $T_i$ that is less than or equal to $0.85*s_1$ correlates to a reduction in an amount of energy used to separate the glass pharmaceutical vial from stock glass tubing of greater than or equal to 20%.

12. The glass pharmaceutical vial of claim 1, wherein the glass pharmaceutical vial has a Type 1 chemical durability according to USP <660>.

13. The glass pharmaceutical vial of claim 1, wherein the glass pharmaceutical vial comprises a Dynamic Impact Factor of less than 0.9, as determined in accordance with a Dynamic Impact Test.

14. The glass pharmaceutical vial of claim 1, wherein the glass pharmaceutical vial comprises a FWHM Factor of at least 1.2, as determined in accordance with a Dynamic Impact Test.

15. The glass pharmaceutical vial of claim 1, wherein the glass pharmaceutical vial comprises:

a Dynamic Impact Factor of less than 0.9 as determined in accordance with a Dynamic Impact Test; and a FWHM Factor of at least 1.2 as determined in accordance with the Dynamic Impact Test.

16. The glass pharmaceutical vial of claim 1, further comprising:

a shoulder extending from the sidewall;

a neck extending from the shoulder; and a flange extending from the neck, the flange comprising:

an underside surface extending from the neck; and an outer surface extending from the underside surface and being radially recessed inwardly thereby defining a cutout portion of the flange.

* * * * *